(12) United States Patent
Marinier et al.

(10) Patent No.: US 11,039,329 B2
(45) Date of Patent: Jun. 15, 2021

(54) COMMUNICATING CHANNEL STATE INFORMATION (CSI) OF MULTIPLE TRANSMISSION POINTS

(71) Applicant: INTERDIGITAL PATENT HOLDINGS, INC., Wilmington, DE (US)

(72) Inventors: Paul Marinier, Brossard (CA); Diana Pani, Montreal (CA); J. Patrick Tooher, Montreal (CA); Marian Rudolf, Montreal (CA)

(73) Assignee: InterDigital Patent Holdings, Inc., Wilmington, DE (US)

( * ) Notice: Subject to any disclaimer, the term of this patent is extended or adjusted under 35 U.S.C. 154(b) by 0 days.

(21) Appl. No.: 15/387,703

(22) Filed: Dec. 22, 2016

(65) Prior Publication Data
US 2017/0238323 A1 Aug. 17, 2017

Related U.S. Application Data

(63) Continuation of application No. 13/909,242, filed on Jun. 4, 2013, now Pat. No. 9,532,362.
(Continued)

(51) Int. Cl.
*H04W 24/10* (2009.01)
*H04W 72/04* (2009.01)
(Continued)

(52) U.S. Cl.
CPC ............ *H04W 24/10* (2013.01); *H04B 7/024* (2013.01); *H04B 7/0456* (2013.01);
(Continued)

(58) Field of Classification Search
CPC .......... H04B 7/02–0413; H04B 7/0621–0663; H04B 7/0456; H04B 7/0617;
(Continued)

(56) References Cited

U.S. PATENT DOCUMENTS 6,752,040 B1   6/2004   Paul-Alexandre et al.
8,478,190 B2   7/2013   Sayana et al.
(Continued)

FOREIGN PATENT DOCUMENTS

CN   101808409 A   8/2010
CN   101841828 A   9/2010
(Continued)

OTHER PUBLICATIONS

3rd Generation Partnership Project (3GPP), R1-092530, "Required Information at the UE in CoMP", Panasonic, 3GPP TSG RAN WG1 Meeting #57bis, Los Angeles, USA, Jun. 29-Jul. 3, 2009, 2 pages.
(Continued)

*Primary Examiner* — Timothy J Weidner
(74) *Attorney, Agent, or Firm* — Condo Roccia Koptiw LLP

(57) ABSTRACT

Embodiments contemplate methods and systems for determining and communicating channel state information (CSI) for one or more transmission points (or CSI reference signal resources). Embodiments further contemplate determining transmission states may include applying at least one CSI process for channel state information (CSI) reporting. Embodiments also contemplate aperiodic and/or periodic reporting of one or more report types (e.g., rank indicator (RI)) of CSI, perhaps based on one or more reporting modes that may be configured for each of the one or more CSI process.

14 Claims, 9 Drawing Sheets

Related U.S. Application Data

(60) Provisional application No. 61/655,359, filed on Jun. 4, 2012, provisional application No. 61/678,559, filed on Aug. 1, 2012.

(51) Int. Cl.
   *H04W 72/06*      (2009.01)
   *H04B 17/24*      (2015.01)
   *H04B 7/26*       (2006.01)
   *H04B 7/06*       (2006.01)
   *H04B 7/0456*     (2017.01)
   *H04B 7/024*      (2017.01)
   *H04L 5/00*       (2006.01)
   *H04L 1/00*       (2006.01)

(52) U.S. Cl.
   CPC ......... *H04B 7/0617* (2013.01); *H04B 7/0626* (2013.01); *H04B 7/0647* (2013.01); *H04B 7/2612* (2013.01); *H04B 17/24* (2015.01); *H04L 1/0026* (2013.01); *H04L 1/0027* (2013.01); *H04L 5/0035* (2013.01); *H04L 5/0057* (2013.01); *H04W 72/0413* (2013.01); *H04W 72/06* (2013.01)

(58) Field of Classification Search
   CPC .................. H04B 7/2612; H04B 17/24; H04L 1/0023–0039; H04L 5/0035; H04L 5/0057; H04W 24/10; H04W 72/0413–044; H04W 72/06–10
   See application file for complete search history.

(56) References Cited

U.S. PATENT DOCUMENTS

| | | |
|---|---|---|
| 8,599,711 B2 | 12/2013 | Hugl et al. |
| 8,619,693 B2 | 12/2013 | Noh et al. |
| 8,693,463 B2 | 4/2014 | Kazmi et al. |
| 8,798,188 B2 | 8/2014 | Kwon et al. |
| 8,838,159 B2 | 9/2014 | Kang et al. |
| 8,976,751 B2 | 3/2015 | Yang et al. |
| 8,989,114 B2 | 3/2015 | Kim et al. |
| 9,008,585 B2 | 4/2015 | Xiao et al. |
| 9,451,589 B2 | 9/2016 | Nishio et al. |
| 9,456,372 B2 | 9/2016 | Lee et al. |
| 9,532,362 B2 | 12/2016 | Marinier et al. |
| 9,755,706 B2 | 9/2017 | Geirhofer et al. |
| 9,787,383 B2 | 10/2017 | Seo et al. |
| 10,123,343 B2 | 11/2018 | Nazar et al. |
| 2007/0049277 A1 | 3/2007 | Nakamata et al. |
| 2010/0035555 A1 | 2/2010 | Bala et al. |
| 2011/0017734 A1 | 1/2011 | Eggenreich et al. |
| 2011/0019776 A1 | 1/2011 | Zhang et al. |
| 2011/0044187 A1 | 2/2011 | Moulsley et al. |
| 2011/0141987 A1 | 6/2011 | Nam et al. |
| 2011/0176514 A1 | 7/2011 | Yoon et al. |
| 2011/0176634 A1 | 7/2011 | Yoon et al. |
| 2011/0177834 A1 | 7/2011 | Shin et al. |
| 2011/0235743 A1 | 9/2011 | Lee et al. |
| 2011/0237267 A1 | 9/2011 | Chen et al. |
| 2011/0237282 A1 | 9/2011 | Geirhofer et al. |
| 2011/0300890 A1 | 12/2011 | Hoshino et al. |
| 2011/0319109 A1 | 12/2011 | Kang et al. |
| 2012/0051257 A1 | 3/2012 | Kim et al. |
| 2012/0051319 A1 | 3/2012 | Kwon et al. |
| 2012/0057547 A1 | 3/2012 | Löhr et al. |
| 2012/0076028 A1 | 3/2012 | Ko et al. |
| 2012/0088458 A1 | 4/2012 | Nogami et al. |
| 2012/0108254 A1 | 5/2012 | Kwon et al. |
| 2012/0120817 A1 | 5/2012 | Khoshnevis et al. |
| 2012/0122502 A1 | 5/2012 | Shin et al. |
| 2012/0127869 A1* | 5/2012 | Yin .................... H04L 1/0031 370/252 |
| 2012/0140708 A1* | 6/2012 | Choudhury ......... H04W 72/082 370/328 |
| 2012/0176939 A1 | 7/2012 | Qu et al. |
| 2012/0176996 A1 | 7/2012 | Kim et al. |
| 2012/0188976 A1 | 7/2012 | Kim et al. |
| 2012/0201154 A1 | 8/2012 | Chandrasekhar et al. |
| 2012/0207047 A1 | 8/2012 | Liao et al. |
| 2012/0208547 A1 | 8/2012 | Geirhofer et al. |
| 2012/0213261 A1 | 8/2012 | Sayana et al. |
| 2012/0218968 A1 | 8/2012 | Kim et al. |
| 2012/0220286 A1 | 8/2012 | Chen et al. |
| 2012/0257515 A1 | 10/2012 | Hugl et al. |
| 2012/0257553 A1 | 10/2012 | Noh et al. |
| 2012/0287875 A1 | 11/2012 | Kim et al. |
| 2013/0028138 A1 | 1/2013 | Hao et al. |
| 2013/0028225 A1 | 1/2013 | Ko et al. |
| 2013/0058307 A1 | 3/2013 | Kim et al. |
| 2013/0070634 A1 | 3/2013 | Gao et al. |
| 2013/0114430 A1 | 5/2013 | Koivisto et al. |
| 2013/0208604 A1 | 8/2013 | Lee et al. |
| 2013/0242902 A1 | 9/2013 | Liu et al. |
| 2013/0250788 A1 | 9/2013 | Kim et al. |
| 2013/0273931 A1 | 10/2013 | Lunttila et al. |
| 2013/0301467 A1 | 11/2013 | Kang et al. |
| 2013/0336214 A1 | 12/2013 | Sayana et al. |
| 2013/0343301 A1 | 12/2013 | Geirhofer et al. |
| 2014/0016497 A1 | 1/2014 | Seo et al. |
| 2014/0044061 A1 | 2/2014 | Yue et al. |
| 2014/0066116 A1 | 3/2014 | Gao et al. |
| 2014/0086082 A1 | 3/2014 | Kim et al. |
| 2014/0086155 A1 | 3/2014 | Chen |
| 2014/0112177 A1 | 4/2014 | Park et al. |
| 2014/0133336 A1 | 5/2014 | Park et al. |
| 2014/0286189 A1 | 9/2014 | Kang et al. |
| 2015/0078272 A1 | 3/2015 | Kim et al. |
| 2015/0124717 A1 | 5/2015 | Li et al. |
| 2015/0249517 A1 | 9/2015 | Seo et al. |
| 2015/0358093 A1 | 12/2015 | Seo et al. |
| 2015/0381254 A1 | 12/2015 | Liang |
| 2016/0080094 A1 | 3/2016 | Kim et al. |
| 2016/0154589 A1 | 6/2016 | Takeda et al. |
| 2019/0141722 A1 | 5/2019 | Nayeb Nazar et al. |

FOREIGN PATENT DOCUMENTS

| | | |
|---|---|---|
| CN | 101877608 A | 11/2010 |
| CN | 101924610 A | 12/2010 |
| CN | 102149124 A | 8/2011 |
| CN | 102291224 A | 12/2011 |
| CN | 102469466 A | 5/2012 |
| CN | 102577196 A | 7/2012 |
| EP | 2624473 A2 | 8/2013 |
| EP | 2627141 A2 | 8/2013 |
| EP | 2673929 B1 | 12/2013 |
| EP | 2824849 A1 | 1/2015 |
| JP | 2011-004212 A | 1/2011 |
| JP | 2012-105323 A | 5/2012 |
| JP | 2012-510772 A | 5/2012 |
| JP | 2012525030 A | 10/2012 |
| JP | 2013-507075 A | 2/2013 |
| KR | 10-2010-0121445 A | 11/2010 |
| KR | 10-2012-0011794 A | 2/2012 |
| KR | 10-2012-0033283 A | 4/2012 |
| KR | 10-2013-0050273 A | 5/2013 |
| WO | WO 2009/019079 A1 | 2/2009 |
| WO | WO 2010/064842 A2 | 6/2010 |
| WO | WO 2010/106725 A1 | 9/2010 |
| WO | WO 2010/151050 A2 | 12/2010 |
| WO | WO 2011/038410 A1 | 3/2011 |
| WO | 2011041544 A2 | 4/2011 |
| WO | 2011041759 A1 | 4/2011 |
| WO | WO 2011/041623 A1 | 4/2011 |
| WO | 2011/085195 A1 | 7/2011 |
| WO | 2011/085230 A2 | 7/2011 |
| WO | 2011/115421 A2 | 9/2011 |
| WO | 2011/160926 A1 | 12/2011 |
| WO | 2012/008815 A2 | 1/2012 |
| WO | 2012109037 A2 | 8/2012 |
| WO | 2012109037 A3 | 11/2012 |

(56) References Cited

FOREIGN PATENT DOCUMENTS

| WO | WO 2012/155520 A1 | 11/2012 |
|---|---|---|
| WO | 2013/021531 A1 | 2/2013 |
| WO | WO 2013/025558 A1 | 2/2013 |
| WO | 2013/170114 A1 | 5/2013 |
| WO | WO 2013/112024 A1 | 8/2013 |
| WO | WO 2013/133653 A1 | 9/2013 |

OTHER PUBLICATIONS

3rd Generation Partnership Project (3GPP), R1-093998, "Advanced DL CoMP Schemes and Related Feedback Support", Texas Instruments, 3GPP TSG RAN WG1 58 bis, Miyazaki, Japan, Oct. 12-16, 2009, 2 pages.
3rd Generation Partnership Project (3GPP), R1-100258, "The Standardization Impacts of Downlink CoMP", Huawei, 3GPP TSG RAN WG1 Meeting #59bis, Valencia, Spain, Jan. 18-22, 2010, 3 pages.
3rd Generation Partnership Project (3GPP), R1-101900, "Achievable CQI Measurement Accuracy over CSI-RS", Nokia, Nokia Siemens Networks, 3GPP TSG-RAN WG1 Meeting #60bis, Beijing, China, Apr. 12-16, 2010, 3 pages.
3rd Generation Partnership Project (3GPP), R1-103642, "Support for Increased CSI Feedback Payloads in PUCCH", Samsung, 3GPP TSG RAN WG1 #61bis, Dresden, Germany, Jun. 28-Jul. 2, 2010, 3 pages.
3rd Generation Partnership Project (3GPP), R1-104899, "PDSCH Muting Discussion for Specification Impacts", Panasonic, 3GPP TSG RAN WG1 Meeting #62, Madrid, Spain, Aug. 23-27, 2010, 3 pages.
3rd Generation Partnership Project (3GPP), R1-105035, "Downlink CSI-RS Signaling Design for LTE-Advanced", New Postcom, 3GPP TSG RAN WG1 Meeting #62, Madrid, Spain, Aug. 23-27, 2010, 5 pages.
3rd Generation Partnership Project (3GPP), R1-105132, "Proposal for Specification of POSCH Muting", Huawei, LG Electronics, Samsung, Panasonic, Intel, HiSilicon, New Postcom, CATR, Potevio, CMCC, 3GPP TSG RAN WG 1 Meeting #62bis, Xi'an, China, Oct. 11-15, 2010, 7 pages.
3rd Generation Partnership Project (3GPP), R1-105322, "Further Details on CSI RS Configuration", Ericsson, ST-Ericsson, 3GPP TSG-RAN WG1 #62bis, Xi'an, China, Oct. 11-15, 2010, 4 pages.
3rd Generation Partnership Project (3GPP), R1-105529, "POSCH RE Muting for CSI-RS", Nokia Siemens Networks, Nokia, 3GPP TSG-RAN WG1 Meeting #62bis, Xi'an, China, Oct. 11-15, 2010, 7 pages.
3rd Generation Partnership Project (3GPP), R1-105803, "DL RS RAN1 Chairman's Notes", NTT DoCoMo, 3GPP TSG RAN WG1 Meeting #62bis, Xi'an, China, Oct. 11-15, 2010, 4 pages.
3rd Generation Partnership Project (3GPP), R1-110049, "Interference Measurement over Muted RE", CATT, 3GPP TSG RAN WG1 Meeting #63bis, Dublin, Ireland, Jan. 17-21, 2011, 4 pages.
3rd Generation Partnership Project (3GPP), R1-121946, "CSI Feedback Modes for CoMP", Huawei, HiSilicon, 3GPP TSG RAN WG1 Meeting #69, Prague, Czech Republic, May 21-25, 2012, 3 pages.
3rd Generation Partnership Project (3GPP), R1-121947, "Interference Measurement Resource Configuration and CQI Calculation", Huawei, HiSilicon, 3GPP TSG RAN WG1 Meeting #69, Prague, Czech Republic, May 21-25, 2012, 7 pages.
3rd Generation Partnership Project (3GPP), R1-122836, "RI and PMI Sharing between Multiple CSI Processes", Ericsson, ST-Ericsson, 3GPP TSG-RAN WG1 #69, Prague, Czech Republic, May 21-30, 2012, 6 pages.
3rd Generation Partnership Project (3GPP), R1-122843, "Control Signaling in Support of CoMP", Ericsson, ST-Ericsson, 3GPP TSG-RAN WG1 #69, Prague, Czech Republic, May 21-30, 2012, 3 pages.

3rd Generation Partnership Project (3GPP), R1-122953, "Interference Measurement Mechanism for Rel-11", NTT DoCoMo, 3GPP TSG RAN WG1 Meeting #69, Prague, Czech Republic, May 21-25, 2012, 10 pages.
3rd Generation Partnership Project (3GPP), R1-123402, "Remaining Issues with Periodic Feedback for CoMP", InterDigital Communications, LLC, 3GPP TSG-RAN WG1 Meeting #70, Qingdao, China, Aug. 13-17, 2012, 2 pages.
3rd Generation Partnership Project (3GPP), R1-125022, "Periodic Feedback for CoMP with RI-Reference-Process", ITRI, 3GPP TSG-RAN WG1 #71, New Orleans, USA, Nov. 12-16, 2012, 2 pages.
3rd Generation Partnership Project (3GPP), R2-093075, "CoMP Cell Set Configuration", Fujitsu, 3GPP TSG-RAN WG2 Meeting #66, San Francisco, USA, May 4-8, 2009, 5 pages.
3rd Generation Partnership Project (3GPP), TR 36.814 V1.3.0, "Technical Specification Group Radio Access Network, Further Advancements for E-UTRA Physical Layer Aspects (Release 9)", Jun. 2009, pp. 1-46.
3rd Generation Partnership Project (3GPP), TS 36.211 V10.1.0, "Technical Specification Group Radio Access Network, Evolved Universal Terrestrial Radio Access (E-UTRA), Physical Channels and Modulation (Release 10)", Mar. 2011, pp. 1-103.
3rd Generation Partnership Project (3GPP), TS 36.212 V10.1.0, "Technical Specification Group Radio Access Network, Evolved Universal Terrestrial Radio Access (E-UTRA), Multiplexing and Channel Coding (Release 10)", Mar. 2011, pp. 1-76.
3rd Generation Partnership Project (3GPP), TS 36.213 V10.1.0, "Technical Specification Group Radio Access Network, Evolved Universal Terrestrial Radio Access (E-UTRA), Physical Layer Procedures (Release 10)", Mar. 2011, pp. 1-115.
3rd Generation Partnership Project (3GPP), TS 36.213 V10.3.0, "Technical Specification Group Radio Access Network, Evolved Universal Terrestrial Radio Access (E-UTRA), Physical Layer Procedures (Release 10)", Sep. 2011, pp. 1-122.
3rd Generation Partnership Project (3GPP), TS 36.213 V10.5.0, "Technical Specification Group Radio Access Network, Evolved Universal Terrestrial Radio Access (E-UTRA), Physical Layer Procedures (Release 10)", Mar. 2012, pp. 1-125.
3rd Generation Partnership Project (3GPP), TS 36.213 V9.0.1, "Technical Specification Group Radio Access Network, Evolved Universal Terrestrial Radio Access (E-UTRA), Physical Layer Procedures (Release 9)", Dec. 2009, pp. 1-79.
European Telecommunications Standards Institute (ETSI), TS 136 214 V10.1.0, "LTE, Evolved Universal Terrestrial Radio Access (E-UTRA), Physical Layer, Measurements (3GPP TS 36.214 version 10.1.0 Release 10)", Apr. 2011, 15 pages.
3rd Generation Partnership Project (3GPP), R1-103587, "Investigation on CSI-RS Muting", ZTE, 3GPP TSG RAN WG1 Meeting #61bis, Dresden, Germany, Jun. 28-Jul. 2, 2010, pp. 1-8.
3rd Generation Partnership Project (3GPP), R1-103843, "Views on CSI RS Muting", Ericsson, ST-Ericsson, 3GPP TSG-RAN WG1 #61bis, Dresden, Germany, Jun. 28-Jul. 2, 2010, 3 pages.
3rd Generation Partnership Project (3GPP), R1-104566, "Interference Coordination for Control Channels Under Non-CA Based Heterogeneous Deployments", ZTE, 3GPP TSG RAN WG1 Meeting #62, Madrid, Spain, Aug. 23-27, 2010, pp. 1-10.
3rd Generation Partnership Project (3GPP), R1-105888, "Periodic CSI reporting for Carrier Aggregation", Texas Instruments, 3GPP TSG RAN WG1 #63, Jacksonville, USA, Nov. 15-19, 2010, pp. 1-4.
3rd Generation Partnership Project (3GPP), R1-113076, "Multi-Cell Periodic CSI Reporting for DL CA", Samsung, 3GPP TSG RAN WG1 #66bis, Zhuhai, China, Oct. 10-14, 2011, pp. 1-4.
3rd Generation Partnership Project (3GPP), R1-113773, "Discussion and Evaluation on Interference Measurement", ZTE, 3GPP TSG-RAN WG1 Meeting #67, San Francisco, USA, Nov. 14-18, 2011, pp. 1-8.
3rd Generation Partnership Project (3GPP), R1-122549, "Interference Measurements for CoMP", InterDigital Communications, LLC, 3GPP TSG-RAN WG1 Meeting #69, Prague, Czech Republic, May 21-25, 2012, 6 pages.
3rd Generation Partnership Project (3GPP), R1-122930, "Email Discussion [69-10]: Details of Collision Handling and Compression/Multiplexing in Case of 2 or more CSIs Being Configured in the

(56) References Cited

OTHER PUBLICATIONS

Same Reporting Instance for CoMP CSI Feedback", Fujitsu, 3GPP TSG RAN WG1 Meeting #69, Prague, Czech Republic, May 21-25, 2012, pp. 1-30.
3rd Generation Partnership Project (3GPP), R1-131040, "Discussion on NAICS Evaluation Assumptions", Samsung, 3GPP TSG RAN WG1 #72bis, Chicago, USA, Apr. 15-19, 2013, 9 pages.
3rd Generation Partnership Project (3GPP), R1-131061, "Consideration for Network Assisted Receiver Enhancement", ZTE, 3GPP TSG-RAN1#72bis, Chicago, USA, Apr. 15- 19, 2013, pp. 1-7.
3rd Generation Partnership Project (3GPP), R1-131547, "Network Assistance for Interference Cancellation in Cell Range Expansion for Heterogeneous Networks", Ericsson, ST-Ericsson, 3GPP TSG RAN WG1 Meeting #72bis, Chicago, USA, Apr. 15-19, 2013, 8 pages.
3rd Generation Partnership Project (3GPP), RP-130404, "Study on Network-Assisted Interference Cancellation and Suppression for LTE", MediaTek, Renesas Mobile Europe, Broadcom Corporation, 3GPP TSG RAN Meeting #59, Vienna, Austria, Feb. 26-Mar. 1, 2013, 7 pages.
3rd Generation Partnership Project (3GPP), TS 36.133 V10.10.0, "Technical Specification Group Radio Access Network, Evolved Universal Terrestrial Radio Access (E-UTRA), Requirements for Support of Radio Resource Management (Release 10)", Mar. 2013, 681 pages.
3rd Generation Partnership Project (3GPP), TS 36.133 V10.14.0, "Technical Specification Group Radio Access Network, Evolved Universal Terrestrial Radio Access (E-UTRA), Requirements for Support of Radio Resource Management (Release 10)", Mar. 2014, 716 pages.
3rd Generation Partnership Project (3GPP), TS 36.133 V9.15.0, "Technical Specification Group Radio Access Network, Evolved Universal Terrestrial Radio Access (E-UTRA), Requirements for Support of Radio Resource Management (Release 9)", Mar. 2013, 522 pages.
3rd Generation Partnership Project (3GPP), TS 36.133 V9.19.0, "Technical Specification Group Radio Access Network, Evolved Universal Terrestrial Radio Access (E-UTRA), Requirements for Support of Radio Resource Management (Release 9)", Mar. 2014, 528 pages.
3rd Generation Partnership Project (3GPP), TS 36.211 V11.2.0, "Technical Specification Group Radio Access Network, Evolved Universal Terrestrial Radio Access (E-UTRA), Physical Channels and Modulation (Release 11)", Feb. 2013, 109 pages.
3rd Generation Partnership Project (3GPP), TS 36.212 V11.2.0, "Technical Specification Group Radio Access Network, Evolved Universal Terrestrial Radio Access (E-UTRA), Multiplexing and Channel Coding (Release 11)", Feb. 2013, 82 pages.
3rd Generation Partnership Project (3GPP), TS 36.213 V11.2.0, "Technical Specification Group Radio Access Network, Evolved Universal Terrestrial Radio Access (E-UTRA), Physical Layer Procedures (Release 11)", Feb. 2013, 173 pages.
European Telecommunications Standards Institute (ETSI), "TS 136 213 V10.1.0", "LTE, Evolved Universal Terrestrial Radio Access (E-UTRA, Physical Layer Procedures (3GPP TS 36.213 Version 10.1.0 Release 10)", Apr. 2011, 117 pages.
3rd Generation Partnership Project (3GPP), R1-093909, "Multi-Cell CSI-RS Design Aspects", Nokia, Nokia Siemens Networks, 3GPP TSG-RAN WG1 Meeting #58bis, Miyazaki, Japan, Oct. 12-16, 2009, 11 pages.
3rd Generation Partnership Project (3GPP), R1-101156, "Necessity of Orthogonal Inter-Cell CSI-RS Patterns", Samsung, 3GPP TSG RAN WG1 #60, San Francisco, USA, Feb. 22-26, 2010, 3 pages.
3rd Generation Partnership Project (3GPP), R1-105795, "Way Forward on CSI-RS Signaling for FDD and TDD", Huawei, HiSilicon, Intel, New Postcom, Ericsson, ST-Ericsson, LG Electronics, Nokia Siemens Networks, Nokia, Texas Instruments, 3GPP TSG RAN WG1 #62bis, Xi'an, China, Oct. 11-15, 2010, 5 pages.

3rd Generation Partnership Project (3GPP), R1-123468, "CSI Collision Handling for CoMP", Samsung, 3GPP TSG RAN WG1 #70, Qingdao, China, Aug. 13-17, 2012, 3 pages.
3rd Generation Partnership Project (3GPP), R1-123581, "On Periodic Feedback", Renesas Mobile Europe Ltd., 3GPP TSG-RAN WG1 Meeting #70, Qingdao, China, Aug. 13-17, 2012, 5 pages.
3rd Generation Partnership Project (3GPP), R1-122367, "Considerations on Interference Measurement Resource for CoMP", New Postcom, 3GPP TSG RAN WG2 Meeting #69, Prague, Czech Republic, May 21-25, 2012, 5 pages.
3rd Generation Partnership Project (3GPP), TS 36.211 V10.0.0, "Technical Specification Group Radio Access Network, Evolved Universal Terrestrial Radio Access (E-UTRA), Physical Channels and Modulation (Release 10)", Dec. 2010, 103 pages.
3rd Generation Partnership Project (3GPP), TS 36.213 V10.1.0, "Technical Specification Group Radio Access Network, Evolved Universal Terrestrial Radio Access (E-UTRA), Physical Layer Procedures (Release 1 0)", Mar. 2011, 115 pages.
European Telecommunications Standards Institute (ETSI), TS 136 213 V9.0.1, "LTE, Evolved Universal Terrestrial Radio Access (E-UTRA), Physical Layer Procedures (3GPP TS 36.213 version 9.0.1 Release 9)", Jan. 2010, 81 pages.
$3^{rd}$ Generation Partnership Project (3GPP), R1-092585, "Analysis of Feedback Mechanisms for CoMP", InterDigital, 3GPP TSG RAN WG1, Meeting #57bis, Los Angeles, USA, Jun. 29-Jul. 3, 2009, 10 pages.
$3^{rd}$ Generation Partnership Project (3GPP), Ts 25.331 V10.2.0, "$3^{rd}$ Generation Partnership Project; Technical Specification Group Radio Access Network; Radio Resource Control (RRC); Protocol specification (Release 10)", Dec. 2010, 1834 pages.
$3^{rd}$ Generation Partnership Project (3GPP), DRAFT3GPP TS 36.213 Va.0.0, "$3^{rd}$ Generation Partnership Project; Technical Specification Group Radio Access Network; Evolved Universal Terrestrial Radio Access (E-UTRA); Physical layer procedures (Release 10)", Dec. 2010, 98 pages.
$3^{rd}$ Generation Partnership Project (3GPP), TS 36.211 V10.4.0, "$3^{rd}$ Generation Partnership Project; Technical Specification Group Radio Access Network; Evolved Universal Terrestrial Radio Access (E-UTRA); Physical Channels and Modulation (Release 10)", Dec. 2011, 101 pages.
$3^{rd}$ Generation Partnership Project (3GPP), TS 36.300 V11.1.0, "$3^{rd}$ Generation Partnership- Project, Technical Specification Group Radio Access Network; Evolved Universal Terrestrial Radio Access (E-UTRA) and Evolved Universal Terrestrial Radio Access Network (E-UTRAN); Overall description; Stage 2 (Release 11)", Mar. 2012, 194 pages.
$3^{rd}$ Generation Partnership Project (3GPP), TS 36.331 V10.5.0, "$3^{rd}$ Generation Partnership Project; Technical Specification Group Radio Access Network; Evolved Universal Terrestrial Radio Access *E-UTRA); Radio Resource Control (RRC); Protocol specification (Release 10)", Mar. 2012, 302 pages.
R1-110861, "3rd Generation Partnership Project (3GPP)", "CSI RS Configuration to Support 4 Tx MIMO UE in 8 Tx Networks", NTT Docomo, Ericsson, ST-Ericsson, Samsung, Feb. 21-25, 2011, 5 pages.
R2-110607, "3rd Generation Partnership Project (3GPP)", "Higher layer signaling of SCI-RS and muting configurations", NTT Docomo, Ericsson, ST-Ericsson, Jan. 17-21, 2011, 3 pages.
$3^{rd}$ Generation Partnership Project (3GPP); "Consideration on CSI-RS design for CoMP and text proposal to 36.814", Huawei, R1-092364, 3GPP TSG RAN WG1, Meeting #57bis, Los Angeles, USA, Jun. 29-Jul. 3, 2009, 1-9 pages.
3rd Generation Partnership Project (3GPP), TS 36.331 V0.3.0, "Technical Specification Group Radio Access Network Evolved Universal Terrestrial Radio Access (E-UTRA) Radio Resource Control (RRC), Protocol Specification (Release 8)", Sep. 2007, pp. 1-31.
3rd Generation Partnership Project (3GPP), R1-122039, "On CSI Feedback Modes for CoMP", CATT, 3GPP TSG RAN WG1 Meeting #69, Prague, Czech Republic, May 21-25, 2012, 6 pages.
3rd Generation Partnership Project (3GPP), R1-122135, "CSI Feedback Modes for CoMP", ZTE, 3GPP TSG RAN WG1 Meeting #69, Prague, Czech Republic, May 21-25, 2012, 5 pages.

(56) References Cited

OTHER PUBLICATIONS

3rd Generation Partnership Project (3GPP), R1-122143, "Downlink Control Signaling for CoMP", ZTE, 3GPP TSG RAN WG1 Meeting #69, Prague, Czech Republic, May 21-25, 2012, pp. 1-5.
R1-101157, "Inter-Cell CSI RS Design in Heterogeneous Network", Samsung, 3GPP TSG RAN WG1 #60, San Francisco, USA, Feb. 22-26, 2010, 2 pages.
R1-102049, "PH Reporting for Carrier Aggregation", Research in Motion UK Limited, 3GPP TSG RAN WG1 Meeting #60bis, Beijing, China, Apr. 12-16, 2010, pp. 1-2.
TDOC R1-093550, "3rd Generation Partnership Project (3GPP)", Multi-cell co-operative beamforming: TP for TR36.814, Philips, 3GPP TSG RAN WG1 Meeting #58, Shenzhen, P.R. China, Aug. 24-28, 2009, 2 pages.

\* cited by examiner

COMMUNICATING CHANNEL STATE INFORMATION (CSI) OF MULTIPLE TRANSMISSION POINTS

CROSS-REFERENCE TO RELATED APPLICATIONS

This application is a continuation of U.S. patent application Ser. No. 13/909,242, filed Jun. 4, 2013, titled "COMMUNICATING CHANNEL STATE INFORMATION (CSI) OF MULTIPLE TRANSMISSION POINTS", which claims the benefit of U.S. Provisional Application No. 61/655,359, filed Jun. 4, 2012, titled "COMMUNICATING CHANNEL STATE INFORMATION (CSI) OF MULTIPLE TRANSMISSION POINTS", and U.S. Provisional Application No. 61/678,559, filed Aug. 1, 2012, titled "COMMUNICATING CHANNEL STATE INFORMATION (CSI) OF MULTIPLE TRANSMISSION POINTS", the disclosures of all applications hereby incorporated by reference herein in their respective entirety, for all purposes.

BACKGROUND

A wireless communication system may be evaluated based on the system's average cell throughput and/or its cell-edge throughput. Cell-edge users may experience low received signal strength and the cell edge performance may be affected by inter-cell interference (ICI). This may be true for systems designed to operate with a frequency reuse factor of one or close to one. Such frequency re-use may imply that systems may become interference limited as many or all cells may transmit on many or all time and frequency resources simultaneously. Additionally, power boosting may not improve cell-edge performance as both the serving cell signal and the interfering signal strengths may be increased.

SUMMARY

A detailed description of illustrative embodiments will now be described with reference to the various Figures. Although this description provides a detailed example of possible implementations, it should be noted that the details are intended to be exemplary and in no way limit the scope of the application. As used herein, the article "a", absent further qualification or characterization, may be understood to mean "one or more" or "at least one", for example.

Embodiments contemplate methods and systems for communicating transmission states or CSI processes. For example, a method for determining transmission states or CSI processes may include applying at least one transmission state or CSI process parameter to channel state information (CSI). The method may also include reporting CSI based on a transmission state or CSI process and at least one transmission state or CSI process parameter applied thereto, and applying a correction factor to the at least one transmission state or CSI process.

Embodiments contemplate a wireless transmit/receive device (WTRU) that may be configured, at least in part, to identify one or more transmission points. The one or more transmission points may be configured for channel state information (CSI) reporting. The WTRU may be further configured to generate CSI for the one or more transmission points. Also, the WTRU may be configured to send the CSI to one or more nodes in communication with the WTRU. Embodiments contemplate that the one or more transmission points may include at least one antenna port in communication with the WTRU. Embodiments also contemplate that the one or more transmission points may be CSI reference signal (CSI-RS) resources.

Embodiments contemplate one or more methods that may be performed by a wireless transmit and receive unit (WTRU). One or more embodiments may include identifying K transmission points, where the K transmission points may be configured for channel state information (CSI) reporting, and where K may be an integer. Embodiments may further include generating CSI for one or more of the K transmission points. In addition, embodiments may include sending the CSI to one or more nodes in communication with the WTRU. Also, embodiments may include receiving at least one of a CSI reference signal (CSI-RS) or a common reference signal (CRS) that may be transmitted respectively by the K transmission points. Embodiments may include identifying the K transmission points based, at least in part, on the received CSI-RS or CRS. In one or more embodiments, the generating the CSI may include generating at least one of a joint rank indication or a per-point rank indication for the one or more of the K transmission points. In one or more embodiments, the generating the CSI may include generating a joint channel quality index (CQI), where the joint CQI may correspond to a joint transmission over the one or more of the K transmission points.

Embodiments contemplate a wireless transmit/receive device (WTRU) that may be configured, at least in part, to identify one or more transmission points, where the one or more transmission points may be configured for channel state information (CSI) reporting. The WTRU may be configured to determine a transmission state or CSI process for the one or more transmission points. The WTRU may be configured to generate CSI for the one or more transmission points. The WTRU may be further configured to receive an indication of the transmission state or CSI process for the respective one or more transmission points, where the indication of the transmission state or CSI process may include one or more of a transmitting state, an interfering state, a blanked state, or an unknown state, for example. The WTRU may be further configured to compare the determined transmission state or CSI process for the one or more transmission points to a predetermined transition state or CSI process for the one or more transmission points. The WTRU may also be configured to send the CSI for respective one or more transmission points to one or more nodes in communication with the WTRU upon the transmission state or CSI process of the respective one or more transmission points being in the predetermined transmission state or CSI process.

Embodiments contemplate one or more methods to configure a WTRU to calculate CQI for multiple Transmission States or CSI Cases or CSI Processes. Embodiments also contemplate one or more methods to link non-zero-power channel state information reference signals (NZP CSI-RS) in the CoMP Resource Management Set to NZP CSI-RS in the CoMP Measurement Set. Embodiments also contemplate one or more methods to configure a WTRU with a primary Transmission State or CSI Case or CSI Process, for fallback, default and/or highest priority. Embodiments also contemplate one or more methods to select physical uplink control channel (PUCCH) Format 3 resources for CSI feedback and A/N of multiple CSI Processes. And embodiments contemplate one or more methods to trigger measurement reports out-of-coordinating cluster points to limit uplink (UL) interference.

Embodiments contemplate a wireless transmit/receive unit (WTRU) that may comprise a processor. The processor may be configured with one or more channel state information (CSI) processes. The processor may be configured to receive an indication in a CSI request field. The indication may indicate at least one of the one or more CSI processes. The processor may also be configured to generate a periodic report and/or an aperiodic report corresponding to the at least one of the one or more CSI processes. The processor may also be configured to send the periodic report and/or aperiodic report via a physical uplink shared channel (PUSCH).

Embodiments contemplate a wireless transmit/receive unit (WTRU). The WTRU may be in communication with one or more serving cells. The WTRU may comprise a processor. The processor may be configured with one or more channel state information (CSI) processes for each the one or more serving cells. The processor may be configured with a period for a set of subframes. Also, the processor may be configured with an offset for the set of subframes. The processor may be configured to generate a first periodic report and/or a first aperiodic report corresponding to a first CSI process of the one or more CSI processes and a first serving cell of the one or more serving cells. And the processor may be configured to send the first periodic report and/or a first aperiodic report on the set of subframes via a physical channel including at least one of a physical uplink control channel (PUCCH) or a physical uplink shared channel (PUSCH).

Embodiments contemplate a wireless transmit/receive unit (WTRU) that may comprise a processor. The processor may be configured at least with one or more channel state information (CSI) processes. The processor may also be configured with a rank indicator (RI) associated with a first CSI process of the one or more CSI processes. The RI may be configurable to be associated with one or more CSI processes in addition to the first CSI process. The processor may be configured to at least associate the RI with at least a second CSI process. The processor may be configured to report a common RI value. The common RI value may be the RI associated with the first CSI process and the at least second CSI process.

Embodiments contemplate a wireless transmit/receive unit (WTRU). The WTRU may comprise a processor. The processor may be configured with one or more channel state information (CSI) processes. The processor may also be configured with one or more types of feedback reports corresponding to the one or more CSI processes. The processor may be configured to generate a first periodic report and/or a first aperiodic report corresponding to a first CSI process of the one or more CSI processes. The first periodic report and/or the first aperiodic report may also correspond to a rank indicator (RI) report type of the one or more report types. The processor may be configured to generate a second periodic report and/or a second aperiodic report corresponding to a second CSI process of the one or more CSI processes. The second periodic report and/or the second aperiodic report may correspond to the RI report type of the one or more report types. The processor may also be configured to send the first periodic report and/or the first aperiodic report and the second periodic report and/or the second aperiodic report. The processor may also be configured to drop one of the first periodic report and/or the first aperiodic report or the second periodic report and/or the second aperiodic report upon a collision between the first periodic report and/or the first aperiodic report and the second periodic report and/or the second aperiodic report. The first periodic report and/or the first aperiodic report and the second periodic report and/or the second aperiodic report may include an RI value applicable to both the first periodic report and/or the first aperiodic report and the second periodic report and/or the second aperiodic report.

Embodiments contemplate a wireless transmit/receive unit (WTRU) that may comprise a processor. The processor may be configured at least with one or more channel state information (CSI) processes. The processor may be configured to at least assume at least one of a physical downlink shared channel (PDSCH) transmission power for each of the one or more CSI processes, or a different ratio of PDSCH energy per resource element (EPRE) to CSI EPRE for each of the one or more CSI processes.

Embodiments contemplate an evolved node-B (eNB), where the eNB may be in communication with a wireless transmit/receive unit (WTRU). The eNB may comprise a processor. The processor may be configured to provide a configuration to the WTRU. The configuration may include one or more channel state information (CSI) processes. The configuration may also include a CSI request field. An indication associated with the CSI request field may indicate at least one of the one or more CSI processes. The processor may also be configured to receive a periodic report and/or an aperiodic report corresponding to at least one of the one or more CSI processes from the WTRU via a physical uplink shared channel (PUSCH).

Embodiments contemplate an evolved node-B (eNB) that may be in communication with a wireless transmit/receive unit (WTRU). The WTRU may be in communication with one or more serving cells. The eNB may comprise a processor. The processor may be configured to provide the WTRU with a configuration. The configuration may include one or more channel state information (CSI) processes for each of the one or more serving cells. The configuration may include a period for a set of subframes. The configuration may also include an offset for the set of subframes. The processor may be configured to receive a periodic report and/or an aperiodic report corresponding to at least one of the one or more CSI processes on the set of subframes from the WTRU via a physical uplink control channel (PUCCH).

Embodiments contemplate an evolved node-B (eNB) that may be in communication with a wireless transmit/receive unit (WTRU). The eNB may comprise a processor. The processor may be configured to at least provide the WTRU with a configuration. The configuration may include at least one or more channel state information (CSI) processes. The configuration may also include a rank indicator (RI) associated with a first CSI process of the one or more CSI processes. The RI may be configurable to be associated with one or more CSI processes in addition to the first CSI process. The processor may also be configured to receive a report including a common RI value from the WTRU. The common RI value may be the RI associated with a first CSI process and at least a second CSI process.

BRIEF DESCRIPTION OF THE DRAWINGS

The following detailed description of disclosed embodiments may be better understood when read in conjunction with the appended drawings. For the purposes of illustration, there is shown in the drawings exemplary embodiments; however, the subject matter is not limited to the specific elements and instrumentalities disclosed. In the drawings.

DETAILED DESCRIPTION OF ILLUSTRATIVE EMBODIMENTS

Figure 1A:
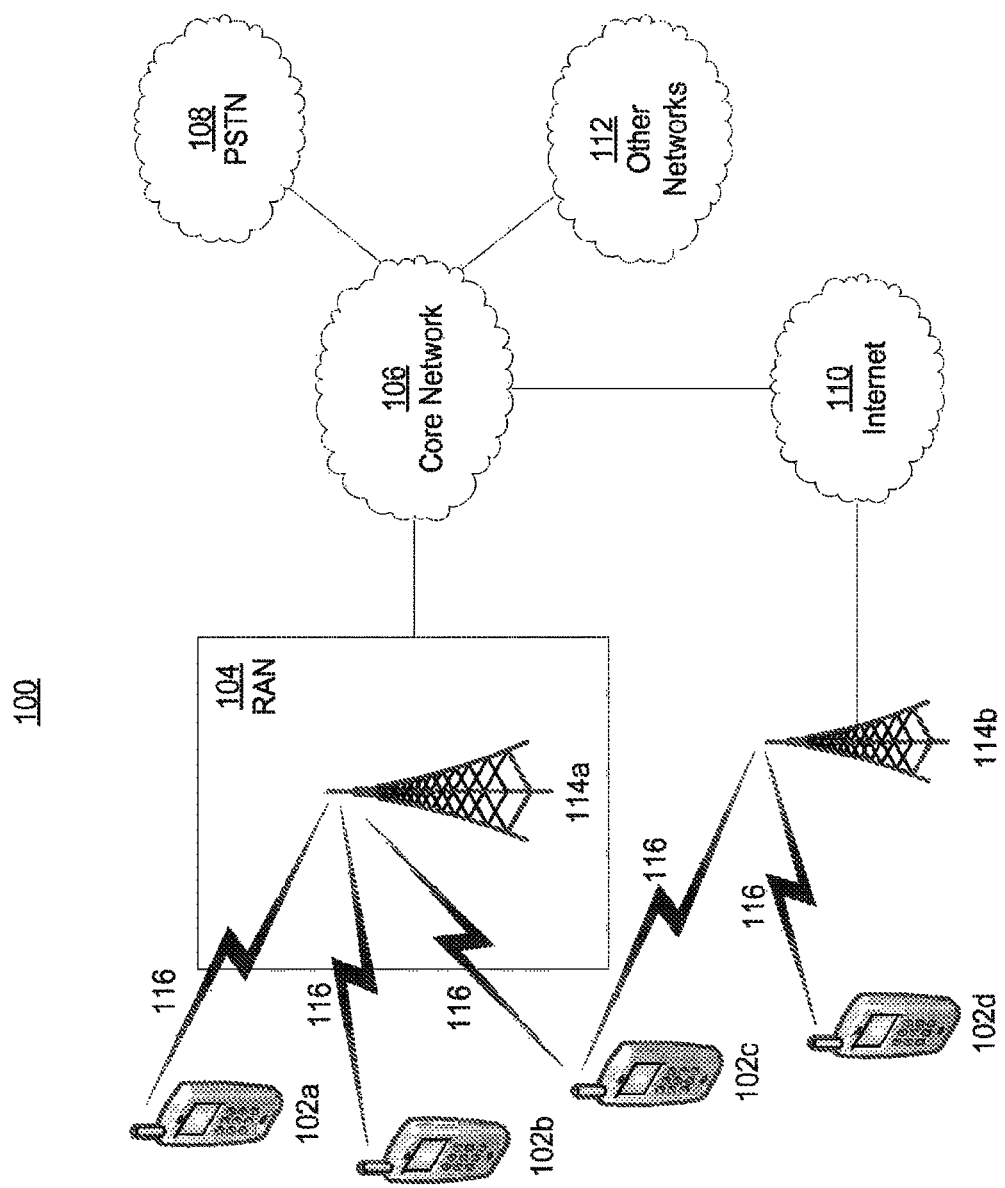
FIG. 1A is a system diagram of an example communications system in which one or more disclosed embodiments may be implemented.

FIG. 1A is a diagram of an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like. As shown in FIG. 1A, the communications system 100 may include wireless transmit/receive units (WTRUs) 102a, 102b, 102c, 102d, a radio access network (RAN) 104, a core network 106, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d may be configured to transmit and/or receive wireless signals and may include user equipment (UE), a mobile station, a fixed or mobile subscriber unit, a pager, a cellular telephone, a personal digital assistant (PDA), a smartphone, a laptop, a netbook, a personal computer, a wireless sensor, consumer electronics, and the like.

The communications systems 100 may also include a base station 114a and a base station 114b. Each of the base stations 114a, 114b may be any type of device configured to wirelessly interface with at least one of the WTRUs 102a, 102b, 102c, 102d to facilitate access to one or more communication networks, such as the core network 106, the Internet 110, and/or the networks 112. By way of example, the base stations 114a, 114b may be a base transceiver station (BTS), a Node-B, an eNode B, a Home Node B, a Home eNode B, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104, which may also include other base stations and/or network elements (not shown), such as a base station controller (BSC), a radio network controller (RNC), relay nodes, etc. The base station 114a and/or the base station 114b may be configured to transmit and/or receive wireless signals within a particular geographic region, which may be referred to as a cell (not shown). The cell may further be divided into cell sectors. For example, the cell associated with the base station 114a may be divided into three sectors. Thus, in one embodiment, the base station 114a may include three transceivers, i.e., one for each sector of the cell. In another embodiment, the base station 114a may employ multiple-input multiple output (MIMO) technology and, therefore, may utilize multiple transceivers for each sector of the cell.

The base stations 114a, 114b may communicate with one or more of the WTRUs 102a, 102b, 102c, 102d over an air interface 116, which may be any suitable wireless communication link (e.g., radio frequency (RF), microwave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104 and the WTRUs 102a, 102b, 102c may implement a radio technology such as Universal Mobile Telecommunications System (UMTS) Terrestrial Radio Access (UTRA), which may establish the air interface 116 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In another embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A).

In other embodiments, the base station 114a and the WTRUs 102a, 102b, 102c may implement radio technologies such as IEEE 802.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, and the like. In one embodiment, the base station 114b and the WTRUs 102c, 102d may implement a radio technology such as IEEE 802.11 to establish a wireless local area network (WLAN). In another embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, etc.) to establish a picocell or femtocell. As shown in FIG. 1A, the base station 114b may have a direct connection to the Internet 110. Thus, the base station 114b may not be required to access the Internet 110 via the core network 106.

The RAN 104 may be in communication with the core network 106, which may be any type of network configured to provide voice, data, applications, and/or voice over internet protocol (VoIP) services to one or more of the WTRUs 102a, 102b, 102c, 102d. For example, the core network 106 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104 and/or the core network 106 may be in direct or indirect communication with other RANs that employ the same RAT as the RAN 104 or a different RAT. For example, in addition to being connected to the RAN 104, which may be utilizing an E-UTRA radio technology, the core network 106 may also be in communication with another RAN (not shown) employing a GSM radio technology.

The core network 106 may also serve as a gateway for the WTRUs 102a, 102b, 102c, 102d to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another core network connected to one or more RANs, which may employ the same RAT as the RAN 104 or a different RAT.

Some or all of the WTRUs 102a, 102b, 102c, 102d in the communications system 100 may include multi-mode capabilities, i.e., the WTRUs 102a, 102b, 102c, 102d may include multiple transceivers for communicating with different wireless networks over different wireless links. For example, the WTRU 102c shown in FIG. 1A may be configured to communicate with the base station 114a, which may employ a cellular-based radio technology, and with the base station 114b, which may employ an IEEE 802 radio technology.

Figure 1B:
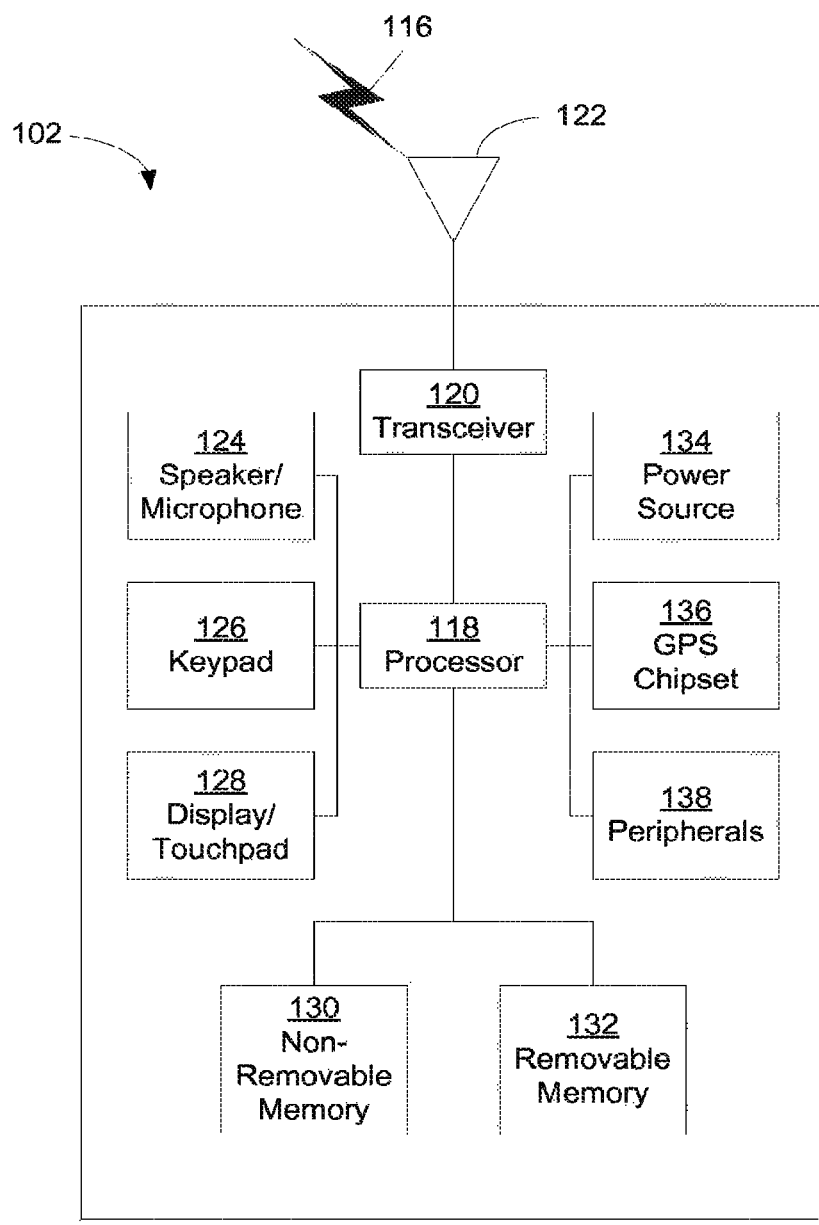
FIG. 1B is a system diagram of an example wireless transmit/receive unit (WTRU) that may be used within the communications system illustrated in FIG. 1A.

FIG. 1B is a system diagram of an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and other peripherals 138. It will be appreciated that the WTRU 102 may include any subcombination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In another embodiment, the transmit/receive element 122 may be an emitter/detector configured to transmit and/or receive IR, UV, or visible light signals, for example. In yet another embodiment, the transmit/receive element 122 may be configured to transmit and receive both RF and light signals. It will be appreciated that the transmit/receive element 122 may be configured to transmit and/or receive any combination of wireless signals.

In addition, although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 1C:
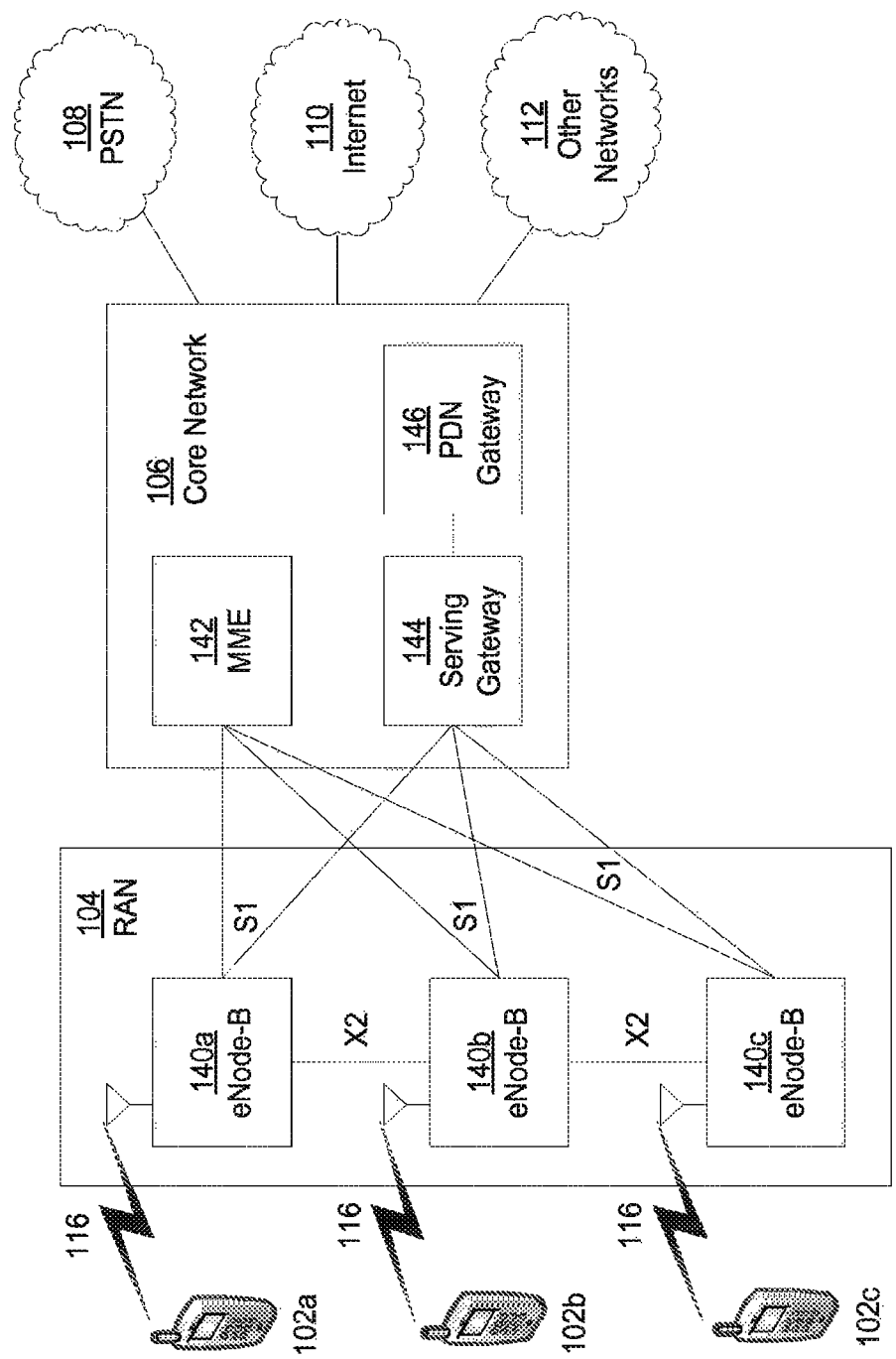
FIG. 1C is a system diagram of an example radio access network and an example core network that may be used within the communications system illustrated in FIG. 1A.

FIG. 1C is a system diagram of the RAN 104 and the core network 106 according to an embodiment. As noted above, the RAN 104 may employ an E-UTRA radio technology to communicate with the WTRUs 102a, 102b, 102c over the air interface 116. The RAN 104 may also be in communication with the core network 106.

The RAN 104 may include eNode-Bs 140a, 140b, 140c, though it will be appreciated that the RAN 104 may include any number of eNode-Bs while remaining consistent with an embodiment. The eNode-Bs 140a, 140b, 140c may each include one or more transceivers for communicating with the WTRUs 102a, 102b, 102c over the air interface 116. In one embodiment, the eNode-Bs 140a, 140b, 140c may implement MIMO technology. Thus, the eNode-B 140a, for example, may use multiple antennas to transmit wireless signals to, and receive wireless signals from, the WTRU 102a.

Each of the eNode-Bs 140a, 140b, 140c may be associated with a particular cell (not shown) and may be configured to handle radio resource management decisions, handover decisions, scheduling of users in the uplink and/or downlink, and the like. As shown in FIG. 1C, the eNode-Bs 140a, 140b, 140c may communicate with one another over an X2 interface.

The core network 106 shown in FIG. 1C may include a mobility management gateway (MME) 142, a serving gateway 144, and a packet data network (PDN) gateway 146. While each of the foregoing elements are depicted as part of the core network 106, it will be appreciated that any one of these elements may be owned and/or operated by an entity other than the core network operator.

The MME 142 may be connected to each of the eNode-Bs 142a, 142b, 142c in the RAN 104 via an S1 interface and may serve as a control node. For example, the MME 142 may be responsible for authenticating users of the WTRUs 102a, 102b, 102c, bearer activation/deactivation, selecting a particular serving gateway during an initial attach of the WTRUs 102a, 102b, 102c, and the like. The MME 142 may also provide a control plane function for switching between the RAN 104 and other RANs (not shown) that employ other radio technologies, such as GSM or WCDMA.

The serving gateway 144 may be connected to each of the eNode Bs 140a, 140b, 140c in the RAN 104 via the S1 interface. The serving gateway 144 may generally route and forward user data packets to/from the WTRUs 102a, 102b, 102c. The serving gateway 144 may also perform other functions, such as anchoring user planes during inter-eNode B handovers, triggering paging when downlink data is available for the WTRUs 102a, 102b, 102c, managing and storing contexts of the WTRUs 102a, 102b, 102c, and the like.

The serving gateway 144 may also be connected to the PDN gateway 146, which may provide the WTRUs 102a, 102b, 102c with access to packet-switched networks, such as the Internet 110, to facilitate communications between the WTRUs 102a, 102b, 102c and IP-enabled devices.

The core network 106 may facilitate communications with other networks. For example, the core network 106 may provide the WTRUs 102a, 102b, 102c with access to circuit-switched networks, such as the PSTN 108, to facilitate communications between the WTRUs 102a, 102b, 102c and traditional land-line communications devices. For example, the core network 106 may include, or may communicate with, an IP gateway (e.g., an IP multimedia subsystem (IMS) server) that serves as an interface between the core network 106 and the PSTN 108. In addition, the core network 106 may provide the WTRUs 102a, 102b, 102c with access to the networks 112, which may include other wired or wireless networks that are owned and/or operated by other service providers.

In order to support higher data rate and spectrum efficiency, among other rationale, the Third Generation Partnership Project (3GPP) Long Term Evolution (LTE) system has been introduced into 3GPP Release 8 (R8) (LTE Release 8 may be referred to herein as LTE R8 or R8-LTE). In LTE, transmissions on the uplink may be performed using Single Carrier Frequency Division Multiple Access (SC-FDMA). In particular, the SC-FDMA that may be used in the LTE uplink may be based on Discrete Fourier Transform Spread Orthogonal Frequency Division Multiplexing (DFT-S-OFDM) technology. As used herein, the terms SC-FDMA and DFT-S-OFDM may be used interchangeably.

In LTE, a wireless transmit/receive unit (WTRU), alternatively referred to as a user equipment (UE), may transmit on the uplink using limited, contiguous set of assigned sub-carriers in a Frequency Division Multiple Access (FDMA) arrangement, and in some embodiments perhaps only a limited, contiguous set of assigned sub-carriers in a Frequency Division Multiple Access (FDMA) arrangement. For example, if the overall Orthogonal Frequency Division Multiplexing (OFDM) signal or system bandwidth in the uplink is composed of useful sub-carriers numbered 1 to 100, a first given WTRU may be assigned to transmit on sub-carriers 1-12, a second WTRU may be assigned to transmit on sub-carriers 13-24, and so on. While the different WTRUs may each transmit into a subset of the available transmission bandwidth, and perhaps may each may transmit into only a subset of the available transmission bandwidth, an evolved Node-B (eNodeB) serving the WTRUs may receive the composite uplink signal across the entire transmission bandwidth.

LTE Advanced (which includes LTE Release 10 (R10) and may include future releases such as Release 11, also referred to herein as LTE-A, LTE R10, or R10-LTE) is an enhancement of the LTE standard that provides a fully-compliant 4G upgrade path for LTE and 3G networks. In LTE-A, carrier aggregation may be supported, and, unlike in LTE, multiple carriers may be assigned to the uplink, downlink, or both.

Embodiments recognize that coordinated multi-point operation (CoMP) in the downlink may refer to a set of possible schemes wherein transmissions from multiple geographically separated transmission points may be coordinated to improve system performance in terms of cell-edge throughput and/or system throughput. Examples of such schemes include Joint Transmission, wherein multiple points may simultaneously transmit information intended for a WTRU; Dynamic Point Selection, wherein one of a set of points may be dynamically selected for transmission to a WTRU; and Coordinated Scheduling/Coordinated Beamforming, wherein interference towards a WTRU being scheduled from a first point may be avoided by proper coordination of interfering transmissions from a second point.

In both LTE and LTE-A, as well as other wireless systems, system performance may be evaluated based on average cell throughput and/or cell-edge throughput. While average cell throughput performance can be improved by increasing the received signal strength using power boosting techniques, the cell-edge users may experience low received signal strength and the cell edge performance may therefore be primarily affected by inter-cell interference (ICI). This may be especially true for the systems designed to operate with a frequency reuse factor of one or close to one, which is contemplated by OFDM-based 4G networks.

Embodiments contemplate that a wireless system may be evaluated based on its average cell throughput and/or its cell-edge throughput. Embodiments contemplate the improvement of the cell average and/or cell-edge performance. Average cell performance may be improved by increasing the received signal strength using power boosting techniques. However, the cell-edge users may experience low received signal strength and the cell edge performance may therefore be affected by inter-cell interference (ICI). This may be especially common in systems designed to operate with a frequency reuse factor of one or close to one, which may be implemented by OFDM-based 4G networks. Such frequency re-use may result in systems that become especially interference limited when many or all cells transmit on many, or perhaps all, time and frequency resources simultaneously. Embodiments recognize that power boosting may not improve cell-edge performance, perhaps because both the serving cell signal and the interfering signal strengths may be increased, which may in turn increase ICI, for example.

Embodiments contemplate other techniques that may be used to improve cell-edge performance, such as coordinated multi-point (CoMP) transmission and reception. In multi-point transmission and reception embodiments, transmission or reception from antennas not in "close proximity" may be implemented, where "close proximity" may be a distance beyond the spacing of a few wavelengths such that most antennas, or perhaps all antennas, may be subject to different long-term fading. In such a transmission mode, several cells or transmission points may combine to improve the received Signal-to-Interference-Noise-Ratio (SINR) at a WTRU.

Embodiments contemplate that the term "serving cell" may be used for a single cell transmitting Physical Downlink Control Channel (PDCCH) assignments, for example, as defined in LTE R8 (a single cell). Embodiments also contemplate that several CoMP categories may be used, including joint processing (JP), where the data may be available at each point in a CoMP cooperating set. In JP embodiments, joint transmission (JT) may be used, where Physical Downlink Shared Channel (PDSCH) transmissions may be sent from multiple points, such as part of a CoMP cooperating set, or perhaps an entire CoMP cooperating set, at one time. Data to a single WTRU may be simultaneously transmitted from multiple transmission points, for example, to (coherently or non-coherently) improve the received signal quality and/or actively cancel interference for other WTRUs. Also embodiments contemplate that in JP, dynamic cell selection may be used, where PDSCH transmissions may be sent from one point within a CoMP cooperating set at one time, for example.

Another CoMP category may be coordinated scheduling/coordinated beamforming (CS/CB), where the data may be available at the serving cell (i.e., data transmission is only performed from that point), and in some embodiments may only be available at the serving cell, but user scheduling/beamforming decisions may be made with coordination among cells corresponding to a CoMP cooperating set.

Embodiments contemplate that at least one CoMP category may include cell aggregation. Some transmission points or each transmission point may have independent data to transmit to the WTRU on the same carrier frequency. Some cells or each cell may have its own data and/or signal flow to and from the WTRU. For example, some cells or each cell may use independent HARQ processes.

Embodiments contemplate that one or more CoMP sets may include a CoMP cooperating set, where a set of geographically separated points are directly or indirectly participating in PDSCH transmission to a WTRU. This set may or may not be transparent to a WTRU. Another CoMP set may be CoMP transmission point(s), which may be a point or set of points that may be actively transmitting PDSCH to a WTRU. The set of CoMP transmission point(s) may be a subset of the CoMP cooperating set. In JT embodiments, CoMP transmission points may be the points in the CoMP cooperating set. For dynamic cell selection embodiments, a single point may be the transmission point in some subframes, or perhaps in every subframe. This single transmission point may change dynamically within the CoMP cooperating set. For CS/CB embodiments, the CoMP transmission point may correspond to a "serving cell", for example.

Embodiments contemplate other CoMP sets that may include a CoMP measurement set that may be a set of cells for which channel state/statistical information (related to their link to the WTRU) may be reported. In some embodiments, a CoMP measurement set may be the same as the CoMP cooperating set. Actual WTRU reports may include feedback for a subset of cells of the CoMP measurement cells, and in some embodiments may only include feedback for a subset of cells of the CoMP measurement cells, which may be referred to as reported cells.

Embodiments contemplate that channel state information (CSI) feedback may be reported in the format of rank (e.g., rank indicator (RI)), precoder matrix index (PMI), and/or channel quality indicator (CQI), where PMI may be calculated at the WTRU by quantizing the channel against a pre-defined codebook, for example. CSI feedback may include CQI/PMI/RI reports and may be provided on either a periodic or an aperiodic basis. Parameters that may be used to control the information reported by the WTRU may be based on the system bandwidth and/or may be provided in radio resource control (RRC) Connection Setup, Reconfiguration, and/or Reestablishment messages. The information reported by a WTRU may vary based on the transmission mode, which may be defined in the same RRC messages. Table 1 contains a summary of exemplary reporting modes contemplated by embodiments.

TABLE 1

Exemplary Reporting Modes

| Transmission Mode | Aperiodic Feedback | Periodic Feedback |
|---|---|---|
| 1: Port 0<br>2: Tx Diversity<br>3: Open Loop SM (large delay CDD) (or Tx Diversity)<br>7: Port 5 (or port 0 or Tx Div)<br>8 (without PMI): Port 7/8 (or single port or Tx Div): Release 9 only | Mode 2-0: UE selected sub band CQI: WB CQI + CQI over M best subbands.<br>Mode 3-0: HL configured sub band CQI: WB CQI + sub-band CQI.<br>Note - CQI for first CW only, No PMI | Mode 1-0: WB CQI<br>Mode 2-0: UE Selected sub band CQI: WB CQI + UE reports CQI in preferred sub-band in each BW part, one BW part in each reporting opportunity.<br>Note - CQI for first CW only, No PMI |
| 4: Closed Loop SM (or Tx Div)<br>6: Closed Loop Rank 1 Precoding (or Tx Div)<br>8 (with PMI): Port 7/8 (or single port or Tx Div): Release 9 only | Mode 1-2: WB CQI/Multiple PMI: CQI for each CW; PMI for each sub-band.<br>Mode 2-2: UE selected sub band CQI/ Multiple PMI: CQI per CW and PMI, both over full BW and M best sub-bands.<br>Mode 3-1: HL configured sub band CQI/Single PMI: WB CQI + sub-band CQI, both per CW. | Mode 1-1: WB CQI/Single PMI<br>Mode 2-1: UE selected sub-band CQI/ Single PMI ($N^{DL}_{RB} >7$ only): WB CQI/PMI + UE reports CQI in preferred sub-band in each BW part |
| 5: MU-MIMO (or Tx Div) | Mode 3-1: HL configured sub band CQI/Single PMI (see above) | |

Figure 2:
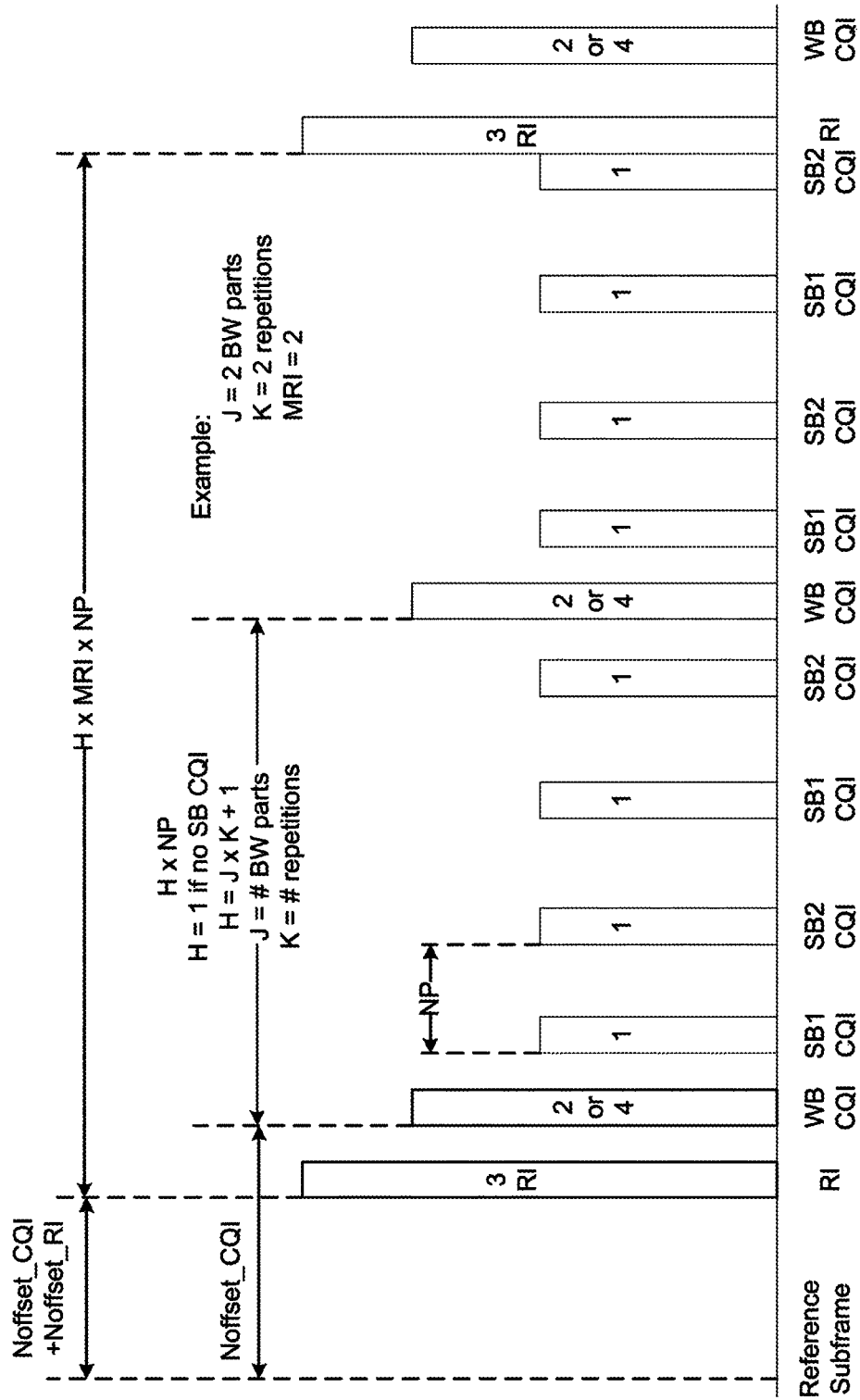
FIG. 2 illustrates an example periodic feedback reporting sequence consistent with embodiments.

Embodiments contemplate that periodic feedback may be transmitted on the Physical Uplink Control Channel (PUCCH) channel, although it may be sent on the Physical Uplink Shared Channel (PUSCH) channel when that channel exists. Periodic reporting may use a sequence of one or more different types of reports. Such types may include "Type 1" that may report sub-band CQI, "Type 2" that may report wideband CQI/PMI, "Type 3" that may report RI, and "Type 4" that may report wideband CQI, for example. An exemplary reporting sequence is illustrated in FIG. 2, where the number in each rectangle corresponds to the report type described above. In one or more embodiments, aperiodic feedback may be requested by Format 0 downlink control information (DCI) or a random access response (RAR) when a CQI Request bit is set. In one or more embodiments, aperiodic feedback may be transmitted on the PUSCH channel.

Embodiments contemplate that the types of periodic PUCCH feedback may be further extended for 8 transmit (Tx) antenna ports. Such types of periodic PUCCH feedback may include a "Type 1" report that may support CQI feedback for WTRU selected sub-bands, a "Type 1a" report that may support sub-band CQI and second PMI feedback, a "Type 2", "Type 2b", and "Type 2c" report that may support wideband CQI and PMI feedback, a "Type 2a" report that may support wideband PMI feedback, a "Type 3" report that may support RI feedback, a "Type 4" report that may support wideband CQI, a "Type 5" report that may support RI and wideband PMI feedback, and a "Type 6" report that supports RI and PTI feedback. CSI feedback, such as that used in LTE R8 and R10 for example, may be designed to support single-cell operation and Physical Downlink Shared Channel (PDSCH) scheduling. The CSI feedback may represent the channel between itself and the serving cell and may be reported to the serving cell, and in some embodiments perhaps only to the serving cell.

Embodiments contemplate that or more WTRU feedback procedures may be intended for single cell downlink operation. Embodiments recognize that, for CoMP operation, a WTRU may be required to provide multiple feedbacks containing CSI information of different CoMP cells or transmission points needed for various functions such as CoMP set determination, CoMP activation/deactivation, and/or downlink scheduling/beamforming. Several feedback configuration embodiments for CoMP implementations are contemplated. One or more embodiments contemplate addressing both aspects of content and the rate of the feedback mechanisms.

Embodiments recognize that some feedback procedures defined up to R10 may be optimized for the case where some or all transmission points (or antenna ports) of the cell may be geographically close to each other. In deployments utilizing remote radio heads (RRH), a set of geographically separated RRHs may utilize the same physical cell identity. In this scenario, using the WTRU to report CSI of some or all deployed antenna ports of a same cell using R10 methods may be inefficient because the channel quality for some antenna ports is likely to be much weaker than for other antenna ports. Furthermore, the signals transmitted from different RRHs may have different characteristics which need to be taken into account by the WTRU in the evaluation of CSI.

Embodiments contemplate techniques that may allow a WTRU to efficiently report the CSI for multiple transmission points. For example, embodiments contemplate techniques that a WTRU may employ to efficiently report CSI feedback (e.g., reduces the amount of unnecessary reporting of CSI information). Further, for example, embodiments contemplate how the WTRU may estimate the CSI for sets of transmission points that may not be geographically co-located.

Embodiments recognize that CSI may be evaluated and reported assuming that reference signals are transmitted from a set of closely separated antennas from a same physical transmission point, and which therefore may share the same long-term path loss between them and the WTRU. Where this assumption may not be satisfied, the CSI may not be useful (or optimum) to the network for scheduling purposes. For instance, the network may not be able to determine which transmission point or set of transmission points may be the most appropriate for scheduling the UE in a particular instance.

Embodiments also recognize that the set of transmission points that may be appropriate for CoMP operation may be dependent on the location of the WTRU in the cell. Embodiments contemplate one or more techniques for determining appropriate set(s) of transmission points, and/or the associated sets of reference signals (e.g., CSI-RS) which may be configured for the WTRU, for example.

As referred to herein, the phrase "transmission point" may refer to any antenna port or subset of geographically co-located antenna ports from the network that may be transmitting to, or receiving from the WTRU. The set of transmission points configured or activated for a given WTRU may or may not belong to the same physical cell identity. A transmission point may transmit one CSI-RS or one set of CSI-RS. Embodiments contemplate that the phrase "CSI-RS-resource" or "non-zero-power CSI-RS-resource" may refer to a set of CSI-RS reference signals and/or antenna ports that may be transmitted from one transmission point or one set of transmission points. In one or more embodiments, characteristics of these reference signals may be provided to the WTRU by higher layers, such as RRC signaling, for example. A WTRU may be configured with one or multiple CSI-RS resources for the purpose of CSI evaluation and reporting. The phrase "transmission point" may be used alternatively with the phrase "CSI-RS resource" where, in one or more embodiments, the CSI-RS-resource may correspond to the transmission point. A transmission point may also transmit at least one common reference signal (CRS) and a WTRU may also measure the at least one CRS for the purpose of CSI evaluation and/or reporting, among other purposes, for example.

Also as referred to herein, a CSI-RS-resource may be a set of CSI-RS reference signals or antenna ports that may be transmitted from one transmission (or possibly multiple transmission points). The characteristics of these reference signals may be provided to the WTRU by higher layers. The WTRU may be configured with one or multiple CSI-RS resources for the purpose of CSI evaluation and/or reporting, for example. As described previously, the expression "transmission point" may be substituted by "CSI-RS-resource" where it may be understood that the CSI-RS-resource may correspond to the transmission point. Also herein, a Per-point rank indication (RI) may correspond to a recommended number of useful transmission layers (or rank) for a transmission from one transmission point. The per-point RI may equivalently be referred to as "per-CSI-RS-resource RI" perhaps if the concerned CSI-RS-resource may be used for the CSI measurement, or "per-CRS" or "per-cell" RI perhaps if CRS may be used for the CSI measurement.

Further, as referred to herein, per-point CQI may correspond to a channel quality indicator (CQI) that may be applicable to the transmission of a codeword (or PDSCH transport block) from one transmission point. The per-point CQI may equivalently be referred to as "per-CSI-RS-resource CQI" perhaps if the concerned CSI-RS-resource may be used for the CSI measurement, or "per-CRS" or "per-cell" CQI perhaps if a common reference signal (CRS) may be used for the CSI measurement.

As referred to herein, a per-point pre-coding matrix indicator (PMI) or a local precoding matrix indicator may correspond to a recommended precoding matrix (or pre-coder) for a transmission from one transmission point. The per-point PMI may equivalently be referred to as "per-CSI-RS-resource PMI" perhaps if the concerned CSI-RS-resource may be used for the CSI measurement, or "per-CRS" or "per-cell" PMI perhaps if CRS may be used for the CSI measurement. For the same CSI-RS-resource or point, embodiments contemplate that there may be more than one pre-coding matrix indicator jointly indicating a single pre-coding matrix (e.g. a first pre-coding indicator and a second pre-coding indicator, where the latter may vary more rapidly than the former in time).

Also, as referred to herein, joint rank indication or common rank indication may correspond to a recommended number of useful transmission layers for a joint transmission from more than one transmission point, which may be corresponding to more than one CSI-RS-resource, for example.

Aggregated CQI or Joint CQI may correspond to a CQI that may be applicable to a joint transmission of a codeword from more than one transmission point, which may be corresponding to more than one CSI-RS-resource. The aggregated CQI may be estimated assuming a certain pre-coding vector or matrix is used at some or each transmission point corresponding to a CSI-RS resource. The aggregated CQI may also be estimated assuming a certain relationship between the precoders used in the transmission points corresponding to these CSI-RS-resources. For instance, it may be assumed that the relative phase between the pre-coders is such that the signals from the transmission points combine coherently (with a zero phase difference) or combine with a pre-determined phase difference, among other contemplated assumptions.

As referred to herein, aggregated PMI or global PMI may correspond to a recommended precoding matrix for a transmission from more than one transmission point, which may be corresponding to more than one CSI-RS-resource. The dimensions of the recommended pre-coding matrix may correspond to the total number of antenna ports from the at least one CSI-RS-resource, times the number of layers (or rank), for example.

As referred to herein, inter-point phase indicator or combining indicator may correspond to a recommended inter-point phase difference for at least one transmission layer, for at least one pair of precoding matrices that may be used in transmission points. The inter-point phase indicator may equivalently be referred to as "inter-CSI-RS-resource indicator" perhaps if the concerned set of CSI-RS-resources may be used for the CSI measurement, or "inter-CRS" or "inter-cell" CQI perhaps if a common reference signal (CRS) may be used for the CSI measurement.

Also, as referred to herein, the term "CSI of a set of transmission points" may refer to any type of channel state information derived from any subset of this set of transmission points. For example, it may include channel quality information, rank indication, precoding matrix indications, and/or any type of explicit or implicit feedback. It may also include a type of channel state information, heretofore undefined, that is a function of more than one transmission point, as disclosed herein.

Embodiments contemplate devices and techniques, which can be used individually or in combination, to efficiently evaluate and/or report CSI pertaining to transmission points that may be geographically separated. In one or more embodiments, the WTRU may report the CSI of different transmission points (or CSI-RS-resources), or subsets thereof, that are configured for CSI reporting in different subframes. The subsets of transmission points may be determined based on one or more of: receiving the transmission points (or corresponding reference signals such as CSI-RS) that are part of each subset from higher layers (e.g., RRC signalling or MAC signalling); and/or one or more characteristics of signals received from the transmission points. For example, a characteristic of a signal may include, but is not limited to: the CSI-RS (channel state indicator reference signal) transmitted from each Tx point; the CRS (common reference signal) transmitted from each point; the physical cell identity used to derive a reference signal transmitted from some points or each point (e.g., a subset of transmission points may be defined to correspond to some or all transmission points from a specific cell; and a quality metric (such as received signal strength, received signal quality, and/or channel quality information) of a signal received from each transmission point.

For example, two subsets of transmission points may be defined, where one may correspond to transmission points received at a relatively high power level (an "active" subset—for example) for which accurate and timely CSI information may be required, and the other may correspond to transmission points received at a relatively low level (a "monitored" subset—for example) for which CSI information may not be required, at least not very frequently. The network could determine which transmission points is/are part of each subset and indicate the active and monitored subsets of Tx points using radio resource control signalling. Alternatively, the WTRU could determine whether a transmission point may belong to the active or the monitored group by determining whether the received signal strength is above or below a threshold (and in some embodiments, perhaps above or below a threshold for a predefined period of time) which could be signalled by the network through higher layers, and/or be function of the received signal strength of the best transmission point, for example. The configuration of the active set can be done, for example, by providing a set of non-zero-power CSI-RS-resources and/or, in some embodiments, a set of cell identities to the WTRU.

In another example, a first subset of transmission points (the "serving" subset—for example) may be defined as the set of transmission points used by the serving cell of the WTRU, while other subsets of transmission points ("non-serving" subsets—for example) may be defined according to the cells from which they are transmitted. In another example, one subset may contain a single specific transmission point identified as a "serving" transmission point, while at least one other subset may contain at least one transmission point identified as "assisting" transmission point. The subframes for which the WTRU reports CSI of a specific subset of transmission points may be determined by a specific function of the system frame number and subframe number. For example, the function may be defined such that subframes for which at least a portion of the CSI of a specific subset of transmission points is reported may occur periodically. Embodiments recognize that different portions of the CSI for the same transmission point (e.g. the RI and the PMI/CQI) may use different periodic sets of subframes. The periodicity (and/or offset) may be different for different subsets of transmission points or different types or portions of the CSI. This could allow, for example, the WTRU to send CSI more frequently for a first subset of transmission points (the "active" subset or the "serving" subset) than for a second subset of transmission points (the "monitored" subset or the "non-serving" subset). The parameters of the specific function determining in which subframes a specific subset are reported may be provided by higher layers (e.g. RRC signaling). For instance, higher layers may provide the periodicity and offset for each subset of transmission points and/or portions of CSI, perhaps through a single index from which these parameters can be derived. Embodiments also contemplate the periodicity of a second subset may be determined as a pre-determined or signaled multiple of the periodicity of a first subset. Also by way of example, one or more embodiments contemplate that for certain subsets there may be no periodic reporting at all. For these subsets, CSI may be reported if an aperiodic CQI/CSI request is received by the WTRU, and in some embodiments perhaps may only be reported if an aperiodic CQI/CSI request is received by the WTRU.

Embodiments contemplate that the type of CSI that may be reported for a certain subset of transmission points may be different than for other subsets of transmission points. More generally, the CSI reporting mode that may define which part of the CSI is reported in which subframe may be different for each subset of transmission point. For example, CSI feedback of a first subset of transmission points can be configured for PUCCH CSI reporting mode 2-1 (where sub-band CQI may be reported) while CSI feedback of a second subset of transmission points can be configured for PUCCH CSI reporting mode 1-1 (where wideband CQI may be reported). In another example, the CSI feedback of a first set of transmission points can be configured for PUSCH reporting mode 2-2 (where sub-band PMI and CQI may be reported) while CSI feedback of a second subset of transmission points can be configured for PUSCH reporting mode 1-2 (where wideband CQI and sub-band PMI may be reported) or PUSCH reporting mode 3-1 (where wideband PMI and sub-band CQI may be reported).

One or more embodiments contemplate that the WTRU may also report CSI of a specific subset in a given subframe (n) if it received an aperiodic CSI request in a previous subframe (n-k) where k may be pre-defined or signaled. Such aperiodic CSI request may, for example, be signaled at the physical layer by setting a specific field of downlink control information (DCI) to at least one of a subset of values, where the DCI may be signaling an uplink grant and may be transmitted over a PDCCH or another downlink control channel, such as an enhanced control channel (E-PDCCH). The subset (or set of subsets) for which the WTRU may report CSI may be determined and/or derived according to one or more of: (1) a characteristic of the downlink transmission containing the aperiodic CSI request; (2) the timing of the subframe where the request is received (n-k) or of the subframe where the CSI is to be reported (n), possibly expressed in terms of a system frame number and subframe number; (3) the set of CSI-RS that are received (transmitted) in the same subframe as the aperiodic CSI request, or the set of CSI-RS that are received or transmitted in x-y subframe as the aperiodic CSI request, where x is the subframe in which the aperiodic CSI request is received and y is a predetermined, or configured value; (4) the set of CSI-RS that are received (transmitted) in the same subframe as the aperiodic CSI request, or the set of CSI-RS that are received or transmitted in x-y subframe as the aperiodic CSI request, where x is the subframe in which the aperiodic CSI request is received and y is a predetermined, or configured value; (5) the set of CSI-RS that are received (transmitted) in the same subframe as the aperiodic CSI request, or the set of CSI-RS that are received or transmitted in x-y subframe as the aperiodic CSI request, where x is the subframe in which the aperiodic CSI request is received and y is a predetermined, or configured value; (6) a characteristic of the uplink transmission indicated by the downlink control signaling that contained the aperiodic CSI request; and/or (7) a combination of the above, such as reserving a code-point of the aperiodic CSI request field to indicate that the subset of transmission points for which CSI is to be reported corresponds to the subset of transmission points used for the transmission of the downlink control signaling indicating the aperiodic CSI request.

In an example, a characteristic of the downlink transmission containing the aperiodic CSI request may include, but is not limited to: (1) an indication from the downlink control signaling (such as PDCCH) containing the aperiodic CSI request for the UE (e.g., the indication may be provided by specific codepoint(s) of an existing field, such as the CQI request field, or possibly of a field in a heretofore undefined DCI format); (2) the transmission point(s) used for the transmission of the downlink control signaling (such as an evolved PDCCH for example) containing the aperiodic CSI request (e.g., in case downlink control signaling is conveyed through an enhanced control channel, the subset of transmission points for which the WTRU reports CSI could correspond to the set of transmission points used in the transmission of the enhanced control channel; (3) the cell from which the downlink control signaling containing the aperiodic CSI request is transmitted (e.g., the WTRU may report the CSI of the subset of transmission points corresponding to this cell, and in some embodiments the WTRU may only report the CSI of the subset of transmission points corresponding to this cell); and/or (4) the subset of cells for which the feedback is to be provided according to the value of the CSI request field (e.g. the WTRU may report the CSI of the subset of transmission points corresponding to subset of cells).

One or more embodiments contemplate that the WTRU may report, in a given subframe, the CSI for a subset of transmission points determined according to one or more of: (1) determining a maximum number M of transmission points or subsets of transmission points and/or subset of CSI-RS-resources for which to report CSI. This value may be pre-determined or signaled by higher layers; and/or (2) selecting up to M transmission points or subset thereof, for which the value(s) of an associated metric are the largest values among all transmission points (or subset thereof) configured for CSI reporting, and/or which may be above a certain threshold. The associated metric may be representative of the quality of a signal received from the corresponding transmission point(s) and/or the expected performance of a transmission over these transmission points. In one or more embodiments, the metric may be associated to each transmission point or each subset of transmission points.

Embodiments also contemplate that a single metric may be associated to the selection of M transmission points. For example, the selection of transmission points may be based on one or more of: (1) the wideband CQI from the transmission point, or the best possible wideband CQI over precoding matrices for the subset of transmission points; (2) the sub-band CQI if the report is for a particular sub-band, or the maximum of the sub-band CQI over sub-bands, using the best precoding matrix (for a subset of transmission points); (3) the received signal strength (RSRP) from the transmission point(s); (4) the received signal quality (RSRQ) from the transmission point(s); (5) the expected throughput for a hypothetical transmission from the selected transmission points; and/or (6) the maximum rank for a hypothetical transmission from the selected transmission points, wherein the same or different layer(s) and/or flow(s) may be received from some transmission points or each transmission point.

Embodiments contemplate that the WTRU may choose to select up to M transmission points according to one or more of: (1) selecting the transmission point that provides the best channel quality as measured by, for example CQI, RSRP, and/or RSRQ, etc. or the like, possibly assuming at least one precoding matrix; and (2) adding another transmission point to the reported set of transmission points if the performance metric (such as throughput or SINR etc.) is improved by no less than a pre-defined threshold, and in some embodiments perhaps only if the performance metric (such as throughput or SINR etc.) is improved by no less than a pre-defined threshold. In one or more embodiments, the metric associated to the selection of M transmission points as described herein may persist for a predefined period of time. For example, if the metric relies on the CQI report, a transmission point may be selected if the measured quantity is above/below a threshold for a period of time.

Embodiments contemplate that an activation state may be defined for transmission point(s) or subset(s) thereof. In a given subframe, the WTRU may report the CSI for transmission point(s) and/or subset(s) thereof, which are in the "active" state. In one or more embodiments, the WTRU may not measure quality of reference signal(s) associated to non-active transmission point(s) or subset(s) thereof. The activation state may be determined using one or more of: (1) setting the initial activation state following configuration of transmission point(s) or subset(s) thereof to either "active" or "non-active"; and/or (2) explicit activation or de-activation through reception an activation or de-activation command. The command may be conveyed by, for example, physical layer signaling such as from the reception of a PDCCH control signaling (e.g., a DCI) with one or more of the following characteristics: the DCI is scrambled using a Radio-Network Identifier (RNTI) which may indicate the use of at least one CoMP function; the DCI indicates at least one radio resource assignment (e.g. a downlink assignment) such that said assignment indicates that CoMP is applicable for the transmission; and/or any of the above characteristic where said signaling may include an indication (e.g. a bit) for activation and/or deactivation of at least one CoMP function. Further, the command may be conveyed by one or both of MAC layer signaling (e.g. MAC control element); and/or RRC signaling. Embodiments contemplate that implicit de-activation may occur when one or more conditions are detected, such as, for example: a metric associated to the transmission point, or subset thereof, falls below a threshold; the WTRU reports one or more measurements that may trigger the network to start utilizing the transmission point, or subset thereof, for transmission to the WTRU; and/or a timer that was started (or re-started) at the last transmission from the network utilizing the transmission point(s), or subset thereof, expires.

For one or more of the signaling methods described previously, one or more embodiments contemplate that the WTRU may transmit a HARQ A/N to acknowledge the activation/deactivation of the CoMP function. In addition, the signaling procedure may be built based on an index table, (e.g. 00, 01, 10, 11) to a configuration of the CSI reporting/mode and/or reporting CoMP Set, and/or feedback format, and/or feedback resource to use, for example.

Embodiments contemplate techniques that may be used to indicate a set of transmission points in the uplink for the purpose of CSI reporting or measurement reporting, and/or in downlink control signaling (such as a DCI format of a PDCCH or enhanced PDCCH) for the purpose of aperiodic CSI request or data transmission. For example, the WTRU may indicate (or may have indicated to it) the transmission point(s) or subset(s) of transmission points by a bitmap where each bit position may correspond to a specific transmission point or subset thereof. In another example, the subset of transmission point(s) may implicitly be indicated by a characteristic of transmission of the concerned signaling, such as, the timing of the subframe of the transmission of the concerned signaling (CQI report, DCI, etc.), and the transmission points used for the transmission of the concerned signaling. In another example, a pre-defined sequence of bits may be used to replace the CSI of transmissions points for which CSI is not reported. In another example, an index may be associated with some or each CSI-RS-resource in the configuration. The WTRU may report this index together with the associated CSI report. The index may be explicitly provided or implicitly determined in the WTRU according to the order of the received configurations in the RRC message, for example.

Embodiments contemplate components of the CSI feedback of a set of K transmission points. The measurements that may be used as a basis for the determination of CSI feedback may be derived from at least one of a set of following signals: CSI-RS reference signals; CRS reference signals; and/or other types of reference signals. Such reference signals may be transmitted on a number $A_k$ of (reference signal) antenna ports for the kth transmission point of the set. The configuration of antenna ports for some or each transmission point, as well as one or more mapping techniques for the associated reference signals, are contemplated by embodiments.

One or more embodiments contemplate that the WTRU may report a "Joint Rank indication" $RI_{joint}$ or "Common rank indication" that may be achieved for a joint transmission over some or all K transmission points of the set. The Joint Rank Indication may be interpreted, for example, as the recommended number of useful transmission layers (or rank) for joint transmission over the K transmission points. The WTRU may report a per-point rank indication $RI_k$ which may correspond to the recommended number of useful transmission layers (or rank) for transmission over the $k^{th}$ transmission point, and in some embodiments perhaps over the $k^{th}$ transmission point only. The per-point rank indication may also be referred to as "per-CSI-RS-resource rank indication" in case a CSI evaluation is based on CSI-RS measurement, for example.

Embodiments contemplate that per-point rank indication may include unconditioned per-point rank indication and/or conditioned per-point rank indication. Unconditioned per-point rank indication $RI_k$ may indicate a transmission to the WTRU (and in some embodiments perhaps to the WTRU only) over transmission point k, without any assumption on the precoding utilized on other transmission points for other WTRU(s). Conditioned per-point rank indication $RI_k$ may indicate a transmission to the WTRU (and in some embodiments perhaps to the WTRU only) over transmission point k, assuming that transmission to other WTRU's takes place on other transmission points with one or more precoders. The one or more precoder(s) may be indicated by the WTRU for the other transmission points, whose use may result in maximum interference to the WTRU. Alternatively or additionally, in one or more embodiments, the one or more precoder(s) may be indicated by the WTRU for the other transmission points, whose use may result in minimum interference to the WTRU. The one or more precoder(s) may include a "zero" precoder (e.g., no transmission or "muting"). Precoders from the subset of precoders may be indicated by the WTRU for the other transmission points, such as from a set of allowed precoders, or from outside a set of restricted precoders. The use of such precoders may allow the WTRU to properly receive data from relevant transmission points. The WTRU may receive data from relevant transmission points independently. The rank indication(s) may be reported for the whole frequency band or for a specific set of sub-bands, for example.

In one or more embodiments, a WTRU may report at least one channel quality index (CQI) corresponding to at least one combination of transmission parameters (e.g., modulation, code rate, transport block size). By way of example, this combination may be such that a single PDSCH transport block (e.g., codeword) occupying a certain CSI reference resource can be received with a transport block error probability not exceeding a pre-determined threshold (such as 0.1, for example). Different types of CQI may be defined based on the assumed type of transmission over the K transmission points, as described herein.

Embodiments contemplate that CQI may include several types, such as "joint CQI" or "aggregated CQI" ($CQI_{joint}$) and "per-point CQI" or "per-CSI-RS-resource CQI" ($CQI_k$). Joint (or aggregated) CQI ($CQI_{joint}$) may include the CQI for a joint transmission of a codeword over some or all K transmission points of the set. When the WTRU uses joint CQI, assumptions may be made on the transmission state or CSI process of the points in the set for which CQI is being fed back. For example, a point may be in one of the following states: transmitting to the WTRU, interfering to the WTRU (e.g., transmitting to another WTRU), muted (e.g., blanked), or unknown. Unknown state(s) may indicate that the WTRU makes no assumption on the transmission state or CSI process of the point, and the point may be in one of the three aforementioned defined states. The points that are assumed to be transmitting to the WTRU may transmit coherently or non-coherently. The WTRU may feedback coherent joint (or aggregated) CQI and non-coherent joint (or aggregated) CQI, based on the assumption made on the transmitting points. Joint (or aggregated) CQI may include coherent joint CQI and non-coherent joint CQI. Coherent joint (or aggregated) CQI may assume that symbols of a codeword may be transmitted over up to K transmission points using a determined relationship between the precoders used in each K transmission points, possibly according to a combining matrix or combining indicator, described herein. For instance, it may be assumed that the relative phase between the pre-coders is such that the signals from the transmission points combine coherently (with a zero phase difference) or combine with a pre-determined phase difference. Non-coherent joint (or aggregated) CQI may assume that symbols of a codeword may be transmitted over up to K transmission points, without a determined relationship between the precoders used in some or each K transmission points.

Embodiments contemplate evaluating CQI for a transmission from more than one transmission point, for example. In one or more embodiments, a WTRU may estimate the received signal strength $S_{RS,i}$ of at least one resource element in which it is known that a CSI-RS or CRS signal is present according to the WTRU configuration. A ratio $P_{c,i}$ may be determined between the energy per resource element (EPRE) of this reference signal (CSI-RS or CRS) and the EPRE of the PDSCH transmission for the at least one resource element. The WTRU may evaluate a signal-to-interference ratio (SIR) for a hypothetical PDSCH transmission as the ratio between the signal strength of the PDSCH transmission $S_{PDSCH}$ and the interference I, where $S_{PDSCH}$ may be determined as a function of at least one $(S_{RS,i}/P_{c,i})$ term, such as for instance $S_{PDSCH}=\text{Sum\_over\_i }(S_{RS,i}/P_{c,i})$. The interference I may be estimated by measuring energy from other resource elements provided by the network, among other techniques, for example.

Per-point CQI or per-CSI-RS-resource CQI ($CQI_k$) may include the CQI for a transmission of a codeword to this WTRU over the $k^{th}$ transmission point, and in some embodiments perhaps only over the $k^{th}$ transmission point. Per-point CQI may include unconditioned per-point $CQI_k$ and conditioned per-point $CQI_k$. Unconditioned per-point $CQI_k$ may indicate CQI for a transmission of a codeword to this WTRU over transmission point k (and perhaps only over transmission point k), without any assumption on the precoding utilized on other transmission points for other WTRU's, or for independent data to the WTRU. Conditioned per-point $CQI_k$ may indicate CQI for a transmission of a codeword to this WTRU over transmission point k (and perhaps only over transmission point k), assuming that transmission to other WTRU's takes place on other transmission points with one or more precoder(s). The precoder(s) may be indicated by the WTRU for the other transmission points, which use may result in maximum interference to the WTRU. The precoder(s) may be indicated by the WTRU for the other transmission points, which may result in minimum interference to the WTRU. The precoder(s) may include a "zero" precoder (e.g., no transmission or "muting"). Precoders from the subset of precoders may be indicated by the WTRU for the other transmission points, such as from a set of allowed precoders, or from outside a set of restricted precoders, for example. The use of such precoders may allow the WTRU to properly receive data from relevant transmission points. The CQI may be reported for the whole frequency band or for a specific set of sub-bands, for example.

In case more than one of the above types/sub-types of CQI are reported for at least one codeword, the WTRU may report, for a first type/sub-type of CQI applicable to a first codeword, the difference between the value of this first type/sub-type of CQI and the value of a second type/sub-type of CQI applicable to the same codeword or a second codeword. For instance, the second type/sub-type of CQI for a codeword may be encoded differentially with respect to the respective first type/sub-type of CQI.

One or more embodiments contemplate that a WTRU may report at least one precoding matrix indicator (PMI) applicable to a set of K transmission points. PMI may include global precoding matrix indicator, local precoding matrix indicator, and interference precoding matrix indicator.

At least one global precoding matrix indicator may correspond to a global (or "aggregated") precoding matrix W of dimension $(A_1+A_2+ \ldots A_K) \times RI_{joint}$. This matrix may represent a recommended precoder for the transmission of data for this WTRU over some or each of $RI_{joint}$ layers from some or all K transmission points. In one or more embodiments, the interpretation of the global (or aggregated) PMI may depend on the last reported joint rank indication $RI_{joint}$.

A local (or "per-point" or "per-CSI-RS-resource") precoding matrix indicator for a transmission point k may include a matrix $W_k$ of dimension $A_k \times RI_k$. This matrix may represent a recommended precoder for the transmission of data for this WTRU over each of $RI_k$ layers from the $k^{th}$ transmission point. The interpretation of the local (or per-point) PMI may depend on the last reported per-point rank indicator $RI_k$.

A precoding matrix indicator for a transmission point k may include a matrix $Y_k$. This matrix represents a precoder that may be used for transmission of undesired data, such as data transmitted for another WTRU from the $k^{th}$ transmission point. This precoder may correspond to at least one of a precoder for transmission to at least one other WTRU, which may result in minimum interference to the WTRU for at least one transmission layer. It may also correspond to a precoder for transmission to at least one other WTRU, which may result in maximum interference to the WTRU for at least one transmission layer.

Embodiments contemplate that a set of precoding matrices $W_k$ for one or more transmission points $k_1$ may correspond to a set of precoders. The set of precoding matrices may include groups of precoder matrices. The set may correspond to a set of precoder(s) that may not be used by the transmission point $k_1$ to ensure the WTRU may correctly receive, possibly independent, data from other transmission point(s) (e.g., $k_2$). The set may correspond to a set of precoder(s) from which the transmission point $k_1$ may select a precoder in the event the transmission point k1 chooses to not use the precoder identified by the precoder matrix indication fed back by the WTRU.

Embodiments contemplate that the at least one precoding matrix indicator corresponding to a local (or per-point) precoding matrix $W_k$ may include one or more of:

A single index $i_k$ which corresponds to a precoding matrix $W_k$ according to a pre-defined mapping, and which interpretation may depend on the last reported per-point rank indication $RI_k$; or One or two indices $i_{1k}$ and/or $i_{2k}$ which correspond to a precoding matrix $W_k$ according to a pre-defined mapping, which may depend on the last reported per-point rank indication $RI_k$. A first index $i_{1k}$ may correspond to a property of the precoding matrix that may not change on a short-term basis, for example, at least one set of weights (or beams) applied to at least one group of antenna ports, where the at least one group of antenna ports may depend on the per-point rank indication $RI_k$. A second index $i_{2k}$ may correspond to a property of the precoding matrix that may change on a short-term basis, for example, for each of the $RI_k$ transmission layers, the selected beam from each of the groups of antenna ports and combining information (e.g. co-phasing) between these beams.

Embodiments contemplate that whether a single index or two indices are reported for this transmission may depend on: higher-layer signaling or configuration; and/or number of antennas in the transmission point.

Embodiments contemplate that the one or more precoding matrix indicators corresponding to the global precoding matrix W may include one or more of the following:

For each transmission point k, at least one per-point precoding matrix indicator corresponding to a local precoding matrix $W_k$ (e.g., $i_k$, or a pair ilk, $i_{2k}$) as described previously.

At least one combining indicator $i_{comb}$, (or inter-point indicator, or inter-CSI-RS-resource indicator) which may correspond to a combining matrix $W_{comb}$ of dimension $(RI_1+RI_2+ \ldots +RI_K) \times RI_{joint}$, and which interpretation may depend on the last reported joint rank indication $RI_{joint}$ and possibly set of per-point rank indications $RI_k$. The combining matrix $W_{comb}$ indicates, for each of the $RI_{joint}$ transmission layers of the combined set of transmission points, which beam (if any) of the last reported local precoder of each transmission point is used, and co-phasing information between the beams of these transmission points. The indicator may also provide relative amplitude information, for example.

The global precoding matrix W corresponding to this set of precoding matrix indicators may then be obtained with the following exemplary formula (where rows are separated by semicolons):

$W=[W_1 \ 0 \ldots 0; \ 0 \ W_2 \ 0 \ldots 0; \ 0 \ 0 \ W_k \ldots 0; \ 0 \ldots 0 \ W_K] \times W_{comb}$ Embodiments contemplate that the one or more combining indicators $i_{comb}$ may include one or more of:

- At least one index to a specific combining matrix $W_{comb}$ according to a pre-defined mapping;
- An indication of whether the global (or aggregated) precoding matrix is such that each layer is transmitted over at most one transmission point (i.e. whether the matrix $W_{comb}$ is the identity matrix);
- At least one indication of the phase difference (or correction) that should be applied, for each transmission layer, to or between the local (or per-point) precoders of each transmission point. In more or more embodiments, the phase difference for a specific "reference" per-point pre-coder may be fixed to zero; in this case, the phase difference may be referred to as "inter-point phase information".

By way of example, and not limitation, embodiments contemplate: one indication for each transmission point of a quantized timing offset $\Delta\tau$ for at least one transmission layer, where the reference may be the timing of one specific transmission point; one indication for each transmission point $(i_{k,comb})$ of the phase difference (or correction) that should be applied, for each transmission layer, to the precoders of this transmission point for coherent combining; and/or two indications for each transmission point $(i_{1k,comb}$ and $i_{2k,comb})$ of the phase difference (or correction) that may be applied, for each transmission layer, to the precoders of this transmission point for coherent combining, where

- One per-point indication $i_{1k,comb}$ may correspond to a property of the phase correction that does not change on a short-term basis, such as the M most significant bits of a quantized phase correction; and/or
- One per-point indication $i_{2k,comb}$ may correspond to a property of the phase correction that may change on a short-term basis, such as the L least significant bits of a quantized phase correction.

Embodiments contemplate that one or more precoding matrix indicators corresponding to the global (or aggregated) precoding matrix W may also include the following:

- For each transmission point k, an index ilk which corresponds to a property of the global (or aggregated) precoding matrix that may not change on a short-term basis, for example, at least one set of weights (or beams) applied to at least one group of antenna ports from transmission point k, where the at least one group of antenna ports may depend on a per-point rank indication $RI_k$ or on a joint (or common) rank indication $RI_{joint}$;
- The set of $i_{1k}$ indices may be concatenated into a single joint (or aggregated) long-term precoding index $i_{1,joint}$; and/or
- An index $i_{2comb}$ which may correspond to a property of the global precoding matrix W that may change on a short-term basis, for example, for each of the $RI_{joint}$ transmission layers, the selected beam from some or each of the groups of antenna ports from some or all transmission points and combining information (e.g. co-phasing) between these beams.

Embodiments contemplate that a global (or aggregated) precoding matrix W may include a single index $i_1$ (and perhaps a single index $i_1$) that may correspond to a property of the global precoding matrix, which may not change on a short-term basis. For example, index $i_1$ may correspond to a set of weights and/or beams that may be applied to the transmission points. The global (or aggregated) precoding matrix W may include an index $i_{2k}$ for each transmission point k. Index $i_{2k}$ may correspond to a property of each local (or per-point) precoding matrix that may change on a short-term basis. For example, index ilk may correspond to the selected subset of weights and the co-phasing between each polarization for each of the RI transmission layers.

For example, if a WTRU may receive one layer from two transmission points, each with 4 x-pol transmit antennas, signal y=Wx+z may be received, where y may be the $n_r \times 1$ vector of received signals, x may be the $n_l \times 1$ vector of transmitted signals (with $n_l=1$), z may be the $n_r \times 1$ noise vector, and W may be the $n_r \times n_l$ precoding matrix. The four ports assigned to transmission point 'a' may be represented as $a_1, a_2, a_3, a_4$, and the four ports of transmission point 'b' may be represented as $b_1, b_2, b_3, b_4$. The precoding matrix may be mapped to the antenna ports as follows: $W \rightarrow [a_1, a_2, b_1, b_2, a_3, a_4, b_3, b_4]^T$. The following codebook structure could be used (see also Table 2):

$$\varphi_{n_k} = \begin{bmatrix} e^{j\pi n_k/2} & 0 \\ 0 & e^{j\pi n_k/2} \end{bmatrix}$$

$$\varphi_{n_1,n_2} = \begin{bmatrix} \varphi_{n_1} & 0 \\ 0 & \varphi_{n_2} \end{bmatrix}$$

$$v_m = [\ 1 \quad e^{j2\pi m/32} \quad e^{j4\pi m/32} \quad e^{j6\pi m/32}\ ]^T$$

TABLE 2

Exemplary Codebook for 1-layer CSI reporting

| $i_1$ | $i_{2a}$ = 0 | 1 | 2 | 3 | 4 | 5 | 6 | 7 |
|---|---|---|---|---|---|---|---|---|
| 0-15 | $W_{2i_1,0,i_{2b}}^{(1)}$ | $W_{2i_1,1,i_{2b}}^{(1)}$ | $W_{2i_1,2,i_{2b}}^{(1)}$ | $W_{2i_1,3,i_{2b}}^{(1)}$ | $W_{2i_1+1,0,i_{2b}}^{(1)}$ | $W_{2i_1+1,1,i_{2b}}^{(1)}$ | $W_{2i_1+1,2,i_{2b}}^{(1)}$ | $W_{2i_1+1,3,i_{2b}}^{(1)}$ |

| $i_1$ | $i_{2a}$ = 8 | 9 | 10 | 11 | 12 | 13 | 14 | 15 |
|---|---|---|---|---|---|---|---|---|
| 0-15 | $W_{2i_1+2,0,i_{2b}}^{(1)}$ | $W_{2i_1+2,1,i_{2b}}^{(1)}$ | $W_{2i_1+2,2,i_{2b}}^{(1)}$ | $W_{2i_1+2,3,i_{2b}}^{(1)}$ | $W_{2i_1+3,0,i_{2b}}^{(1)}$ | $W_{2i_1+3,1,i_{2b}}^{(1)}$ | $W_{2i_1+3,2,i_{2b}}^{(1)}$ | $W_{2i_1+3,3,i_{2b}}^{(1)}$ | where $W_{m,n_1,n_2}^{(1)} = \dfrac{1}{\sqrt{8}} \begin{bmatrix} v_m \\ \varphi_{n_1,n_2} v_m \end{bmatrix}$ The same long-term/wideband PMI $i_1$ may be used by both transmission points. Each transmission point may have its own short-term/narrowband $i_2$ (such as $i_{2a}$ and $i_{2b}$). Index $i_1$ may require 4 bits of feedback, while index ha may require 4 bits and index $i_{2b}$ may require 2 bits. For example, precoding at transmission point a may require $i_1$ and $i_{2a}$. Precoding at transmission point b may require $i_1$, $i_{2a}$ and $i_{2b}$. An alternative transmission point b may, for example, only have feedback $i_1$ and $i_{2b}$. To remove the dependence on $i_{2a}$ at transmission point b, the codebooks at each transmission point may include (see Tables 3 and 4):

TABLE 3

Exemplary Codebook for 1-layer CSI reporting at transmission point a.

| | | | | $i_{2a}$ | | | | |
|---|---|---|---|---|---|---|---|---|
| $i_1$ | 0 | 1 | 2 | 3 | 4 | 5 | 6 | 7 |
| 0-15 | $W_{2i_1,0}^{(1)}$ | $W_{2i_1,1}^{(1)}$ | $W_{2i_1,2}^{(1)}$ | $W_{2i_1,3}^{(1)}$ | $W_{2i_1+1,0}^{(1)}$ | $W_{2i_1+1,1}^{(1)}$ | $W_{2i_1+1,2}^{(1)}$ | $W_{2i_1+1,3}^{(1)}$ |

| | | | | $i_{2a}$ | | | | |
|---|---|---|---|---|---|---|---|---|
| $i_1$ | 8 | 9 | 10 | 11 | 12 | 13 | 14 | 15 |
| 0-15 | $W_{2i_1+2,0}^{(1)}$ | $W_{2i_1+2,1}^{(1)}$ | $W_{2i_1+2,2}^{(1)}$ | $W_{2i_1+2,3}^{(1)}$ | $W_{2i_1+3,0}^{(1)}$ | $W_{2i_1+3,1}^{(1)}$ | $W_{2i_1+3,2}^{(1)}$ | $W_{2i_1+3,3}^{(1)}$ | where $W_{m,n_1}^{(1)a} = \frac{1}{\sqrt{8}} \begin{bmatrix} v_m^a \\ \varphi_{n_1} v_m^a \end{bmatrix}$ and $v_m^a = [\, v_{m,1} \;\; v_{m,2} \,]^T$

TABLE 4

Exemplary Codebook for 1-layer CSI reporting at transmission point b.

| | | | | $i_{2b}$ | | | | |
|---|---|---|---|---|---|---|---|---|
| $i_1$ | 0 | 1 | 2 | 3 | 4 | 5 | 6 | 7 |
| 0-15 | $W_{2i_1,0}^{(1)}$ | $W_{2i_1,1}^{(1)}$ | $W_{2i_1,2}^{(1)}$ | $W_{2i_1,3}^{(1)}$ | $W_{2i_1+1,0}^{(1)}$ | $W_{2i_1+1,1}^{(1)}$ | $W_{2i_1+1,2}^{(1)}$ | $W_{2i_1+1,3}^{(1)}$ |

| | | | | $i_{2b}$ | | | | |
|---|---|---|---|---|---|---|---|---|
| $i_1$ | 8 | 9 | 10 | 11 | 12 | 13 | 14 | 15 |
| 0-15 | $W_{2i_1+2,0}^{(1)}$ | $W_{2i_1+2,1}^{(1)}$ | $W_{2i_1+2,2}^{(1)}$ | $W_{2i_1+2,3}^{(1)}$ | $W_{2i_1+3,0}^{(1)}$ | $W_{2i_1+3,1}^{(1)}$ | $W_{2i_1+3,2}^{(1)}$ | $W_{2i_1+3,3}^{(1)}$ | where $W_{m,n_2}^{(1)b} = \frac{1}{\sqrt{8}} \begin{bmatrix} v_m^b \\ \varphi_{n_2} v_m^b \end{bmatrix}$ and $v_m^b = [\, v_{m,3} \;\; v_{m,4} \,]^T$ In this case, some transmission points or each transmission point may receive $i_1$ (4 bits) as well as their respective $i_2$ (each 4 bits), for example.

The set of precoding matrices $W'_k$ may include an index (and perhaps a single index) that may correspond to a group of precoding matrices according to a predetermined mapping. The interpretation of the group of precoding matrices may depend on the last reported per-point rank indication $RI_k$ and/or the precoding matrix indicator that corresponds to the desired precoding matrix to be used for this WTRU. The set of precoding matrices may include multiple indices, each indicating specific precoding matrices according to a predetermined mapping whose grouping constitutes the set, for example.

In one or more embodiments, a WTRU may report at least one power adjustment indicator $PAI_k$ for at least one transmission point. The power adjustment indicator $PAI_k$ may maps to a value of a recommended power adjustment for at least one of the DM-RS reference signal and the data symbols for a transmission to this WTRU from transmission point k. This may allow the network to better balance received power from some or all transmission points. The mapping between the power adjustment indicator and the actual power adjustment (e.g. in dB) may be pre-defined or provided by higher layers, for example. In one or more embodiments, the WTRU may report channel state information assuming a certain type of single-point or multi-point transmission from the network. Such transmission hypotheses can be referred to as a "transmission state" or "CSI processes" herein. The transmission state or CSI process may include, for at least one transmission point, an assumption about whether this transmission point is:

Transmitting to the WTRU according to the reported per-point or aggregated precoding matrix indicator;

Transmitting to another WTRU according to the reported per-point or aggregated precoding matrix indicator; and/or Not transmitting to any WTRU (for example, muted or blanked).

In one or more embodiments, for a given transmission state or CSI process, there may not be any assumption made for at least one transmission point.

In one or more embodiments, the reporting of CSI for a certain transmission state or CSI process may be configured by higher layers using different methods. Such CSI processes may be referred to as "CSI case", "CSI type", and/or "CSI hypothesis" as described herein. In one or more embodiments, one or more reporting modes may be configured for one or more, or each, of the CSI processes. In one or more embodiments, one or more periodic and/or aperiodic reports and/or report types (e.g., a rank indicator (RI)) may correspond to the one or more reporting modes and/or the one or more CSI processes.

For example, one or more embodiments contemplate that the WTRU may be configured to report a certain CSI case or CSI process by being indicated at least one CSI-RS resource corresponding to point(s) from which the desired signal may be assumed to be transmitted and/or at least one CSI-RS resource corresponding to point(s) from which an interfering signal may be assumed to be transmitted according to the transmission state or CSI process. In addition, the WTRU may also be configured with an interference measurement resource or CSI-IM, which may include a set of resource elements in certain subframes (such as a set of resource elements corresponding to at least one zero-power CSI-RS resource) in which to measure the noise and interference generated by transmissions from other points in the network, for example.

Alternatively or additionally, one or more embodiments contemplate that the WTRU may be configured to report a certain CSI case or CSI process by being indicated at least one CSI-RS resource corresponding to point(s) from which the desired signal may be assumed to be transmitted, and/or at least one interference measurement resource which includes a set of resource elements in certain subframes in which to measure the noise and interference, perhaps including interference generated according to the transmission state or CSI process, for example.

In one or more embodiments, a specific CSI case or CSI process may be associated to a certain serving cell or a certain carrier frequency, perhaps in case the WTRU may be configured with multiple serving cells (carrier aggregation), for example.

The transmission point may be in a transmission state or CSI process such as (T)ransmitting, (I)nterfering (e.g. undesired transmission, for example, to another WTRU), (B)lanked and/or (U)nknown. For example, for n points, there may be up to $4^n$ possible Transmission State Vectors (TSV). Some or each Transmission State Vector may be indicated by one or more Transmission State Indicator (TSI). The TSI may be a scalar value that may map to the TSV or may be the TSV itself. Additionally or alternatively, the TSI may be a bitmap representing the TSV. Also by way of example, the WTRU may feedback with assumptions on five points that may include two transmitting points, two interfering points and one blanked/muted point. An exemplary corresponding TSI may include a vector such as [T T I I B]. The exemplary corresponding TSI may include a value that may map to a vector such as [T T I I B]. Additional transmission states or TSI or CSI processes may be defined to indicate whether a joint transmission may be assumed to be coherent (e.g., use combining indicator or inter-point phase information) or non-coherent.

Embodiments contemplate that a WTRU may be configured to report CSI for certain possible transmission states or CSI processes, and in some embodiments perhaps for only certain possible transmission states or CSI processes. For instance, the WTRU may be configured to report CSI for 2 points and may be configured to report CSI for the following transmission states or CSI processes:

Single transmission from the first point, with the second point transmitting to another WTRU (or, using the previous terminology, [T I], for example);

Single transmission from the first point, with the second point not transmitting to any WTRU (or, using above terminology, [T B], for example);

Single transmission from the second point, with the first point transmitting to another WTRU (or, using above terminology, [I T], for example);

Single transmission from the second point, with the first point not transmitting to any WTRU (or, using above terminology, [B T], for example); and/or Joint transmission from both points (or, using the above terminology, [T T], for example).

Embodiments contemplate that the set of transmission states, or CSI processes, and/or set(s) of TSV for which the WTRU may potentially report CSI can be configured by higher layers. Some transmission states or CSI processes or each transmission state or CSI process for which the WTRU may potentially report CSI may be indicated by an index or "CSI index". For instance, the CSI index may correspond to the order in which the different CSI cases are being configured by higher layers.

Embodiments contemplate that transmission state or CSI process selection may be controlled by the network. The network may determine the transmission state or CSI process or TSI value(s) (e.g. TSI value(s) corresponding to a CSI report), or CSI case. The network may indicate a TSI and/or TSV for the WTRU to use via higher layer signaling. The network may indicate a TSI and/or TSV for the WTRU to use for periodic or aperiodic feedback grant, for example. The TSI may be used for one instance of aperiodic feedback, or may be used for the duration of a semi-persistent aperiodic feedback grant. In one or more embodiments, the TSI may be associated with one or more subframe number(s). The association may be preconfigured by higher layer signaling. In one or more embodiments, the TSI and/or TSV may be based on a previous feedback. For example, the WTRU may feedback an indicator that may indicate to the network that the TSI and/or TSV has changed. The new TSI and/or TSV may cycle to another preconfigured value. For example, the WTRU may feedback an indicator that may indicate to the network that the TSI and/or TSV should be changed. The network may be prompted to indicate the new TSI and/or TSV to the WTRU before another CSI feedback is performed by the WTRU.

In one or more embodiments, the TSI (or CSI case) may depend on the timing of the reception of CSI-RS resources compared to the timing of the CSI report transmission (or of the aperiodic CSI request). For instance, the WTRU may report the CSI case(s) tied to a subset of CSI-RS resources received in the latest subframe satisfying:

At least one CSI-RS resource is transmitted in the subframe according to the configuration; and/or The timing of the subframe is at least k subframes before the subframe in which CSI is reported (or alternatively in which aperiodic CSI is requested)

In the aforementioned CSI cases may be CSI cases which use the aforementioned CSI-RS resources(s) as an assumed desired signal. Alternatively or additionally, it may be the CSI case(s) which use the CSI-RS resource(s) as an assumed interfering signal, or as interference measurement resource. This selection criterion may apply to subframes in which more than a maximum number of periodic CSI reports are configured to be transmitted (and in some embodiments perhaps only to such subframes) and/or for which a prioritization according to CSI case or CSI process may apply (and in some embodiments perhaps must apply).

In one or more embodiments, TSI/TSV selection may be controlled by the WTRU. For example, the WTRU may feedback the TSI and/or TSV to inform the network of the conditions with which the CSI feedbacks have been calculated. The WTRU may determine the TSI and/or TSV value(s). For example, for n points, the WTRU may select from the $4^n$ possible TSI and/or TSV values. For example, the WTRU may select from a subset of possible TSI and/or TSV values. The subset of possible TSI and/or TSV values may be signaled to the WTRU. For example, the subset may be signaled to the WTRU by one or more methods described above with respect to network-controlled TSI and/or TSV selection (e.g., by replacing TSI with TSI set). For example, the subset of possible values may include the TSVs with a single point (T)ransmitting. In some embodiments, no other condition on other points may be used (e.g., DPS without muting). For example, the subset of possible values may include the TSIs with at least two points (T)ransmitting and other points (B)lanked (e.g., joint-transmission with blanking). The WTRU may feedback an indicator to the network indicating that the selected TSI and/or TSV has changed. The new TSI and/or TSV may be pre-configured, or may be fed back by the WTRU, for example.

As described above, the WTRU may select TSI(s) and/or TSV(s) from a set of possible transmission states or CSI processes or a set of possible values (e.g. including in an embodiment a subset of the possible $4^n$ values, where n is the number of points). The TSI and/or TSV may be selected based on the number of points required to achieve a pre-configured threshold on performance. For example, the WTRU may select the TSI(s) and/or TSV(s) that may require the fewest (or most) points to transmit to achieve a pre-configured threshold on performance (for example, maximizing the SINR, minimizing the BLER, maximizing the throughput, or the like). The TSI(s) and/or TSV(s) may be selected based on the number of points that may need to be blanked to achieve a pre-configured threshold on performance. For example, the WTRU may select the TSI(s) and/or TSV(s) that may require the fewest (or most) points to be blanked to achieve a pre-configured threshold on performance (for example, maximizing the SINR, minimizing the BLER, maximizing the throughput, or the like). For example, select the CSI case or CSI process which may be associated to a certain number of CSI-RS resources from which an interfering signal may be assumed to be transmitted (e.g., where the number may be 0, or a positive number).

The TSI(s) and/or TSV(s) may be selected based on the restrictions on non-transmitting points. For example, the WTRU may select the TSI(s) and/or TSV(s) that may impose the fewest (or most) restrictions on non-transmitting points (the fewest (or most) unknown points) to achieve a pre-configured threshold on performance (for example, maximizing the SINR, minimizing the BLER, maximizing the throughput, or the like). In one or more embodiments, the TSI(s) and/or TSV(s) may be selected based on CQI and/or rank (e.g. (RI)). For example, the WTRU may select the TSI(s) and/or TSV(s) that may have the highest CQI and/or the highest rank (e.g. (RI)).

Additionally or alternatively, the TSI(s) and/or TSV(s) may be selected based on throughput or an amount of bits that may be transferred. For example, the WTRU may select the TSI(s) and/or TSV(s) that may maximize the total throughput or the total amount of bit that may be transferred in a subframe if the network followed a recommended CSI (e.g. including both CQI and RI). In one or more embodiments, the WTRU may select a TSI and/or TSV from the allowed TSI and/or TSV subset. The allowed TSI and/or TSV subset may include TSIs and/or TSV(s) that correspond to points that are in the (T)ransmitting state and satisfy one or more of the following criteria: surpass a minimal allowable path loss threshold, achieve a minimal per-point CQI threshold, and/or surpass a certain per-point CQI differential threshold when compared to the maximum per-point CQI threshold.

Embodiments contemplate that in evaluating CSI for a transmission state or CSI process, the WTRU may use one or more parameters including parameters that may be related, corresponding, or specific to the transmission state or CSI process (as described herein) and/or the type of reported CSI (e.g. whether the CSI feedback may include a combining indicator, or may be used for a coherent joint transmission or non-coherent joint transmission). For example, the WTRU may use one or more of the following example transmission-state-specific (or CSI-case-specific) parameters:

the assumed PDSCH transmission power from some or each point or CSI-RS resource (or the assumed ratio of PDSCH EPRE-to-CSI EPRE, or Pc, for some or each point or non-zero power CSI-RS resource). For example, for a given non-zero-power CSI-RS resource, this value may depend on whether the CSI-RS resource is assumed to correspond to a desired signal or an interfering signal. For instance, the WTRU may be configured to use a first value of the ratio of PDSCH EPRE-to-CSI EPRE for CSI processes or CSI cases in which the CSI-RS resource is assumed to correspond to a desired signal, and a second value of the ratio of PDSCH EPRE-to-CSI EPRE for CSI cases in which the CSI-RS resource is assumed to correspond to an interfering signal. This may provide a more accurate interference (and CQI) estimation, perhaps because the pre-coder of an interfering point may not be designed to maximize the interference power received by the WTRU, among other reasons. In another example, the WTRU may be configured to use a first value of the ratio of Pc (PDSCH EPRE-to-CSI EPRE ratio) for a first CSI process configured with a non-zero-power CSI-RS and a first interference measurement resource (CSI-IM). Also, the WTRU may be configured to use a second value of Pc for a second CSI process configured with the same non-zero-power CSI-RS and a second interference measurement resource (CSI-IM). The network may set the Pc values in these processes such that their difference compensates for any interference measurement bias stemming from imperfect estimation of interference for either CSI process;

a correction factor to the assumed PDSCH transmission power from some or each point or CSI process; and/or an offset to the estimated CQI index; or the like.

In one or more embodiments, the use of such transmission-based parameters (e.g. in combination with a WTRU selection mechanism of the transmission state or CSI process based on a maximum throughput (or CQI, or rank)) may enable the CSI for respective transmission states or CSI processes that may use more resources from the network perspective (or that may use the reporting of more CSI bits) to be reported if the use of such transmission states or CSI processes may provide a benefit in comparison to less resource-consuming states. In some embodiments, for the same transmission state or CSI process, different parameters may also be applied for different assumed ranks.

For example, the WTRU may be configured to report CSI for up to 2 transmission points where the set of transmission states or CSI processes that may be reported by the WTRU may include (e.g. using the transmission points) one or more of the following: a single transmission from the first point (with the second point possibly interfering); a single transmission from the second point (with the second point possibly interfering); joint transmission from both points; and/or the like.

Embodiments contemplate that the estimated CQI indices for each of the transmission states or CSI processes may be 8, 6 and 9 respectively in a certain subframe (e.g. in the absence of correction factors), for example. As such, the WTRU may report CSI for a joint transmission (e.g. which may double the cost of such a transmission from the network perspective) even though the incremental benefit over a single transmission may be minimal. In some embodiments, if the method of applying correction factors to the assumed PDSCH transmission power described herein may be used, the WTRU may apply a correction factor of, for example, 0 dB to each single-point transmission states or CSI processes and a correction factor of −3 dB to the joint transmission state or CSI process. Additionally, such correction factors (e.g. when applied) may result in estimated CQI indices of 8, 6, and 6 such that the UE may report the CSI corresponding to a single transmission from the first point (CQI=8), for example.

Embodiments contemplate that the value(s) of the correction factor that may be applied may be defined or provided for some or each certain transmission states or CSI processes (e.g. 2 dB for a joint transmission, 0 dB for single-point transmission, 1 dB for single-point transmission with muting in other points, or the like). Alternatively, the value(s) of the correction factor may be a function of the number of transmission points that may not be, or may be assumed to not be, interfering to the WTRU. In one or more embodiments, the value(s) of the correction factor may be a function of the number of transmission points which may be assumed to be transmitting to the WTRU, for example.

Embodiments contemplate that the value(s) of the correction factor (or parameters that may be used to derive the correction factors) may also be pre-defined. Alternatively, the value(s) of the correction factor (or parameters that may be used to derive the correction factors) may be signaled by the network using higher layer (e.g. RRC) signaling, for example. Such signaling of the parameters may enable the network to adjust the likelihood of reporting CSI for certain transmission states or CSI processes based on current conditions such as network load, among other conditions. For example, if a low system load may be present, the WTRU or WTRUs may report CSI for a joint transmission as there may be spare capacity, perhaps significant spare capacity, in the network. In such cases for other considerations, one or more embodiments contemplate that the correction factor for a joint transmission may be decreased. Alternatively or additionally, one or more embodiments contemplate that the correction factor may be increased, perhaps when the system may be more heavily loaded, among other reasons.

Embodiments contemplate one or more techniques that may be used for providing the correction factors for each transmission state or CSI process. One or more embodiments contemplate that a correction factor for the assumed ratio (e.g. that may be already signaled) of PDSCH EPRE to CSI-RS EPRE may be provided as part of each configured CSI-RS resource (that may be corresponding to a transmission point). Such a correction factor may be applied for the purpose of estimating CSI for a transmission state or CSI process that may involve a joint transmission to the WTRU from such a transmission point and at least one additional point, for example. Alternatively, a new value of the assumed ratio of PDSCH EPRE to CSI-RS EPRE applicable to a joint transmission may directly be provided (instead of applying a correction factor to the assumed ratio of PDSCH EPRE to CSI-RS EPRE applicable to a single-point transmission). A similar approach may also be used to provide the parameters that may be used for transmission states or CSI processes involving a transmission point and muting from at least one other transmission point, or a transmission state or CSI process involving muting from a transmission point.

Alternatively or additionally, embodiments contemplate that a correction factor associated with the assumed PDSCH transmission power (e.g. from each of the points) may be provided from some allowable transmission state or CSI process and/or every allowable transmission state or CSI process. For example, instead of explicitly listing each of the possible transmission states or CSI processes, a correction factor may be provided as a function of the number of transmission points transmitting to the WTRU and/or the number of transmission points not transmitting to any WTRU (e.g., muting) for any given transmission state or CSI process. In one or more embodiments, a correction factor of 0 dB, 2 dB and 4 dB may be defined for transmission state(s) or CSI processes involving transmission to the WTRU (and/or muting) from, for example, a single transmission point, two transmission points, and/or three transmission points, etc., respectively. Additional correction factors (e.g. that may be applied along with the correction factors) for the number of points transmitting to the WTRU may be defined for the number of transmission points muting (e.g. not transmitting to a WTRU).

Embodiments contemplate one or more Transmission State or CSI Case or CSI Process configurations for a WTRU. In one or more embodiments, a WTRU may be configured to feedback for several CSI Cases or CSI Processes. Some or each CSI Case or CSI process may be comprised of a desired signal (e.g., a NZP CSI-RS), an interference resource (e.g., a zero-power (ZP) CSI-RS) and possibly other NZP CSI-RS whose received power the WTRU may translate to potential interfering power. The WTRU may also be configured by one or more higher layers or by DCI to add another offset to the interference to further refine CQI calculations. In one or more embodiments, the offset may be semi-statically configured by higher layer signaling. Alternatively or additionally, the offset may be in a DCI providing a downlink assignment (e.g., a DCI Format 1/1A/1B/1C/1D/2/2A/2B/2C). Alternatively or additionally, in one or more embodiments, the offset may not be explicitly provided to the WTRU. Higher layer signaling, or the downlink assignment may include a flag (with, for example 0 indicating no offset and 1 indicating use of an offset) instructing the WTRU to use an offset. This offset may be calculated at the WTRU by summing and/or appropriately scaling the RSRP contributions of points in a CoMP cluster that may not be used for the desired signal, and/or are not represented in the interference measurement resource and/or are not to be emulated on. In such configurations, the WTRU may be preconfigured with a list of points in its CoMP Resource Management Set which the WTRU may use in the calculation of the offset, perhaps if the use of such an offset is triggered.

Alternatively or additionally, in some embodiments the WTRU may be configured such that some or any points in its CoMP Measurement Set that may not be used either for desired signal or for interference emulation may be considered to be part of the set of points to be used in the offset. In such scenarios, the WTRU may be provided with a mapping of points in its CoMP Measurement Set and those in the WTRU's CoMP Resource Management Set, perhaps in order to determine what RSRP values to use, among other reasons, for example. Alternatively or additionally, higher layer signaling and/or the appropriate DCI may include a bitmap which indicates which resources of the CoMP Resource Management Set should be used in the calculation of the offset, for example.

One or more embodiments contemplate that it may be useful for a WTRU to know whether a NZP CSI-RS in its CoMP Measurement Set represents the same transmission point as a NZP CSI-RS in its CoMP Resource Management Set. Alternatively or additionally, the CoMP Resource Management Set may be a superset of the CoMP Measurement Set. In such scenarios, the WTRU may be configured with a CoMP Measurement Set as well as with an extra NZP CSI-RS which may both be combined to create the CoMP Resource Management Set. Alternatively or additionally, both sets may be independently configured, however the NZP CSI-RS used for a transmission point in either set may be the same. In such scenarios, the WTRU may implicitly know which NZP CSI-RS in each set are for the same transmission points. Alternatively or additionally, some or each NZP CSI-RS in the CoMP Resource Management Set may be given an index and these indices may be indicated to the WTRU when the CoMP Resource Management Set is configured, for example. In some embodiments, perhaps when the network configures the CoMP Measurement Set for the WTRU, it may provide the NZP CSI-RS configuration as well as an index to identify which NZP CSI-RS in the CoMP Resource Management Set may map to the same transmission point.

Alternatively or additionally, the NZP CSI-RS in the CoMP Resource Management Set may be given a predetermined order. In one or more embodiments, NZP CSI-RS in the CoMP Measurement Set that may also be included in the CoMP Measurement Set may be given a flag. In some embodiments, the same ordering of NZP CSI-RS may be used in the CoMP Measurement Set. For example, the CoMP Resource Management Set may have 10 NZP CSI-RS in a pre-determined order. The fourth and seventh NZP CSI-RS may be flagged as being in the CoMP Measurement Set. Given that the hierarchy may be kept the same in the CoMP Measurement Set (and in some embodiments perhaps must be kept in the CoMP Measurement Set), the first NZP CSI-RS in the CoMP Measurement Set may correspond to the fourth NZP CSI-RS in the CoMP Resource Management Set, and the second NZP CSI-RS in the CoMP Measurement Set may correspond to the seventh in the CoMP Resource Management Set. In another example, the ordering may not be kept in the CoMP Measurement Set, and each NZP CSI-RS configured in the CoMP Measurement Set may also include a pointer to a NZP CSI-RS in the CoMP Resource Management Set.

Alternatively or additionally, perhaps when the network configures the CoMP Measurement Set, it also may include a combinatorial index r, where $$r = \sum_{i=0}^{M-1} \binom{N - s_i}{M - i}$$

and the set $\{s_i\}_{i=0}^{M-1}$, $1 \leq s_i \leq N$, $s_i < s_{i+1}$, may contain the M sorted NZP CSI-RS combination indices and $$\binom{x}{y} = \begin{cases} \binom{x}{y} & x \geq y \\ 0 & x < y \end{cases}.$$

Alternatively or additionally, the NZP CSI-RS that may be used in each set for a transmission point may be different. Embodiments contemplate that the configurations may lead to an overlap of same time/frequency REs used in the same subframes. In such scenarios, the WTRU may assume, perhaps implicity, that any two NZP CSI-RS that may share any RE are from the same transmission point.

Embodiments contemplate Primary Transmission State or CSI Case or CSI Process configurations. For CSI reporting, among other reasons, one or more embodiments contemplate that a WTRU may be configured with a primary Transmission State (or CSI Case or CSI Process). The primary CSI Process may be used for fallback operation (e.g., in the case where the WTRU cannot achieve CoMP operation), default operation (e.g., in the case where a WTRU is not dynamically or semi-statically configured with a CSI Process) or for priority operation (e.g., in the case where a WTRU cannot accomplish the appropriate feedback for multiple CSI Process, it may choose to feedback for the first priority CSI Process). Embodiments contemplate that a WTRU may have a different CSI Process for each of fallback, default and priority operation. When configuring a WTRU with a CSI Process, the network may also indicate (e.g., by use of a bitflag) whether the process may be used for any of fallback, default and/or priority. Alternatively or additionally, the WTRU may be configured with a single CSI Process based on CRS, and it may thus assume this to be the fallback, default and/or high priority CSI Process. Alternatively or additionally, the WTRU may be configured with a single CSI Process that has the NZP CSI-RS of its serving cell as the desired signal. In such scenarios, the WTRU may assume that such a CSI Process is the fallback, default and/or high priority CSI Process, for example.

Alternatively or additionally, the WTRU may be configured such that the CSI Process to use as the fallback, default and/or high priority may be the one whose transmission point was used in the most recent transmission. Alternatively or additionally, there may be a flag in the DCI used for downlink assignment indicating that the transmission point used for the scheduled assignment may, at least until further notice, indicate or imply that the CSI Process using such a transmission point as its desired signal, be configured as the fallback, default and/or high priority.

Embodiments contemplate that a WTRU that may be configured to report CSI for one or a plurality of transmission points (or CSI-RS-resources) may have to report CSI for a subset of these transmission points in a particular subframe, and in some embodiments perhaps only a subset of these transmission points in a particular subframe. In addition, a WTRU that may be configured to report CSI for a plurality of CSI cases (transmission states or CSI processes) may report CSI for a subset of CSI cases in a particular subframe (and in some embodiments perhaps only such a subset). This may be because of the following reasons:

The transmission state or CSI process recommended by the WTRU, or requested by the network, involves a transmission from a subset of transmission points, and in some embodiments perhaps only involves a transmission from a subset of transmission points;

Due to payload constraints, for instance in case of periodic reporting, the WTRU may be capable of reporting a feedback component for a subset of transmission points or CSI-RS-resources or CSI cases, and in some embodiments may be capable of such reporting only in a particular subframe.

Embodiments contemplate one or more methods described herein of indicating to which subset or subsets of transmission points a report containing CSI feedback components may apply.

Embodiments contemplate that when the WTRU may report feedback for multiple cells, a point indicator (PI) and/or CSI-RS-resource indicator and/or CSI case or CSI process indicator may indicate, and perhaps explicitly indicate, the transmission point or set of transmission points or CSI case or CSI processes that the feedback report is for. The indicator may include the PCI of the transmission point. The indicator may include an index associated to the CSI case. For instance the index could correspond to the order of the CSI case or CSI process in the CSI configuration (plus possibly an offset). The indicator may include a realization of a bitmap provided by the network, where a 1 in a specific bit location may represent a specific transmission point or CSI-RS-resource configured by higher layers. The bitmap may be signaled to the WTRU by higher layer RRC signaling or may be provided in an uplink DCI (triggering aperiodic feedback on PUSCH) or a Random Access Response Grant, for example. The bitmap may be based on the CoMP measurement set and may be static, semi-static, or dynamic. The indicator may include n-bit stream, where possible n-tuple may represent one of the $2^n$ transmission points. The indicator may include an ordered list of indices, wherein some indices or each index of the list, possibly in binary format, may indicate a specific transmission point or configured CSI-RS-resource. This type of point indicator may be useful to provide ranking information between points. In one or more embodiments, the indicator may indicate a set of size M (out of N possible transmission points), for instance, for the purpose of selecting M recommended points, for example. The indicator may include an indicator that may relate to a specific point in a TSV. The indicator may include a combinatorial index r, where $$r = \sum_{i=0}^{M-1} \binom{N-s_i}{M-i}$$

and the set $\{s_i\}_{i=0}^{M-1}$, $1 \leq s_i \leq N$, $s_i < s_{i+1}$ may include the M sorted transmission point indices and $$\binom{x}{y} = \begin{cases} \binom{x}{y} & x \geq y \\ 0 & x < y \end{cases}.$$

For some or each specific feedback, which transmission point that a feedback report may be for may be determined based on an indicator.

Alternatively or additionally, embodiments contemplate that a subset of transmission points and/or a CSI case or CSI process may be jointly indicated with a subset of selected subbands into a point-subband-indicator (PSI). The PSI may include one or more of the following:

A bitmap where a 1 in a specific bit location may represent a specific combination of transmission point and subband, or of a CSI case or CSI process and subband; and/or For the case where the WTRU may indicate a set of size M (out of N possible combinations of transmission point and subband), for instance, for the purpose of selecting M recommended combinations of points and subbands (or of CSI case or CSI process and subband), a combinatorial index r may be used, where $$r = \sum_{i=0}^{M-1} \binom{N-s_i}{M-i}$$

and the set $\{s_i\}_{i=0}^{M-1}$, $1 \leq s_i \leq N$, $s_i < s_{i+1}$ contains the M sorted point-subband combination indices and $$\binom{x}{y} = \begin{cases} \binom{x}{y} & x \geq y \\ 0 & x < y \end{cases}.$$

Embodiments contemplate that the PI or PSI may be transmitted in one or more of:

The same subframe as the feedback component it may apply to. In case multiple PI's or PSI's are transmitted in a same subframe, the association between a PI (or PSI) and the feedback information may be pre-determined by the bit order; and/or A subframe occurring before the subframe in which the feedback information is transmitted, and in some embodiments according to a pre-determined rule. In other words, the subset of transmission points may correspond to the most recently transmitted PI or PSI. For instance, the WTRU may transmit PI or PSI in a first set of pre-determined subframes (e.g. periodically) and the related feedback in a second set of pre-determined subframes. The PI or PSI applicable to the feedback transmitted in a given subframe of the second set may be the most recently transmitted PI or PSI within the first set, for example.

Embodiments contemplate that at least one of the PI or PSI may allow saving on feedback overhead, as the WTRU may feedback reports for the strongest n points or CSI cases (and in some embodiments only for the strongest n points or CSI cases) and may drop the feedback reports for any other point or CSI case. The feedback reports may include PI to indicate to the network for which transmission point a feedback is for.

The indication of which transmission point the feedback may be for—may or may not be explicit. For example, the transmission point may be implicitly determined based on a transmission point specific scrambling or of a CSI case-specific scrambling. In one or more embodiments, the subset of transmission points or CSI case or CSI process may be implicitly and/or uniquely determined from the timing of the subframe (frame and subframe number) where the feedback is transmitted. The WTRU may transmit a feedback component for a subset of transmission points (or CSI cases) in a first subframe under the condition that the WTRU transmitted an indication that feedback would be provided for this subset of transmission points (or CSI cases) in a second previous subframe. In some embodiments, the WTRU may transmit a feedback component for a subset of transmission points (or CSI cases) in a first subframe only under the condition that the WTRU transmitted an indication that feedback would be provided for this subset of transmission points (or CSI cases) in a second previous subframe. The second subframe may be the most recent subframe in a set of pre-determined subframes, for example. The indication may include a single bit, a PI or PSI, and/or it may be encoded as a specific codepoint of a heretofore undefined report type or a modified report type.

In one or more embodiments, the subset of transmission points may be implicitly determined from the most recently transmitted transmission state indicator (TSI), CSI case or CSI process indicator, PI or PSI as well as the subframe timing according to a pre-configured set of rules, for instance according to a specific mode of periodic reporting. By way of example, within a set of subframes occurring periodically, the transmission point or CSI case or CSI process for which feedback is provided may be cycled among the transmission points or CSI cases indicated in the most recently transmitted PI. In another example, the transmission point or CSI case or CSI process may correspond to the first indicated transmission point or CSI case or CSI process in the most recently transmitted PI in a first set of subframes, and to the second indicated transmission point or CSI case or CSI process in the most recently transmitted PI in a second set of subframes. This may be useful for a number of reasons, such as for example if it is desired to transmit more frequently the feedback for the first transmission point or CSI case or CSI process than for the second transmission point or CSI case.

Embodiments contemplate that, in one or more of the aforementioned techniques, it is also possible that the subset of transmission points to which a certain feedback component applies may be additionally dependent on the type of feedback (CQI, PMI or RI). For instance, the WTRU may report in a given subframe an aggregated CQI for a transmission from two points along with a per-point PMI for one of the two points. This may be useful for a number of reasons, such as for example in case per-point PMI for the other point has already been provided in a previous subframe.

One or more embodiments contemplate the selection of PUCCH Format 3 resources. In some embodiments, perhaps when a WTRU may be configured to report for multiple CSIs and potentially for multiple A/N in the same subframe, the WTRU may use PUCCH Format 3. In order to determine the resources to be used for PUCCH Format 3, among other reasons, the WTRU may be semi-statically configured by higher layers with appropriate resources. Alternatively or additionally, the WTRU may be configured with multiple Virtual Cell IDs (VCID) for PUCCH. In some embodiments, the WTRU may be configured with a set of resources that may be tied to some VCID or to every VCID. In some embodiments, perhaps when the network dynamically configures the WTRU to a specific VCID for PUCCH, it may be either explicitly or implicitly also configuring the required resources. Alternatively or additionally, a WTRU may be configured with an ARI maping by higher layers. In one or more embodiments, this ARI may be valid even when there is no Scell configured. Embodiments contemplate that an Ack/Nack resource indicator (ARI) may be a field in the DCI which may be used to indicate a PUCCH resource index. Embodiments contemplate that the field may be an existing field such as for example a TPC field (e.g., perhaps when received from a DCI indicating an Scell assignment). Embodiments contemplate that ARI mapping may include a table that links some values or each value of the ARI to a PUCCH resource index (e.g., configured in RRC). In one or more embodiments, the ARI may be coupled with the TPC Command in DCI Format of the corresponding PDCCH. Alternatively or additionally, a new or fresh ARI may be included in the DCI Format of the corresponding PDCCH. Stated somewhat differently, embodiments contemplate a new (e.g., heretofore unused) standalone ARI field and/or the use of the TPC field as an ARI field, for example. Alternatively or additionally, the WTRU may be configured to track multiple TPC commands for different reception points. In such scenarios, there may be an identifier tied to the TPC control. This identifier can be used by the WTRUI to also determine which PUCCH Format 3 resources to use. Alternatively or additionally, for some or each Transmission state or CSI Case or CSI Process, a WTRU may have a set of PUCCH Format 3 resources configured, for example.

Alternatively or additionally, embodiments contemplate that, perhaps in case of collision(s) between the transmission of a periodic report on PUCCH and of HARQ A/N in a given subframe, among other reasons, the WTRU may multiplex CSI information with HARQ A/N information on the PUCCH format 3 resources that may be configured for periodic CSI reporting. In some embodiments, the periodic CSI information may be compressed, for instance by reducing the granularity of the PMI information. Also, in some embodiments, the HARQ A/N information may also be compressed by bundling (e.g., AND operation over HARQ A/N bits). Alternatively or additionally, where the WTRU may be configured to use PUCCH format 3 for HARQ A/N transmission in the subframe where the collision(s) may occur (for instance, in case carrier aggregation is configured and an assignment from a secondary cell exists), the transmission of multiplexed periodic CSI and HARQ A/N information may take place over the PUCCH resource indicated by the A/N resource indicator of the secondary cell assignment (e.g., the TPC bits in the DCI containing the assignment).

Embodiments contemplate techniques for determining which of the above-described CSI feedback components and types may be reported to the network and/or in which sub-frame(s). Also, embodiments contemplate one or more techniques for selecting contents of one or more aperiodic CSI reports. In an example, a WTRU may report at least one CSI feedback component of at least (if applicable) one type or sub-type in a given subframe (n) if it received an aperiodic CSI request in a previous subframe (n-k) where k may be pre-defined or signaled, for example. In an embodiment, an aperiodic CSI request in subframe (n) may trigger a WTRU to report at least one CSI feedback component of at least (if applicable) one type or sub-type, in different subframes for different transmission points or CSI cases. For example, feedback for transmission point 1 may be transmitted in subframe $n+k_1$, and feedback for transmission point 2 may be transmitted in subframe $n+k_2$, and so on. The set of $\{k_1, k_2, \ldots\}$ may be pre-defined or signaled, for example.

Embodiments contemplate that, for a given set of transmission points or CSI cases, the set of CSI components, types and sub-types that are reported, as well as associated conditions (described herein), may be determined according to at least one of:

A characteristic of the downlink transmission containing the aperiodic CSI request, such as: an indication from the downlink control signaling (such as PDCCH) containing the aperiodic CSI request for the WTRU. For example, the indication may be provided by specific codepoint(s) of an existing field, such as the CSI request field, or the carrier indication filed, or possibly of a field in a contemplated but heretofore not defined DCI format; the set of antenna ports or reference signals used for the transmission of the downlink control signaling (CRS or DM-RS in case of E-PDCCH for example); whether the downlink control signaling is received from PDCCH or E-PDCCH; the search space (e.g. common search space or WTRU-specific search space) in which the downlink control signaling may be decoded; the PRB, E-REG, or E-CCE in which the downlink control signaling may be decoded in case of E-PDCCH; another field of the DCI that may be reused or reinterpreted, such as the IMCS, the cyclic shift field, the frequency allocation field, the frequency hopping field or the aperiodic SRS field. For instance, the aperiodic SRS field may be reinterpreted as an extension to the CSI request field in case the CSI request field may be set to one of a subset of values (e.g. different than 0). In this case, functionality associated to the reinterpreted field may be modified. For instance, the WTRU may not trigger an aperiodic SRS transmission regardless of the value of this field; the RNTI used for successfully decoding the downlink control signaling; and/or the serving cell or CSI-RS resource corresponding to the point from which the downlink control signaling containing the aperiodic CSI request is transmitted. For instance, the transmission states or CSI case(s) or CSI processes that are reported may correspond to one or more CSI case or CSI process in which it may be assumed that this CSI-RS resource transmits a desired signal;

The timing of the subframe where the request may be received (n-k) or of the subframe where the CSI is to be reported (n), which may be expressed in terms of a system frame number and/or subframe number. For instance, in the case of N CSI cases, the set of subframes for the jth CSI case or CSI process may be defined as subframes satisfying (10 Nf+Ns+offset) modulo N=j, where Nf may be the system frame number, Ns may be the subframe number and offset may be a parameter configured by higher layers;

A characteristic of the uplink transmission indicated by the downlink control signaling that contained the aperiodic CSI request. For instance, perhaps depending on the size of the resource block allocation (grant), the WTRI may report CSI for a single CSI case or CSI process (if the size is below a threshold, for example) or for more than one CSI case or CSI process (if the size is above a threshold, for example);

Higher layer signaling (e.g. RRC configuration);

The (PUSCH) CSI reporting mode;

Whether some or all transmission points are transmitting same (dependent) or different (independent) data; and/or A combination of the above, such as reserving a codepoint of the aperiodic CSI request field to indicate that the set of CSI components or types/sub-types to be reported corresponds to the timing of the subframe where the request is received.

Embodiments contemplate one or more examples of associated conditions that may be indicated (such as but not limited to):

Whether a reported per-point $CQI_k$ is unconditioned or conditioned, and possibly, in the latter case, whether the condition is for minimum interference (such as "no transmission" or "zero precoder") or maximum interference;

Whether a coherent or non-coherent aggregated CQI (or joint CQI) should be reported;

Whether a combining indicator $i_{comb}$ or a combining matrix $W_{comb}$ should be reported;

Whether the reports are wideband or for specific subbands;

Whether long-term (first) precoding matrix indication is reported or short-term (second) precoding matrix indication is reported;

Whether the interference precoding matrix corresponds to maximum or minimum interference;

Whether the set of precoding matrices $W'_k$ corresponds to a set from which the transmission point should or should not select a precoding matrix; and/or An indication of the Transmission State Vector (or a transmission state indicator, TSI) or CSI case or CSI process.

Embodiments contemplate one or more techniques for the selection of the subset of transmission states, CSI processes, or CSI cases for which aperiodic feedback may be provided. In one or more embodiments, the subset of CSI cases may be selected according to the outcome of at least one of the previously described selection methods. The outcome of a selection method may correspond for instance to the value of a CSI request field or another field, or to a function of the subframe timing, or to whether the control signaling is decoded in a common search space or a UE-specific search space, or any function or combination thereof. For example, an outcome may be defined by the combination of a certain value of a CSI request field and/or of a certain value of a carrier indication field. In another example, an outcome may be defined by the combination of a certain value of a CSI request field and/or of a certain value of the subframe number modulo 2.

Embodiments contemplate that a subset of CSI cases or CSI processes corresponding to a specific outcome may be defined using at least one of a number of contemplated techniques. In one or more embodiments, the subset of CSI cases may be predetermined for at least one possible outcome of the selection method. For instance, for a selection based on the value of a CSI request field, a first codepoint may correspond to some or all CSI cases (and in some embodiments may always so correspond), a second codepoint may correspond to the nth configured CSI case or CSI process (and in some embodiments may always so correspond), etc.

In one or more embodiments, the subset of CSI cases may be provided, perhaps explicitly, by higher layers for at least one possible outcome of the selection method. For instance, for a selection based on the value of a CSI request field, a codepoint may correspond to a subset of configured CSI cases indicated by higher layers.

In one or more embodiments, the subset of CSI cases for at least one possible outcome of the selection technique may be the subset of CSI cases for which a specific CSI-RS resource may be assumed to be a desired signal. The specific CSI-RS resource may be indicated by higher layers, or may be based on its order in the configuration of non-zero-power CSI-RS resources. Such embodiments may, among other things, allow the network to obtain the CSI information for some or all CSI cases corresponding a transmission of a desired signal from a specific point in a single subframe.

In one or more embodiments, the subset of CSI cases for at least one possible outcome of the selection technique may be the subset of CSI cases for which a specific CSI-RS resource may be assumed to be interfering (or not interfering), or for which at least one CSI-RS resource may be assumed to be interfering (or not interfering), or for which no CSI-RS resource may be assumed to be interfering. The specific CSI-RS resource may be indicated by higher layers, or may be based on its order in the configuration of non-zero-power CSI-RS resources. Such embodiments may, among other things, allow the network to obtain the relevant CSI information (and in some embodiments perhaps only the relevant CSI information) when it may be already known that a certain point would be interfering (or not interfering). The set of possible outcomes to which this subset of CSI cases corresponds may possibly be defined by a new field or by a new bit(s) of an extended CSI request field.

In one or more embodiments, the subset of CSI cases for at least one possible outcome of the selection technique may be CSI cases selected by the WTRU according to a TSI (or CSI case) selection method described herein. For instance, a codepoint of a CSI request field may correspond to reporting CSI for the CSI case or CSI process for which CQI may be the highest. In such embodiments, the WTRU may report an indication of the selected CSI case or CSI process (such as a TSI or a PI) for some or each reported CSI case or CSI process.

In one or more embodiments, the subset of CSI cases for at least one possible outcome of the selection technique may be determined by cycling through multiple subsets of CSI cases. For instance, two subsets of CSI cases may be defined. At some times, or perhaps every time, the value of the CSI request field may be a certain codepoint, the WTRU may switch the subset of CSI cases for which it is providing the report. In such embodiments, the WTRU may report an indication of the selected CSI cases (or one or more subsets thereof) to prevent ambiguity, among other reasons.

In one or more embodiments, the subset of CSI cases for at least one possible outcome of the selection technique (and in some embodiments, possibly all outcomes) may be restricted to the subset of CSI cases for which the corresponding serving cell may be the serving cell of the UL transmission in which the CSI is reported, possibly as indicated by a carrier indicator field. In such embodiments, the WTRU may be configured with more than one cell (carrier aggregation), possibly in combination with one of the above techniques described herein. In some embodiments, a first codepoint of the CSI request field may be associated to a first subset of configured CSI processes that may be indicated by one or more higher layers for this codepoint. The subset of CSI processes that may be reported when a CSI request is received with this value of the codepoint may be the subset of CSI processes, within the subset of configured CSI processes indicated by one or more higher layers, for which the corresponding serving cell is the serving cell of the UL transmission in which the CSI is reported. A second codepoint of the CSI request field may be associated to a second subset of configured CSI processes that may be indicated by one or more higher layers for this codepoint. The subset of CSI processes that may be reported when a CSI request is received with this value of the codepoint may be the subset of configured CSI processes indicated by one or more higher layers, perhaps irrespective of the serving cell of the UL transmission in which the CSI may be reported, for example.

In one or more embodiments, the subset of CSI cases for at least one possible outcome of the selection technique may be the subset of CSI cases that are identified, for some or each serving cell, as the primary CSI case or CSI process among the CSI cases configured for this serving cell. For instance, for one codepoint of the CSI request the subset of CSI cases that are reported may be the subset of primary CSI cases for some or all serving cells.

Embodiments contemplate one or more examples of sets of CSI components, types and sub-types that may be reported following an aperiodic request, perhaps in an aperiodic feedback report. Aggregated CSI or Joint CSI may include one or more of Common (or joint) rank indication ($RI_{joint}$), per-point rank indication ($RI_k$) for specific transmission point k, such as a transmission point identified as a "serving transmission point", aggregated CQI (or joint CQI) ($CQI_{joint}$) for at least one codeword, and/or Global precoding matrix indicator(s), and the like. Aggregated CSI (or Joint CSI) may include one or more of an indicator of the transmission state or CSI process, or transmission state indicator (TSI) or CSI process indicator. Aggregated CSI (or Joint CSI) may include a primary per-point CQI and at least one delta per-point CQI (e.g., for secondary transmission points). Aggregated CSI (or Joint CSI) may include a muting pattern indicative of which points the WTRU may assume are blanked for the feedback reported. Aggregated CSI (or Joint CSI) may include a vector of point indicator (PI). One or more embodiments contemplate that the PI may map to the points in the CSI process or transmission state vector (indicated by TSI). Aggregated CSI (or Joint CSI) may include one or more associated conditions. Per-point CSI for a subset of transmission points may include a per-point rank indication ($RI_k$), a per-point CQI ($CQI_k$) for at least one codeword, a per-point (or local) precoding matrix indicator(s), a set of precoding matrix indicator(s) $W'_k$, a PI, the corresponding element of the CSI process or transmission state vector, a primary CQI or a delta CQI (associated to a primary CQI), and/or at least one associated condition for each transmission point.

Embodiments contemplate that, for reporting modes where the feedback type may be on WTRU selected sub-bands, the WTRU may also indicate whether some transmission points, or perhaps each transmission point, may have the same subset of sub-bands, and/or if they are orthogonal to each other, and/or if they overlap, for example. In one or more embodiments, this may be realized by transmitting a point-subband indicator (PSI) as described herein. For a number of reasons, such as for example when there may be at least a partial overlap of subsets, the WTRU may provide a combination of Aggregated CSI (or Joint) CSI and, in some embodiments, as well as per-point CSI. Embodiments contemplate that a bitmap may be used to indicate to the transmission points which type of CSI may be applicable to which sub-bands.

Embodiments contemplate that, whether the WTRU selects a common set of subbands for all points, or a separate set of subbands for each point, may be configured by higher layers. One or more such configurations may be provided by the network, perhaps in some embodiments according to the intended type of coordinated transmission. For instance, the WTRU may be configured to select a common set of subands for some or all points, for example in case the network intends to use joint transmission. Alternatively or additionally, the WTRU may be configured to select a separate set of subbands for some points or for each point, for example in case the network intends to use dynamic point selection.

Embodiments contemplate that the report types can be fed back using pre-existing modes where different CSI reports may be mapped to existing fields. For example, aperiodic PUSCH feedback mode 1-2 may be reused where—perhaps instead of feeding back multiple PMI representing one per sub-band—the WTRU may feedback multiple PMIs representing one per transmission point or per CSI case.

In one or more embodiments, the WTRU may be triggered by the network with aperiodic feedback such that the WTRU may provide the new ranking of transmission points to modify the periodicity/offsets of some or each point. The WTRU may use such parameters in periodic feedbacks until a new (or fresh) aperiodic feedback is triggered. Embodiments contemplate that the aperiodic CSI reporting for CoMP may contain any combination of at least one of the following:

- The Transmission State Indicator (TSI), or CSI process indicator, or CSI case indicator;
- The Point Indicator (PI);
- The combinatorial index indicating the UE selected M subbands;
- The combinatorial index indicating the UE selected N points;
- The combinatorial index indicating the UE selected point-subband combinations (PSI);
- The aggregated or per point RI (RIa or RIp);
- The aggregated or per-point wideband CQI (W-CQIa or W-CQIp);
- The aggregated or per-point subband CQI (S-CQIa or S-CQIp);
- The aggregated or per-point M-band CQI (M-CQIa or M-CQIp);
- The aggregated or per-point wideband PMI (W-PMIa or W-PMIp);
- The aggregated or per-point wideband first PMI (W-PMI1a or W-PMI1p).

Where PMI1 corresponds to the first precoding matrix in the two-PMI method introduced in Rel-10;

- The aggregated or per-point wideband second PMI (W-PMI2a or W-PMI2p). Where the PMI2 corresponds to the second precoding matrix in the two-PMI method introduced in Rel-10;
- The aggregated or per-point subband PMI (S-PMIa or S-PMIp);
- The aggregated or per-point subband first PMI (S-PMI1a or S-PMI1p);
- The aggregated or per-point subband second PMI (S-PMI2a or S-PMI2p);
- The aggregated or per-point M-band PMI (M-PMIa or M-PMIp);
- The aggregated or per-point M-band first PMI (M-PMI1a or M-PMI1p);
- The aggregated or per-point M-band second PMI (M-PMI2a or M-PMI2p);
- The wideband inter-point phase indicator;
- The subband inter-point phase indicator;
- The M-band inter-point phase indicator;

Embodiments contemplate that inter-point phase indicators (wideband, subband and/or M-band, for example) may be linked to multiple phase values in various situations such as for example a case where there are more than 2 cooperating points.

Embodiments contemplate that the Rel-10 aperiodic reporting modes can be modified and/or augmented to accommodate efficient CoMP feedback reporting. Modes may be defined as Mode x-y, where x may indicate whether the CQI feedback is for wideband, network configured subbands, or WTRU-selected subbands. Also, y may indicate whether there is no PMI feedback, single PMI feedback, or multiple PMI feedback. In one or more embodiments, one or more heretofore undefined dimensions can be added to some or all of the modes to indicate an assumption on the selection of TSV such as whether the feedback is for a) some or all points in the CoMP measurement set, b) network selected TSV or c) WTRU selected TSV. As an example, the contemplated mode could take the form of Mode x-y-z, where z may represent the assumption on the selection of TSV. In either some or in all three of the point selection assumptions, the WTRU may be instructed to provide aggregated or per-point feedback for each individual report type. The aperiodic CQI reporting mode may be configured by higher-layer signaling (for example in the parameter cqi-ReportModeAperiodic).

In one or more embodiments, the existing aperiodic CSI reporting modes can be reused and may be applicable to any of the three assumptions pertaining to TSV. In such a case, either the uplink DCI or Random Access Response Grant (that may be used to trigger aperiodic feedback) can be used to instruct the WTRU of the assumption on the selection of TSV (some or all points, network-selected TSV, and/or UE-selected TSV). In the case of network-selected TSV, the aperiodic feedback trigger may also include the network-selected TSI. The TSI may be included as an extension to the CSI request field, for example. The aperiodic feedback trigger (e.g., the uplink DCI or the Random Access Response Grant) can also indicate whether aggregated or per-point feedback may be required for some or each individual report type.

In embodiments in which the WTRU may select the TSV (or CSI case), the aperiodic feedback report may include the TSI as well as the PI and/or PSI. Embodiments contemplate that the PI in such situations may be for scenarios where the WTRU may have many points selected as transmitting in the TSV and may use a specific aperiodic feedback for a subset of the transmitting points. In such a case, even though one aperiodic feedback may not include feedback for some or all points in the TSV, the aggregated CQI may be conditioned on the overall TSV or on just the points indicated by the PI(s).

Embodiments contemplate that a hierarchy of points may be provided either by the WTRU or by the network (based on for example ranking per-point CQI, for example). This hierarchy may be used such that some or all feedback reports for points other than the highest ranked point may be differential to the feedback report of the highest ranked point, for example.

Embodiments contemplate one or more techniques for overhead reduction (aperiodic and periodic CSI reporting). Embodiments contemplate that it may be possible to reduce overhead of CSI reporting by taking advantage of the expected correlation between certain components of CSI feedback between different cases. One or more embodiments described herein may be applied to at least one or the following cases:

- In case CSI for more than one CSI case or CSI process are reported in the same aperiodic report;
- In case CSI for more than one CSI case or CSI process are reported in the same periodic report instance (subframe); and/or
- In case periodic CSI instance are configured for more than one CSI cases or CSI processes.

In one or more embodiments, the WTRU may report once certain feedback components which may be correlated or assumed identical between the reported CSI cases (and in some embodiments perhaps only once certain feedback components which may be correlated or assumed identical between the reported CSI cases). For example, the per-point PMI corresponding to a certain CSI-RS resource may be reported if the CSI cases have this same CSI-RS resource assumed as desired signal, or if it is indicated by higher layers that a common PMI is used for the reported CSI cases (and perhaps in some embodiments reported only once if so). In case the optimal per-point PMI may not be the same for two CSI cases that are configured to report the same PMI, the reported PMI may be the one that results in a maximum CQI for any of the CSI cases. Alternatively or additionally, the reported PMI may be the one corresponding to a CSI case or CSI process according to a priority rule, possibly determined by higher layers, for example.

Similarly, one or more embodiments contemplate that the RI may be reported, in some embodiments perhaps once, if the CSI processes may have the same CSI-RS resource assumed as interfering signal, and/or if it is indicated by higher layers that a common RI may be used for the reported CSI processes (and in some embodiments perhaps reported only once if so). In case the optimal RI may not be the same for two CSI cases that are configured to report the same RI, the reported RI may be a maximum (or the minimum) between the values. Alternatively or additionally, the reported RI may be the one corresponding to a CSI process perhaps according to a priority rule, possibly determined by higher layers, for example. For instance, the WTRU may be configured such that the reported RI for a first CSI process may be constrained to be the same as the reported RI for a second CSI process, wherein the second CSI process may be referred to as a "RI-reference process" of the first CSI process. In such scenarios, the RI may be reported, perhaps once, if the configured reporting instances for the rank indication may be the same for both processes, among other reasons. In some embodiments, this may be realized, for instance, if the configured reporting instances for the rank indication may be the same for both processes. In such scenarios, the RI report of the first CSI process may be dropped according to a priority rule, such that the RI applicable to both processes may be reported in a single set of reporting instances.

Alternatively or additionally, embodiments contemplate that the WTRU may report a difference between the feedback component (e.g. CQI) of a first CSI case or CSI process and of a second CSI or CSI process case in place of reporting the absolute value of the feedback component of the second CSI case or CSI process. Such embodiments may be useful if, among other reasons, the difference between values may be expected to be smaller than one of the absolute values. One or more such embodiments may be applied perhaps if certain conditions may be met, such as at least one of:
  both CSI cases use the same CSI-RS resource(s) assumed as interfering signal;
  both CSI cases use the same CSI-RS resource(s) assumed as desired signal; and/or
  it is indicated from higher layers that the second CSI case or CSI process may report a differential feedback component from the first CSI case or CSI process, or the like.

Embodiments contemplate one or more techniques that may be used in the reporting of periodic CSI of a WTRU that may be configured with multiple transmission points or CSI-RS-resources.

In one or more embodiments, a WTRU may report CSI periodically according to a configured (PUCCH) CSI reporting mode and/or sub-mode, for example. The reporting mode and/or sub-mode may define which pre-determined report types may be transmitted in which reporting instances.

Embodiments contemplate that a WTRU may report at least one CSI component of at least (if applicable) one type or sub-type, possibly in combination with at least one associated condition, and/or additional type indication(s) as described herein, in an existing report type or in a previously undefined report type which may be transmitted as part of a modified or in a previously undefined reporting mode. For example, the following report types may be defined as:
  Combining indicator $i_{comb}$;
  Common (or Joint) rank indication $RI_{joint}$ with existing precoding type indication (PTI) or presently defined type indication (see below);
  First (long-term) per-point combining indicator $i_{1kcomb}$ combined with first (long-term) per-point precoding indicator ilk;
  First (long-term) per-point combining indicator $i_{1kcomb}$ combined with common (or joint) rank indication $RI_{joint}$;
  First (long-term) per-point combining indicator $i_{1kcomb}$ combined with first (long-term) per-point precoding indicator ilk and common (or joint) rank indication $RI_{joint}$;
  Second (short-term) per-point combining indicator $i_{2kcomb}$ combined with second (short-term) per-point local precoding indicator ilk;
  Global (or aggregated) precoding matrix indicator, including per-point indicators $i_{1k}$, $i_{2k}$ for each transmission point and combining indicator $i_{comb}$; and/or
  An indicator of whether CSI feedback for a given transmission point or CSI-RS-resource (or set thereof) may be subsequently be reported.

The WTRU may report at least one transmission state indicator (TSI) or CSI process indicator. The WTRU may send different reports to report feedback for different TSI(s). The WTRU may send different reports to report feedback for different sets of TSI(s). In one or more embodiments, the sets of TSIs may overlap. The reports may be sent with their own periodicity and subframe offset(s), for example.

In one or more embodiments, the indication of which point a feedback report may be for may be jointly transmitted with another report. As an example, the rank and point indicator may be jointly transmitted in a previously undefined report type. The single value may correspond to, Rank 1, using point #1 (and in some embodiments perhaps only point#1); Rank 2, using point #1 (and in some embodiments perhaps only point#1); Rank 1, using point #2 (and in some embodiments perhaps only point#2); and/or Rank 2, using point #2 (and in some embodiments perhaps only point#2), and/or the like.

The joint report may include a phase correction value that may provide feedback information for JT CoMP. For example, the joint report may include Rank 1, using point #1/#2 with phase correction $\theta_1$; Rank 1, using point #1/#2 with phase correction $\theta_2$, and the like. The joint report may include Rank 1, using point #1/#2 with phase correction $\theta_n$; Rank 2, using point #1/#2 with phase correction $\theta_1$; Rank 2, using point #1/#2 with phase correction $\theta_2$, and the like. The joint report may include Rank 2, using point #1/#2 with phase correction $\theta_n$; Rank 2, using point #1/#2 with each point sending independent data, and the like.

One or more combinations of the above two sets of values may also be used for a system that supports any combination of JT and DPS. Furthermore, for a non-coherent system, the phase correction may be removed from the joint report. The identification of point #1 and point #2 may be previously fed back in another report type (such as the PI, for example).

The PI may be transmitted jointly with reports for that cell. In one or more embodiments, the PI may be transmitted once. The eNB may assume that until a further PI is transmitted, feedback reports may be for that transmission point. In one or more embodiments, the WTRU may feedback the PI at regular intervals, for example, using a specific period/subframe offset. The WTRU may feedback the PI even if the PI has not changed. This may reduce the effect of error propagation (e.g. when an incorrect PI is decoded at the eNB).

In one or more embodiments, the PI may be transmitted in the place of the RI. For example, the PI/RI report may include a flag to indicate whether the PI/RI report type may be for PI or RI. For example, there may be a pre-configured pattern determining whether the report is for RI or PI. The pre-configured pattern may indicate that some or every x-th RI reporting instance is replaced with a PI. When a PI is fed back in such a manner, future report types that are fed back may be for that transmission point until another PI is fed back, for example.

Embodiments contemplate that the granularity of PMI and phase offset may be reduced. For example, the phase offset may be jointly encoded with the PMI of at least one of the transmission points. The PMI's may be subsampled such that certain PMI's may be associated with certain phase offset, and feeding back a specific PMI may, at least implicitly, indicate the transmission point a subset of possible phase offsets. Embodiments contemplate that another indicator may be used by the network to determine the offset from the subset. For example, the phase offset may be fed back in the instance where another feedback report type may be scheduled. A flag may be transmitted by the WTRU indicating the report type that instance is being used for, for example.

Embodiments contemplate that for the modes where the WTRU may select subbands in some or each bandwidth part, the report type may include at least one of the following:

for some points or for each point, the WTRU may select at least one subband in some or every bandwidth part (where the set of bandwidth parts may span the entire bandwidth). Therefore, for some points of for each point the WTRU may have a different set of subbands;

for some points or for all points, the WTRU may select one subband in some or every bandwidth part. Therefore, the same set of subbands may apply to some points or to all points;

in some or every bandwidth part, the WTRU may select at least one subband/point combination. In this case, the WTRU may provide a label that indicates both the subband within the bandwidth part and the point for which it is applicable, for example.

Embodiments contemplate that, whether the WTRU selects a common set of subbands for all points, or a separate set of subbands for each point, may be configured by higher layers. One or more such configurations may be provided by the network, perhaps in some embodiments according to the intended type of coordinated transmission. For instance, the WTRU may be configured to select a common set of subands for some or all points, for example in case the network intends to use joint transmission. Alternatively or additionally, the WTRU may be configured to select a separate set of subbands for some points or for each point, for example in case the network intends to use dynamic point selection.

The CSI that the WTRU reports periodically may be subject to at least one associated condition as described herein, which may be determined using at least one of:

Higher-layer signaling, such as the configured reporting mode and sub-mode; and/or The last reported PTI, or the last reported type indication (possibly newly defined).

In one or more embodiments, report types for multiple cells may be combined. A reporting mode may allow for the combination of report types for multiple cells. For example, multiple transmission points may use the same rank. In this reporting mode, one RI may be sent for multiple transmission points. This reporting mode may configure the WTRU to feedback (e.g., for n points) 1 RI, n wideband CQI, n wideband PMI and, if configured, multiple sub-band CQI and PMI, for example.

Embodiments contemplate examples of periodic CSI reporting according to an existing or previously undefined reporting mode. For example, in at least one reporting mode/sub-mode, the WTRU may report the following:

in a first set of reporting instances separated by a first period, a report type containing a common (or joint) rank indicator;

in a second set of reporting instances separated by a second period (excluding those reporting instances belonging to the first set), a report type containing at least one wideband aggregated (or joint) CQI and at least one wideband combining indicator $i_{comb}$; and/or in a third set of reporting instances separated by a third period (excluding those reporting instances belong to the first or second sets), a report type containing at least one sub-band aggregated (or joint) CQI and at least one sub-band combining indicator $i_{comb}$.

Embodiments contemplate that the reporting modes described may be useful in combination with periodic reporting that may be separately configured for some transmission points or each transmission point.

Also by way of example, in at least one reporting mode/sub-mode, the WTRU may report the following:

in a first set of reporting instances separated by a first period, a report type containing a common (or joint) rank indicator, one per-point rank indicator for at least one transmission point and a precoding type indicator (PTI) which the WTRU may determine according to techniques described herein;

in a second set of reporting instances separated by a second period (excluding those reporting instances belonging to the first set), a report type containing:

in case the latest PTI transmitted by the WTRU was set to a first value, one long-term (first) per-point precoding matrix indicator and possibly one per-point long-term combining indicator $i_{1k,comb}$ for some or each transmission point (possibly in different reporting instances—in some embodiments);

in case the latest PTI transmitted by the WTRU was set to a second value, at least one wideband aggregated (or joint) CQI and one wideband short-term (second) per-point precoding matrix indicator and one per-point (short-term) wideband combining indicator $i_{2kcomb}$ for some or each transmission point (possibly in different reporting instances); and/or in a third set of reporting instances separated by a third period (excluding those reporting instances belonging to the first set or the second set), a report type including:

in case the latest PTI transmitted by the WTRU was set to a first value, at least one wideband aggregated (or joint) CQI and/or at least one wideband short-term (second) per-point precoding matrix indicator and/or at least one per-point (short-term) wideband combining indicator $i_{2kcomb}$ for some or each transmission point (possibly in different reporting instances); and/or in case the latest PTI transmitted by the WTRU was set to a second value, at least one sub-band aggregated (or joint) CQI and/or at least one sub-band short-term (second) precoding matrix indicator and/or at least one (short-term) sub-band combining indicator $i_{2kcomb}$ for some or each transmission point (possibly in different reporting instances).

In one or more of the previously described exemplary sub-bands, the WTRU may set the precoding type indicator to the first value when, for instance, the WTRU may determine that the long-term per-point precoding matrix indicator and/or long-term per-point combining indicator may have changed significantly for at least one transmission point since the previous transmission of the precoding type indicator set to the first value. Alternatively, the WTRU may set the precoding type indicator to the first value periodically some or every N sub-frames or reporting instances in order to prevent error propagation, for example. In one or more embodiments, the value of N may be configured by higher layer signaling, for example.

One or more embodiments contemplate the reporting mode/sub-mode, such as for example, where the WTRU may report the following:

in a first set of reporting instances separated by a first period, a report type containing a common (or joint) rank indicator, a precoding type indicator (PTI) and a joint precoding type indicator (JPTI) which the WTRU may determine according to at least one of the following:

the WTRU sets JPTI to a first value if different layers are to be transmitted from different transmission points (combining matrix is identity matrix); and/or the WTRU sets JPTI to a second value if at least one layer is to be transmitted from different transmission points;

in a second set of reporting instances separated by a second period (perhaps excluding those reporting instances belonging to the first set), a report type containing at least one of:

in case the latest PTI transmitted by the WTRU was set to a first value, one long-term (first) per-point precoding matrix indicator for each transmission point (possibly in different reporting instances); and/or in case the latest PTI transmitted by the WTRU was set to a second value, at least one wideband aggregated (or joint) CQI and/or one wideband short-term (second) per-point precoding matrix indicator for some or each transmission point (possibly in different reporting instances—in some embodiments) and, in case the latest JPTI reported by the WTRU was set to a second value, one wideband combining indicator $i_{comb}$; and/or in a third set of reporting instances separated by a third period (perhaps excluding those reporting instances belonging to the first set or the second set), a report type containing:

in case the latest PTI transmitted by the WTRU was set to a second value, at least one wideband aggregated (or joint) CQI and/or one wideband short-term (second) per-point precoding matrix indicator for some or each transmission point (possibly in different reporting instances—in some embodiments) and, in case the latest JPTI reported by the WTRU was set to a second value, one wideband combining indicator $i_{comb}$.

In case the latest PTI transmitted by the WTRU was set to a second value, at least one sub-band aggregated (or joint) CQI and/or one sub-band short-term (second) per-point precoding matrix indicator for some or each transmission point (possibly in different reporting instances) and, in case the latest JPTI reported by the WTRU was set to a second value, one sub-band combining indicator $i_{comb}$.

Embodiments contemplate one or more techniques in which periodic feedback may be based on independent periods and/or offsets. Stated somewhat differently, embodiments contemplate realizing periodic CSI feedback that may be based on transmitting periodic CSI reports in multiple sets of subframes, where some or each of which may be defined by at least a period and/or an offset. In such embodiments, the CSI reports that may be transmitted in a specific set of subframes may pertain to at least one of:

A transmission point, or set of transmission points, or set of CSI-RS-resources;

A CSI process;

A transmission state (for instance, the report for a Joint Transmission or for a single point transmission);

An associated condition; and/or

A report type (for instance, whether the WTRU may report Rank Indication or CQI/PMI feedback).

Embodiments contemplate that the period and/or offset of a given set of subframes may be derived from parameters indicated by higher layers, for example.

In one or more embodiments, the WTRU may transmit the CSI reports for some combinations of report types and transmission points or, in some embodiments every possible combination of report type and transmission point, each in a different set of subframes. For instance, the WTRU may transmit RI of point 1 in subframe set A, RI of point 2 in subframe set B, CQI/PMI of point 1 in subframe set C, CQI/PMI of point 2 in subframe set D, etc.

In one or more embodiments, the WTRU may transmit the CSI reports for a certain type of feedback that may be applicable to some or all transmission points in a single set of subframes. This may be useful for a number of reasons, such as for example in case some types of CSI information are common between transmission points. For instance, the RI may be common to some or all CSI processes, transmission points, the transmission state, and/or may be linked to the RI for a specific CSI process or transmission point. For instance, the WTRU may be configured such that the reported RI for a first CSI process may be constrained to be the same as the reported RI for a second CSI process, where in some embodiments the second CSI process may be referred to as a "RI-reference process" of the first CSI process. In such scenarios, the information may be transmitted in a single set of subframes instead of one set of subframes per transmission point or CSI process, perhaps saving overhead. In some embodiments, this may be realized, for instance, if the configured reporting instances for the rank indication may be the same for both processes. In such scenarios, the RI report of the first CSI process may be dropped according to a priority rule, such that the RI applicable to both processes may be reported in a single set of reporting instances. The same technique may be applied to a transmission state indicator (TSI), or to a PI indicating an ordered set of transmission points, for example.

In one or more embodiments, a given set of subframes may be linked to a specific set of transmission points (or CSI-RS-resource), or transmission state (such as a joint transmission) or CSI process on a semi-static basis. To minimize overhead, the WTRU may determine that a certain type of CSI associated to a certain transmission point or transmission state or CSI process may be transmitted if a certain condition or conditions are satisfied, and in some embodiments perhaps only if a certain condition or conditions are satisfied. For instance, a condition may be associated to the transmission state or CSI process that the WTRU may determine. The WTRU may transmit CSI feedback for a certain transmission point if this transmission point may be involved in a transmission to the WTRU according to the determined transmission state or CSI process, and in some embodiments perhaps only if this transmission point may be involved in a transmission to the WTRU according to the determined transmission state or CSI process. Also by way of example, another condition may be that a metric associated to the transmission point or state (such as the wideband CQI) may be better than the metric associated to the best transmission point or state minus a threshold. In case the WTRU may determine that a certain transmission point or transmission state or CSI process does not satisfy the condition for transmission, the WTRU may indicate this to the network in a separate type of report, such as a TSI or a heretofore undefined type of report, possibly in a separate set of subframes that may be specific to the transmission point, for example. In one or more embodiments, the transmission of CSI feedback for a certain transmission point or points may be conditioned to the latest transmitted value of this report, for example.

In one or more embodiments, the linkage between a set of subframes and a transmission point may be dynamic. For instance, transmission points may be ranked by the WTRU using at least one quality criterion (such as highest RI or highest wideband CQI, for example). The WTRU may indicate this ranking in a heretofore undefined report type containing PI and may be transmitted in a specific set of subframes. Based on the latest transmitted PI, the CSI for the highest ranked transmission point may then be transmitted in a first set of subframes, the CSI for the second highest in a second set of subframes, and so on. This technique may allow for the transmission of feedback for more important transmission points more frequently than for less important points, for example.

Embodiments contemplate that a report type may be fed back where the WTRU may provide the new ranking of the transmission points. The periodicity/offsets of each transmission point may be pre-configured and/or tied to the rank provided by the WTRU. In one or more embodiments, the WTRU may send at least two lists, one with "good" transmission points that may require the higher periodicity, and another with "bad" transmission points that may require lower periodicity. The number of lists may grow with the required periodicity granularity, for example. The WTRU may also report the PI containing the list of points using higher layer signaling.

When a WTRU may be configured to feedback CSI for a number of transmission points or CSI cases using one of the aforementioned techniques, a collision of feedback reports may occur if there is overlap between sets of subframes. In one or more embodiments, an order of precedence of transmission points (or CSI cases) may be pre-configured by the network, such as for example in case the collision occurs for the same report type, and in some embodiments may be pre-configured only in case the collision occurs for the same report type. In such embodiments, perhaps if two transmission points (or CSI cases) have feedback reports scheduled for the same resources, the WTRU may feedback the report for the transmission point (or CSI case) having higher precedence. In one or more embodiments, the WTRU may select which transmission point (or CSI case) to feedback. The feedback CSI may include a PI or TSI to indicate which point of CSI case or CSI process the feedback is for, for example.

Embodiments contemplate that periodic feedback collisions of feedback reports may be predicted by the network when configuring the reporting of some or each CSI case. Embodiments contemplate that the network may reconfigure the reporting modes and/or reporting instances to perhaps ensure there may be no collision for a network-selected period of time. Alternatively or additionally, the network may configure the WTRU with feedback reports such that there may be collisions of feedback reports in specific instances. In order to deal with such situations, among other reasons, the WTRU may be configured with rules to compress, juxtapose, and/or drop some feedback reports.

Embodiments contemplate that one or more techniques regarding collision of feedback reports. Embodiments contemplate that some or any WTRU configuration may be static (for example, the WTRU behavior when a collision occurs may be included in a SIB), semi-static (and updated via higher layer signaling), or dynamic (and updated either by higher layer signaling or by an element in a DCI), for example.

Embodiments contemplate that at least two types of feedback report collision may occur. In a first type, the two feedback reports colliding may be for different feedback types. For example, there may be a collision of a RI report for a first CSI case or CSI process feedback and of a wideband CQI/PMI of a second CSI case or CSI process feedback. In collision cases where the two feedback reports are of different type, the WTRU may use any one or more of the following techniques:

There may be a hierarchy of feedback reports. In one or more embodiments, the WTRU may drop certain report types in favor of others. A list of priorities may be configured to the WTRU. For example, a first priority report types may include: Wideband First PMI (2a), RI (3), Wideband CQI (4) and RI/PTI (6). A second priority report types may include: Wideband CQI/PMI (2), Wideband CQI/Second PMI (2b), Wideband CQI/First PMI/Second PMI (2c), RI/First PMI (5). Third priority report types include: Sub-band CQI (1), Sub-band CQI/Second PMI (1a). Also by way of example, some or all the feedback report types may have the same priority;

Certain components of CSI cases or CSI processes (such as the desired signal or interference component) may be configured with priority. In one or more embodiments, perhaps in the event of a collision, the WTRU may feed back the report type for the CSI case or CSI process whose components have higher priority and drops others;

The priority of CSI cases or CSI processes may be determined by ranking higher or lower, the CSI cases or CSI processes by those that share desired signal (or interference component). For example, if there are three CSI cases or CSI processes and two share the same desired signal, in one or more embodiments, they may be of higher (or lower) priority than the third CSI case or CSI process which may have a different desired signal;

There may be a hierarchy of feedback modes and the WTRU may select to feed back report types which are generated for higher priority feedback modes while dropping reports of lower priority modes in one or more embodiments;

Feedback for wideband reports may be considered higher or lower priority than feedback for subband reports in one or more embodiments;

Feedback for per-point CSI cases or CSI processes (e.g., with a single CSI-RS resource assumed as desired signal) may be considered higher or lower priority than feedback for aggregated CSI cases or CSI processes in one or more embodiments;

A CSI case's or CSI process' feedbacks may not be dropped more than a configured number of times in a row in one or more embodiments. In such embodiments, perhaps when a collision of a same priority occurs, if a CSI case's or CSI process' feedbacks have been dropped the configured amount of times in a row, it may have a priority and the WTRU may feedback reports associated to the CSI case or CSI process. The "drop" counter may then be reset to 0; and/or Based on a previous feedback report type (a new indicator similar to PTI), the WTRU may feedback a specific report type and drop another in one or more embodiments.

One or more embodiments contemplate that, perhaps in the event of a collision between two report types of the same priority, the WTRU may be configured to keep the feedback report for a pre-determined CSI case or CSI process (and in some embodiments perhaps only such a feedback report). Alternatively or additionally, the WTRU may be configured to feedback the report type for a CSI case or CSI process, or a subset of CSI cases or CSI processes (and hence drop some or all other colliding feedback reports from other CSI cases or CSI processes) that may be selected based on a configured criterion such as any combination of:

Order of the CSI case or CSI process in the configuration, for example as indicated by a CSI process identifier;

Measurement metric (e.g. CSI-RSRP) of the CSI-RS resource assumed as desired signal in the CSI case or CSI process;

Measurement metric of the CSI-RS resource assumed as interfering signal in the CSI case or CSI process;

Interference level measured from an interference measurement resource in the CSI case or CSI process;

Explicit priority of the CSI case or CSI process provided as part of the configuration, for example, as indicated by a CSI process identifier where a lower value may have a higher priority;

Number of CSI-RS resources assumed as interference in the CSI case or CSI process (for instance, a higher priority may be assigned to a CSI case or CSI process that has a larger number of CSI-RS resources assumed as interference);

CSI case(s) or CSI processes with highest or lowest CQI;

CSI case(s) or CSI processes with highest or lowest RI;

CSI case(s) or CSI processes with highest or lowest desired signal strength;

CSI case(s) or CSI processes with highest or lowest interference signal strength;

CSI case(s) or CSI processes with highest or lowest feedback reporting periodicity;

CSI case(s) or CSI processes with most or least recently dropped feedback report;

CSI case(s) or CSI processes whose previous feedback with the same report type was most or least recently fed back;

Next CSI case(s) or CSI processes based on a preconfigured cycling of CSI cases or CSI process;

CSI case(s) or CSI processes whose colliding feedback report may have changed the most or the least since the WTRU last successfully fed back that report type for that CSI case or CSI process. For example, if the two colliding feedback report types are RI from CSI case or CSI process A and PMI from CSI case or CSI process B and the value of RI has not changed since the last successful feedback of RI for CSI case or CSI process A, then the WTRU may select to feedback the PMI feedback report type for CSI case or CSI process B;

CSI case(s) or CSI processes that was included in the most recent aperiodic feedback report instance;

Duration since the last time CSI was reported for a CSI case or CSI process in an aperiodic report, a periodic report or any report; and/or CSI case or CSI process whose CSI-RS resource assumed as a desired signal may be transmitted from a point that was last used for a downlink assignment.

Embodiments contemplate that the aforementioned criteria may have lower (or higher) precedence than existing criteria used for prioritization purposes based on a report type of serving cell. For instance, the "report type" criterion may have higher precedence than one of the above "CSI case" or "CSI process" criterion such that in case of a collision between CSI reports of different types (e.g. rank indicator vs. pre-coding matrix indicator) and/or of different CSI cases or CSI processes, the priority may be set first according to the report type irrespective of the priorities of the CSI cases or CSI processes. In another example, the "serving cell" criterion may have higher (or lower) precedence than one of the above "CSI case" or "CSI Process" criterion such that in case of a collision between CSI reports for different serving cells and/or for different CSI cases or CSI processes, the priority may be set first according to the serving cell (or first according to the CSI process). In some embodiments, perhaps if the priority between CSI processes of a serving cell may be set according to a lower CSI process identifier first, and/or the priority between CSI of different serving cells may be set according to a lower serving cell identifier first, the priority rule in case of collision between CSI processes with different CSI process identifiers and from different serving cells may be according to the CSI process identifier. In such scenarios, one or more, or all, CSI reports except the CSI report from the serving cell with the CSI process that may have the lowest CSI process identifier may be dropped.

In one or more embodiments, the select report type and CSI case or CSI process that are fed back may not be obvious to the network. In such scenarios the WTRU may add a CSI case or CSI process indicator (such as a PI or TSI) to inform (and perhaps to explicitly inform) the network of what report was fed back.

Alternatively or additionally, the WTRU may be able to compress the feedback reports in order to combine the colliding reports into one. In such embodiments, the WTRU may, in the event of a collision, report differential values for the feedback reports (and in some embodiments perhaps only such differential values). These differential values may be done with respect to the most recent successful feedback report of each colliding type and for the respective CSI cases or CSI processes, for example.

Alternatively or additionally, the WTRU may be configured such that in the case of a collision, it may transmit the feedback using a channel with a larger available payload (such as use PUCCH Format 3) in a separately configured resource. Further, in some embodiments, the WTRU may be configured to use such resource in the case of a collision of n feedback reports (and in some embodiments perhaps only in such a case), where n may be any integer equal to or greater than 2, for example.

Embodiments contemplate that another type of collision may occur where the two or more colliding feedback reports may be of the same type but for different CSI cases or CSI processes. In such embodiments, the WTRU may re-use any of the techniques described herein for the case of different feedback types colliding, and/or any combination of the following:

- In one or more embodiments, the WTRU may feedback a single report that may be interpreted as the value to be used for some or all the colliding reports, at the network. For example, the WTRU may be configured such that some or any CSI cases with a same desired signal component (or same interference component) may share certain feedback report types, such as RI and/or CQI and/or PMI. The sharing rules may be different based on whether the desired signal or interference components are the same, for example;
- In one or more embodiments, the WTRU may be configured such that whenever there may be a collision of same feedback types, the WTRU may determine a single value of this feedback type that may be most appropriate for some or all colliding CSI cases or CSI processes (and in some embodiments must so determine);
- In one or more embodiments, the WTRU may be configured with groups of CSI cases or CSI processes who may share certain feedback types as well as what feedback type may be shared. In the case of collision of these pairs of types and CSI cases or CSI processes, the WTRU may feedback a single value;
- In one or more embodiments, the WTRU may feedback an absolute value of the report type for one CSI case or CSI processes and differential values for some or all other colliding CSI cases or CSI processes. The selection of what point to feed back the absolute value can be done similar to the criteria described herein for collision of different feedback types. One or more such embodiments may be used if the colliding CSI case or CSI process has the same subset of CSI-RS resources assumed as interference, or if it may be indicated by higher layers that differential reporting is used (and some embodiments may be used perhaps only in such conditions);
- The WTRU may be configured with sub-sampled codebooks from which to select PMI in the event of collision of feedback reports. The sub-sampled codebooks may be pre-configured, tied to feedback instances, and/or may be dynamically switched from sets of codebooks pre-configured. The dynamic switching may be done by indication in the aperiodic grant, or it may be cycled through a pre-configured set, or may be selected by the WTRU and indicated with a new indication bit(s), for example; and/or
- The WTRU may add an indication bit(s) to indicate whether the feedback report is valid for some or all colliding CSI cases or CSI processes, a single CSI case or CSI process, and/or a subset of colliding CSI cases or CSI process.

Embodiments contemplate that periodic feedback may be based on transmission of reports for multiple points. For various reasons, such as to perform periodic CSI reporting, for example, the WTRU may be configured with any of the available Rel-10 reporting modes for single point feedback. Embodiments contemplate that the modes may be augmented by including a heretofore undefined Report Type to include the TSI and/or PI. The contemplated report type may be a heretofore undefined standalone report type or may be jointly provided with any other report types (for example a report type combining RI with TSI). In such a case, some or all other feedback report types may be conditioned on point(s) indicated in the most recently transmitted report type that includes TSI and/or PI. In one or more embodiments, the TSI may be transmitted with higher periodicity than the PI or any other report type and the PI may be transmitted to indicate for which point in the TSV (indicated by TSI) the future reports may be conditioned on. Alternatively or additionally, some or all feedback reports may include TSI and/or PI that may indicate for what point that specific report is for.

In one or more embodiments, CSI components pertaining to more than one point may be reported in the same subframe. For instance, it may be possible to maintain, modify or expand existing report types (such as 1, 1a, 2, 2a, 2b, etc., for example) such that the type of CSI information provided in these reports may be provided for multiple points instead of a single point. Embodiments contemplate that his may result in increasing the information payload of some reports or each report, but also may facilitate the maintenance of the time organization of existing periodic modes regardless of the number of transmission points, for example.

Embodiments contemplate one or more techniques that may be applicable to one or more specific report types such as but not limited to:

- In reports 1 and 1a which may contain sub-band CQI information for the best WTRU-selected sub-band of a BW part, the WTRU may report a sub-band for both points (and perhaps a single sub-band for both points), or one sub-band for each point;
- In reports which may contain CQI (1, 1a, 2, 2b, 2c, 4, for example), the WTRU may report at least one of the following (wherein it is contemplate that per-point CQI may be with or without muting hypothesis):
  - Per-point CQI for the first codeword of each point, spatial differential per-point CQI for the second codeword of each point (if RI>1), some or each of which may be relative to the first codeword of the respective point;
  - Per-point CQI for the first codeword of one point, differential per-point CQI for the first codeword of each other point (some or each of which may be relative to the first codeword of the first point), differential per-point CQI for the second codeword of each point (if RI>1, for example), some or each of which may be relative to either the first codeword of the first point, or the first codeword of the respective point; and/or
  - Aggregated CQI for the first codeword assuming joint transmission from some or all points, spatial differential aggregated CQI for the second codeword (if RI>1, for example) assuming joint transmission from some or all points;
- In reports which may contain PMI or second PMI (1a, 2, 2b, 5, for example):
  - Per-point PMI for some or each point with less than 8 antenna ports, second PMI for some or each point with 8 antenna ports;
  - For some or each point other than the first, at least one phase offset between first point and this point; and/or One or more combining indicator (for example, a single indicator that may be pointing to a co-phasing matrix between points); and/or In case at least one point may have 8 antenna ports:
Reports 2a or 2c may contain first PMI for the points that have 8 antenna ports, and in some embodiments reports 2a or 2c may only contain first PMI for the points that have 8 antenna ports In one or more embodiments, the contemplated report type that includes the TSI may also include an order of points for which CSI may be fed back (for example a vector of points). In such a case, feedback reports occurring after the TSI and the order of points have been fed back may be for the first point. A heretofore undefined single bit flag may be added to any of the contemplated report types such that upon feeding back a predefined value for the flag, the point on which future reports may be conditioned cycles to the next point in the vector of ordered points. Alternatively or additionally, in one or more embodiments, the order of points may be signaled by the network to the WTRU.

In one or more embodiments, the WTRU may be configured in a Rel-10 periodic feedback mode. Embodiments contemplate that the WTRU may be configured with a period and/or an offset that may associate a subframe number with a point and/or TSI and/or PI. Some or all feedback reports may be conditioned on the point to which the subframe is associated, and in some embodiments, some or all feedback reports must be conditioned on the point to which the subframe is associated.

In one or more embodiments, the report type including the TSI, and/or PI or higher layer signaling, or the subframe number may also, either explicitly or implicitly include information on whether feedback reports are for aggregated or per-point values. Aggregated feedback may be accomplished by removing the conditioning of report types on the PI most recently reported and/or by conditioning some or all aggregated report types on the most recently fed back TSI. Alternatively or additionally, the aggregated feedback may be accomplished by transmitting a differential value that may be conditioned on a preselected point's feedback. The preselected point may be determined by a metric such as, but not limited to, a highest per-point CQI. For example, point 1 may be considered the reference point; therefore when the PI indicates point 1 feedback, the CQI may represent per-point CQI of point 1. In one or more embodiments, when the PI indicates other points, the CQI may represent the differential value (compared to point 1 per-point CQI) to provide the aggregated CQI, for example.

Embodiments contemplate periodic feedback that may be based on cycling between transmission points and/or states. In one or more embodiments, the WTRU may be configured with one of the Rel-10 reporting modes augmented by allowing certain feedback report types to cycle through the points. For example, in the case where RI is configured, the WTRU may feedback at least one value for some or all points (i.e. an aggregate RI), and in some embodiments perhaps only one value for some or all points. In one or more embodiments, some or each successive RI report may represent the rank of a different point. The point upon which an RI report may be configured can be obtained by cycling through a vector of points. The vector of points may be implicitly determined from the most recent TSI and/or PI, or may be explicitly fed back by the WTRU in a heretofore undefined report type, or may be preconfigured by the network via higher layer signaling, for example. In one or more embodiments, when the WTRU uses RI cycling, the RI reporting per-point period may become $N_{points}*M_{RI}*N_{pd}$ (where $N_{points}$ is the total number of points and the reporting interval of RI reports is an integer multiple ($M_{RI}$) of the CQI/PMI report period $N_{pd}$ as defined in, for example, 3GPP TS 36.213.

In the case where wideband CQI/PMI reporting may be configured, the WTRU may cycle through some points or each point for each successive reporting on CQI/PMI. In such a case, the periodicity with which some or each point's CQI/PMI is reported may be given by $N_{points}*N_{pd}$. Embodiments contemplate that where the PMI may be indicated in two parts (e.g., PMI1 and PMI2), the cycling of points for each precoding matrix may be dependent or independent. For example, in single-point reporting Mode 2-1, if PTI=0, the following order of reports may be configured:

W-PMI1, W-CQI/W-PMI2, W-CQI/W-PMI2 W-CQI/W-PMI2, W-PMI1, W-CQI/W-PMI2, W-CQI/W-PMI2, W-CQI/W-PMI2 . . . .

(where W means wideband, PMI1 means the first precoder matrix indicator and PMI2 means the second precoding matrix indicator). When cycling through points, the following example demonstrates that the cycling of W-PMI1 and W-PMI2 may be dependent:

W-PMI1$_a$-PMI2a, W-CQI/-PMI2$_a$, W-CQI/W-PMI2$_a$, W-PMI1$_b$, W-CQI/W-PMI2$_b$, W-CQI/W-PMI2$_b$, W-CQI/W-PMI2$_b$ . . . .

In one or more dependent methods, embodiments contemplate that cycling may occur for one report type (for example the PMI1), and in some embodiments perhaps only one report type, and the other report type may be conditioned on the point used for the cycled report type. Alternatively, embodiments contemplate that the cycling may be independent:

W-PMI1$_a$, W-CQI/W-PMI2$_a$, W-CQI/W-PMI2$_b$ W-CQI/W-PMI2$_c$, W-PMI1$_b$, W-CQI/W-PMI2$_a$, W-CQI/W-PMI2$_b$, W-CQI/W-PMI2$_c$ . . . .

(Where the lettered subscript is used to denote different points).

Embodiments contemplate that the concept of dependent and independent cycling may be attributed to any of the report types. For dependent cycling, in some embodiments, one report type may be considered the anchor upon which another report type's point dependence may be conditioned. For example, for the case where both wideband CQI/PMI and subband CQI are configured, if the subband CQI is anchored to the wideband CQI then the point upon which a subband report may be conditioned on may depend on the point for the most recent wideband CQI. As an illustrative example, in mode 2-0, for single point and two bandwidth parts, the reporting may be:

W-CQI, S-CQI$_1$, S-CQI$_2$, S-CQI$_1$, S-CQI$_2$, W-CQI, S-CQI$_1$, S-CQI$_2$, S-CQI$_1$, S-CQI$_2$ . . .

(where the numbered subscript indicates a subband number).

Embodiments contemplate that when cycling through points, the following shows an example of cycling dependence between subband CQI and wideband CQI:

W-CQI$_a$, S-CQI$_{1,a}$, S-CQI$_{2,a}$, S-CQI$_{1,a}$, S-CQI$_{2,a}$, W-CQI$_b$, S-CQI$_{1,b}$, S-CQI$_{2,b}$, S-CQI$_{1,b}$, S-CQI$_{2,b}$ . . . .

In such a case, the periodicity of the wideband CQI may be given by $N_{points}*H*N_{pd}$ (where H is an integer multiple used to determine the periodicity of wideband CQI/wideband PMI reporting as defined in, for example, 3GPP TS 36.213.

For one or more embodiments, the following shows an example of cycling independence between wideband CQI and subband CQI:

W-CQI$_a$, S-CQI$_{1,a}$, S-CQI$_{2,a}$, S-CQI$_{1,b}$, S-CQI$_{2,b}$, W-CQI$_b$, S-CQI$_{1,a}$, S-CQI$_{2,a}$, S-CQI$_{1,b}$, S-CQI$_{2,b}$ . . . .

One or more embodiments contemplate that subband reporting may cycle through some or all the bandwidth parts of at least one point in successive reports before cycling through the points. Alternatively or additionally, the order of cycling can be reversed such that in successive reports some or all the subband reports for different points may be cycled through while keeping the bandwidth part constant, before cycling through the bandwidth parts. Embodiments contemplate that cycling and/or dependency of cycling may be applicable to any combination of report types and for any report mode. In one or more embodiments, the cycling may be done over some or all the points and also over the two hypotheses of aggregated or per-point feedback.

Embodiments contemplate techniques for the reporting of channel state information from multiple transmission points using measurement reports generated at the RRC layer. In one or more embodiments, a WTRU may estimate a received signal strength (RSRP) and/or quality (RSRQ) and/or pathloss of a subset of transmission points of a certain cell based on measuring the CSI-RS reference signal(s) transmitted for a subset of transmission points.

Embodiments also contemplate that a WTRU may estimate a received signal strength (RSRP) and/or quality (RSRQ) and/or pathloss of a subset of transmission points of a certain cell based on measuring a previously undefined type of reference signal(s) (that may be called transmission point reference signal or TP-RS) transmitted for this subset of transmission points. The TP-RS may be transmitted for and may be received by the CoMP-capable WTRU according to this method during specific subframes, and in some embodiments perhaps only during specific subframes, which may be defined as "multi-port measurement" sub-frame, and whose pattern may be provided by higher layers. Such sub-frames may be included as a subset of MBSFN-sub-frames to prevent legacy WTRU's from attempting to perform certain measurements and related processing in these subframes, for example.

Embodiments contemplate that the TP-RS transmitted from different (neighboring) transmission points may be transmitted in different OFDM symbols to prevent loss of accuracy due to potential power imbalance between the signals received from these points.

Using CSI-RS or TP-RS for its measurements, the WTRU may then separately report RSRP or RSRQ values of some or each transmission point of a same and/or different cell(s). Based on the RRC measurement reports the network may explicitly configure the WTRU with the subset of transmission points for CSI reporting. Embodiments contemplate that the higher layer RSRP measurements per CSI-RS or per TP-RS may be used by the network to manage the set of CSI-RS resources that the WTRU may use for the purpose of CSI measurement reporting, among other reasons, for example.

More specifically, the WTRU, perhaps as part of the measurement configuration, may be configured with a list of transmission points, CSI-RS or TP-RS (ports) to measure. The configuration may include at least one subset of CSI-RS or TP-RS configuration, which may correspond to one or a combination of the following: a list of CSI-RS or TP-RS related to the serving cell (e.g. CSI-RS or TP-RS transmitted from the WTRU's serving cell, primary serving cell, or alternatively secondary cell); a list of CSI-RS or TP-RS associated to a particular PCI; and/or a list of CSI-RS or TP-RS that may be associated to any PCI.

Embodiments contemplate that a configuration of a CSI-RS or TP-RS that may be used for higher layer measurements may include at least one of the following configuration parameters:
  Antenna port count (e.g. 1, 2, 4, or 8);
  Resource config (e.g. resource element configuration of the CSI-RS or TP-RS);
  Subframe config (e.g. subframe in which the CSI-RS or TP-RS is transmitted);
  Assumed ratio of PDSCH EPRE to CSI-RS EPRE (e.g. Pc value);
  At least one parameter used for the derivation of an initial value of the pseudo-random sequence for the CSI-RS, such as a virtual cell identity. In one or more embodiments, some or each port or subset of ports may have its own pseudo-random sequence initialization configuration; and/or
  Associated PCI—this parameter may be included if the CSI-RS or TP-RS corresponds to a cell different than the serving cell or Pcell. Additionally, this parameter may be included if CSI-RS of different cells may be configured for RSRP measurements.

In one or more embodiments, the network may configure a full or partial set of parameters described above for some or every CSI-RS included for the higher layer measurement set in the WTRU, for example.

Alternatively or additionally, one or more embodiments contemplate that for a number of reasons, such as to optimize signaling for example, a subset of the previously described configuration may be common across the configured transmission points (e.g. one parameter may be provided for some or all transmission points). The remaining subset may be provided to the WTRU individually for some or each transmission point configuration. For example, the antenna port count may be a common parameter and the resource configuration, subframe configuration, and/or pseudo-random sequence configuration may be different for some or each provided transmission point (CSI-RS or TP-RS).

In another example, the subframe configuration may also be a common configuration parameter across the transmission points configured for higher layer measurements. More specifically, in such an example, the WTRU measurement set configuration may include one subframe configuration and potentially one antenna port configuration (or alternatively, a default antenna port configuration (e.g. 2) may be assumed) followed by a list of independent transmission point (e.g. CSI-RS or TP-RS) parameter configuration, which may include but are not limited to, resource configuration and/or pseudo-random sequence configuration.

By way of further example, one CSI-RS or TP-RS configuration may have multiple subset of ports each with individual sequence generation. This may enable network flexibility in order to manage different CSI-RS configurations for different WTRUs. In this case, the WTRU may be informed of the multiple sequence initiators as well as the ports for which some or each initialization may be applicable. Alternatively or additionally, the WTRU may blindly decode and/or may attempt to measure the RSRP of a CSI-RS transmitted (and detected) in a configured cell. To assist the WTRU to blindly decode the CSI-RS or TP-RS, the WTRU may be provided with a subframe configuration to search for CSI-RS given a default antenna port count (e.g. 2 antenna port configuration) or a given configured antenna port count. Additionally or alternatively, embodiments contemplate that the network may configure at least some subframes to be used for blind decoding. In these subframes or any other subframe, the same sequence generation initialization may be used for some or all CSI-RS or TP-RS resources. The sequence generation initialization may be obtained by the actual PCI of the macro cell, for example.

Embodiments contemplate that the WTRU may go through some resource elements or all possible resource elements in which CSI-RS for the antenna port count may be transmitted to detect potential transmissions of CSI-RS. In one or more embodiments, when reporting the higher layer measurement to the network, the WTRU may report along with the RSRP the Resource element(s) in which the CSI-RS was detected. This may allow the network to determine to which CSI-RS the measurement may correspond and/or to properly configure a CSI reporting set and/or a CoMP set. In one or more embodiments, the WTRU may report along with the RSRP a resource configuration index (or resourceConfig parameter) that may indicate the location of these resource elements. To further assist the WTRU in decoding the transmission points, in one or more embodiments, the network may provide a scrambling configuration for the CSI-RS points that the WTRU may decode (or at least try to decode) in the configured subframe.

Alternatively or additionally, one or more embodiments contemplate CSI-RS whose sequences may be cyclic shifts of each other (e.g., no longer a gold sequence, but more like a CAZAC sequence), in which case no scrambling configuration may need to be provided to the WTRU in advance. In such a case, some or all cooperating points may share the same root sequence. One or more embodiments contemplate that the root sequence may be conditioned on the subframe number in a manner that may be preconfigured by the network and may be signaled to the WTRU via higher layers, for example. Also, one or more embodiments contemplate that for some or each transmission point, the WTRU may maintain and/or measure a measurement quantity which it may use for evaluation of reporting criteria or for measurement criteria, for example.

By way of example, and not limitation, the measurement configuration message may provide the WTRU with one or a combination of information. For example, the information may include a set of measurement identities that may be used for the purpose of multiple point transmission CSI-RS or TP-RS reporting (and in some embodiments perhaps only for the purpose of multiple point transmission CSI-RS or TP-RS reporting), that may or may not belong to the serving cell physical identity. The information may include a set of measurement identities associated to at least one measurement object that the WTRU can use across some or all cells and/or transmission points. Further, the information may include an indication to configure the WTRU to measure the CSI-RS or TP-RS per transmission point for the configured PCI (for example the serving cell). This configuration may be specific to a measurement identity or measurement object or reporting configuration or, alternatively, may be applied across some or all measurement identities and/or events. In another example, the information may include an indication to configure the WTRU to measure CRS as well, in addition to the list of CSI-RS or TP-RS. In another example, the WTRU may determine that it may measure, and perhaps in some embodiments may have to measure, different transmission point based on the presence of the list. The measurement identities for which these measurements may (and in some embodiments perhaps should) be performed and for which the WTRU can use them for criteria evaluation, may be explicitly indicated in the measurement configuration message. Alternatively, the WTRU may apply them across some or all measurement identities. In another example, the information may include an explicit indication to which measurement identity the measurements of the transmission points within a subset can be applied to.

The range of measurement events and identities may vary across different deployment and networks, however, the WTRU may be configured with one or more measurement events. For example, a measurement event may include an event A4. In this example, the quality of a neighboring cell may become better than a configured threshold for a configured period of time. This event, when configured with an indication to measure the CSI-RS or TP-RS of multiple transmission points, may be interpreted by the WTRU, as the quality of a transmission point may become better than a configured threshold for a configured period of time. Additionally, the WTRU may restrict sending this event within transmission points in the serving cell, and in some embodiments perhaps only within transmission points in the serving cell. In another example, a new or fresh event may be defined to detect when the signal strength of a point may become better than the sum of an offset and of the worst signal strength of a set of points (or equivalently when the signal strength of a point may become better than the sum of an offset and of the signal strength of any of a set of points). In such an event, the set of points may be explicitly configured by higher layers, or may correspond to the set of points in a CoMP measurement set. The set of points may be (re)configured with any CoMP measurement set (re)configuration or may be (re)configured independently of the CoMP measurement set (re)configuration. In some embodiments, the offset may also be configured by higher layers and may include a hysteresis value. Embodiments contemplate that such new or fresh events may be useful, for example to perhaps ensure that the network may be notified whenever the CoMP measurement set may no longer contain the strongest points, or when the signal strength of a point outside of the CoMP measurement set may become greater than the signal strength of some or any point within the CoMP measurement set, for example.

In another example of a measurement event, the event may be when the quality of a transmission point of the serving cell may drop below a configured threshold. This may also be configured by setting "reportOnLeave" bit for event A4. In an example, the quality of a transmission point may become better than the quality of a transmission point in the CSI reporting set or CoMP set by a threshold for a configured period of time. This may correspond to a previously undefined event that may be used for maintaining a CoMP set, for example.

Since the WTRU may be performing measurements for multiple transmission points within the same cell or within different cells, for reasons such as for example to allow for proper measurement criteria evaluation and comparisons with other cells that may also be configured with multiple transmission points, the WTRU may use one or a combination of various measurements. In an example, the WTRU, in addition to measuring the CSI-RS or TP-RS of some or all configured transmission points may also perform CRS measurements on the serving cell and/or neighboring cells, in some embodiments the CRS measurements may be R10 CRS measurements. In this example, a measurement may be used as a basis of comparison for other events. In another example, the WTRU may use the best measured transmission point for some cells or each cell as a reference for comparison for other events (e.g., to evaluate and trigger event A3, the WTRU may take into account the quality of best transmission point within the serving cell, and in some embodiments may only take into account the quality of best transmission point within the serving cell). In another example, the WTRU may use the first CSI-RS or TP-RS of some or each configured subset, if configured. In another example, the WTRU may use a function or an average of the CSI-RS or TP-RS measured from different physical channel identities or different subsets (e.g., alternatively, the CSI-RS or TP-RS used in the equation may be the CSI-RS or TP-RS in the configured CoMP set (e.g. CSI report set)).

In another example, the WTRU may use some or all transmission point measurements and may treat them as measurements from different cells. Then some or all configured events may be triggered for transmission points within the same serving cell. For example, event A3 may be triggered when there may be a change of a best transmission point in a serving cell or when there may be a change of best cell when compared to some or all transmission points in the serving cell. In another example, the WTRU may trigger the events if the transmission points for which the criteria are met belong to the same subset (e.g., certain events may be triggered if the criteria are fulfilled for a transmission point). In one or more embodiments, the WTRU may only trigger the events if the transmission points for which the criteria are met belong to the same subset (e.g., certain events may only be triggered if the criteria are fulfilled for a transmission point).

In one or more of the contemplated embodiments, the measurements taken on the CSI-RS or TP-RS may be used for evaluation of transmission point specific configured events and/or to perform transmission point measurement quantity reporting. In such embodiments, neighboring cells measurements performed on legacy CRS may be independently used for other event and/or reporting configurations. Embodiments contemplate that by way of a measurement configuration (e.g. measConfig), for example, the WTRU may be requested to perform intra-frequency measurements on a set of transmissions points on the serving cell and/or different cell(s). In one or more embodiments, the WTRU may also be requested to perform inter-frequency measurement of a set of transmission points on another frequency.

In one or more embodiments, the WTRU may be configured with a measurement object and/or reporting configuration that may, perhaps explicitly, indicate to the WTRU that the configured event or configuration may be applied for CSI-RS or TP-RS measurements. This may be performed using one or a combination of the following:

A new measurement object may be defined for transmission point measurements on a CSI-RS or TP-RS. In one or more embodiments, more than one measurement object for a frequency may be defined (e.g. one measurement object for cell evaluation and one measurement object for transmission point evaluation). The report configuration may contain a new CoMP set management event or an existing event configuration. Embodiments contemplate at least one measurement identity may be configured to have an associated measurement object that may contain a transmission point CSI-RS or TP-RS list and/or a reporting configuration;

One or more heretofore undefined purposes are contemplated in a reporting configuration, reportConfig. One purpose, for example, may correspond to a purpose set to "reportMeasCSI_RS". Embodiments contemplate that when a reporting configuration with purpose set to "reportMeasCSI_RS" may be received by a WTRU, the WTRU may perform measurements on the reference signals of the transmission points (e.g. CSI-RS or TP-RS). The report configuration may include an event triggered configuration with an additional purpose and/or identifier that this report configuration may be used for CSI-RS measurement. The report configuration may be used to request the WTRU to measure the listed CSI-RS and report them within a configured time period, for example;

The measurement object may include the transmission point CSI-RS or TP-RS configuration (e.g. the list of transmission points to perform CSI-RS or TP-RS measurements). When referred to hereafter, this list may be referred to as "pointsForWhichToReportMeasCSI_RS" and the configuration may be according to any of the configuration described previously; and/or The reporting configuration may contain the "pointsForWhichToReportMeasCSI_RS" information.

Embodiments contemplate that the reporting configuration may be used in conjunction with any of the techniques described previously to configure the WTRU with measurement criteria (e.g. events). When the criteria for the associated event(s) may be met for the transmission points in the list a measurement report may be triggered. In one or more embodiments, the WTRU may be requested to measure and/or report a set of transmission points, by way of, for example, a one shot request for transmission point measurements. For example, this may be achieved by using the reporting configuration (e.g. reportConfig). Embodiments contemplate that the one or more heretofore undefined purpose described previously (reportMeasCSI_RS) may be used to indicate to the WTRU to perform measurements on the configured transmission point list and, in some embodiments, to report them. The reportConfig may set the purpose to reportMeasCSI_RS and may or may not configure an event trigger for the given configuration. The WTRU may report the measurements, perhaps as soon as some or all requested transmission points may be measured or may send the report after a configured period of time, for example. In one or more embodiments, at the expiration of a timer the WTRU may report some or all measured and/or detected CSI-RS.

In one or more embodiments, the transmission point or CSI-RS to measure list may be provided as part of a measurement object (e.g. the intra-frequency measurement object). The measurement object may include a list of CSI-RS, TP-RS, and/or transmission points that the WTRU may measure, and in one or more embodiments perhaps should measure. When referred to hereafter, this list may be referred to as pointsForWhichToReportMeasCSI_RS. In such an example, the reporting configuration may include a report type or purpose (e.g. reportMeasCSI_RS) and may further contain a reporting criteria, wherein a reporting criteria may include an existing event (e.g. event 4) or a heretofore undefined event. Alternatively or additionally, the report configuration may set the purpose to "reportMeasCSI-RS" (and in some embodiments perhaps may only set the purpose to "reportMeasCSI-RS") and may not configure an event. In such a case, the WTRU may use the presence of such report purpose to indicate that it may measure and may acquire (or at least attempt to acquire) the transmission point CSI-RS provided and may report the measurement quantities once measured, or within a configured time, for example.

In one or more embodiments, the WRTU may be configured with at least one measurement identity for transmission point CSI-RS reporting that may combine at least one of reportConfig with the purpose set to "reportMeasCSI_RS" and/or a corresponding measurement object (e.g. containing the CSI-RS configuration, pointsForWhichToReportMeasCSI_RS).

In one or more embodiments, for some or each measId, embodiments contemplate that the corresponding reportConfig may include a purpose set to "reportMeasCSI_RS". In some embodiments, the WTRU may perform measurements on the CSI-RS on the frequency in the associated measObject. For example, in case no assistant information on the CSI-RS may be provided to the WTRU, the WTRU may detect (or at least attempt to detect) CSI-RS on a configured subframe, perhaps on the known possible resource elements for CSI-RS for a given antenna configuration and may measure the configured measurement quantity (e.g. RSRP). By way of further example, the WTRU may perform measurements on transmission points CSI-RS or TP-RS found in cellForWhichToReportMeasCSI_RS.

In one or more embodiments, for some or each measId, embodiments contemplate that the corresponding reportConfig may include a purpose set to reportMeasCSI_RS. In some embodiments, the WTRU may consider any transmission point (CSI-RS) detected on the given cell, matching the value of the "cellForWhichToReportMeasCSI_RS" that may be included in the corresponding measObject within the VarMeasConfig to be applicable for event reporting and/or triggering provided in the corresponding ReportConfig.

In one or more embodiments, a heretofore undefined measurement object may be configured in the WTRU. The measurement object may contain pointsForWhichToReportMeasCSI_RS. At least one measurement identity may be configured in which such measurement object and/or a reporting configuration may be linked, perhaps in order to allow the WTRU to take measurements on transmission points for the serving cell and/or any other cell, for example, among other reasons. In one or more embodiments, for some or each measID, the corresponding measurement object may have a cellForWhichToReportMeasCSI_RS included. Embodiments contemplate that the WTRU may consider any transmission point (CSI-RS) that may be detected on the given cell, and may match the value of the "cellForWhichToReportMeasCSI_RS" that may be included in the corresponding measObject within the VarMeasConfig to be applicable for event reporting and/or triggering provided in the corresponding ReportConfig.

Embodiments contemplate autonomous removal of a measurement configuration. In one or more embodiments, for example where the transmission points to measure may correspond to transmissions points present in the serving cell (and in some embodiments perhaps in the serving cell only), the WTRU may autonomously remove one or more measurement configurations, for a number of reasons, such as when a serving cell change may occur. By way of further example, embodiments contemplate that a change of serving cell and/or a handover may occur, where the WTRU may autonomously remove one or a combination of the following measurement configurations:

The measurement identity with a corresponding reportConfig that may have the purpose set to "reportMeasCSI_RS";

The measurement identity with a corresponding measObject that may have a CSI-RS list to measure (e.g. this may be used where a heretofore undefined measurement object may be introduced for CSI-RS measurement purpose);

The reportConfig with purpose set to reportMeasCSI_RS; and/or

The cellForWhichToReportMeasCSI_RS may be removed from the memory of the WTRU for the given measurement object.

When the criteria corresponding to one of the measurement events (e.g. report configurations) for a transmission point may be fulfilled and/or when the WTRU may determine to transmit a measurement report according to a request within a reporting configuration. The WTRU may trigger a measurement report wherein some or all of the following information may be included and sent to the network: the measurement identity; the physical channel identity of the serving cell; the transmission point(s) identity that triggered the event and the corresponding measurement result, where the transmission point identity may correspond to a transmission point index provided in the original configuration message, which may be an explicit index or implicitly determined by the WTRU based on the order of the transmission point configuration (alternatively, the transmission point identity may be indicated in the report by way of providing the virtual cell ID that may be provided as part of the measurement list, for example for the scenario where a virtual ID may be provided for the WTRU—the transmission point identity may include the TSI and/or the PI); the subset in which the CSI-RS or TP-RS that trigger the event may correspond; and/or the measurements of other transmission points may also be included in the report. In case of blind detection, embodiments contemplate that the RE in which a reference signal may have been detected may be indicated in the report. The network may use this measurement report to determine the CoMP set and configure the WTRU with a set, which may determine the set of transmission points for which the WTRU may perform CSI reporting. One or more embodiments may be equally extended to transmission points in a Secondary serving cell (Scell), wherein in some embodiments a specific Scell offset may also be defined.

Alternatively or additionally, the WTRU may be configured with multiple points in its CoMP Resource Management Set which may not belong to the coordinating cluster of points that the WTRU may be currently being served with. Furthermore, the network may configure an offset value to be used for such points, and in some embodiments perhaps only for such points. One or more embodiments contemplate that when an event occurs with respect to these points (e.g., based on measurements and/or the use of the offset) the WTRU may report a full set of measurements to the network. Alternatively or additionally, the WTRU may report a single bit flag to indicate that the received power of a point outside of the coordinating cluster, but in the CoMP Resource Management Set, has triggered the event. This can be used as a trigger for the network to configure the WTRU to take more measurements for a number of reasons, such as for example to enable mobility. Alternately or additionally, this event can be used by the network to trigger UL enhanced inter-cell interference cancellation with the corresponding point. One or more embodiments contemplate that these techniques could be used to minimize possible UL interference caused by WTRUs close to transmission points located outside of its coordinating cluster.

Embodiments contemplate the measurement of CSI-RS of one or more different subsets of transmission points. In one or more embodiments, the WTRU may measure a set of CSI-RS associated to different transmission points (or subset thereof) in different subframes. The subframes during which the WTRU may measure the set of CSI-RS of a specific subset of transmission points may occur on a periodic basis. In this case, the periodicity and/or offset of the subframes during which CSI-RS may be measured may be different for some or each subset of transmission points. In one or more embodiments, the WTRU may measure the CSI-RS reference signals of a transmission point according to a subframe configuration ($I_{CSI-RS}$ and/or subframeConfig parameter), and/or a number of antennas (antennaPortsCount parameter) specific to this transmission point. In other words, the WTRU may be provided with more than one non-zero-power CSI-RS configuration instead of, for example, a single one. This technique may allow for more flexibility for the configuration of the CSI-RS transmission in a network including a large number of transmission points in the same geographical area, for example.

The WTRU may also be provided with a set of zero-power CSI-RS (or muting pattern) for some or each transmission point (or subset thereof), occurring in different subframes for different transmission points (or subset thereof). The WTRU may utilize the knowledge of the existence of these muting patterns for at least the following purposes: PDSCH decoding; and/or CSI calculation adjustment, such as interference estimation and/or estimation of desired signal occurring in the same OFDM symbols as a muted resource element, for example. In one or more embodiments, there may be a muting pattern (and in some embodiments perhaps a single muting pattern) defined for the purpose of estimating interference for some or all types of CQI, or separate muting patterns defined for the purpose of estimating interference for some or each type of CQI, such as aggregated CQI, per-point CQI without muting assumption in other points, and/or per-point CQI with muting assumption in other points.

In one or more embodiments, the WTRU may measure a set of CSI-RS associated to different transmission points in the same subframe but in different resource elements. This technique may have the benefit that the phase difference between transmission points can be more accurately measured as the signals are measured in the same subframe, for example.

More specifically, in one or more embodiments, the CSI-RS associated to different transmission points may be transmitted and/or measured by the WTRU in different OFDM symbols in the time domain. Such embodiments may minimize issues that may stem from an imbalance of received power between the signals transmitted from different transmission points to which the path loss may be different. In some embodiments, the WTRU may measure the CSI-RS reference signals of a transmission point according to a CSI reference signal configuration (and/or a number of antenna ports) specific to this transmission point instead of a CSI reference signal configuration (resourceConfig parameter) that may be common to some or all transmission points. Such reference signal configuration may for instance be indicated by an integer ranging from 0 to 31 for some or each transmission point (for example), and may be provided by higher layer or physical layer signaling.

Figure 3A:
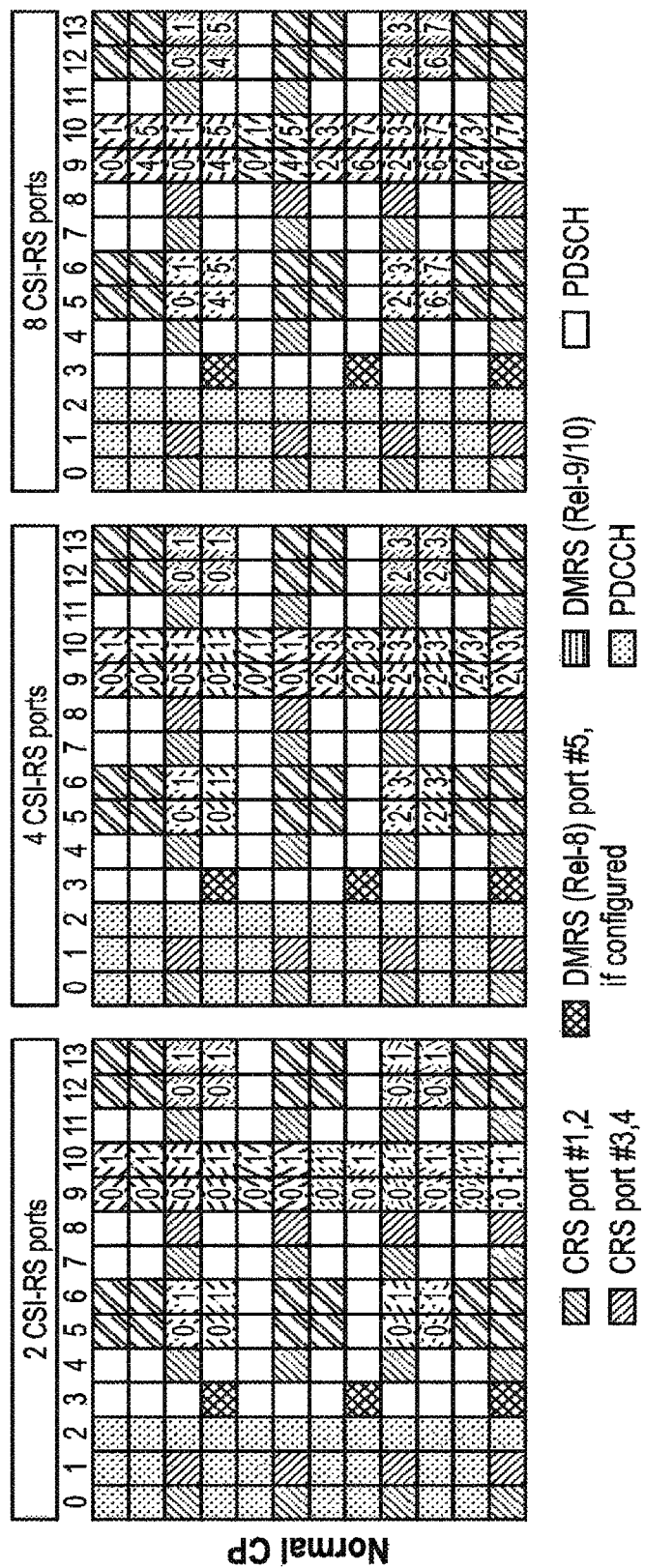
FIG. 3A illustrates example channel state information reference signal (CSI-RS) port mappings for normal CP subframes consistent with embodiments.
Figure 3B:
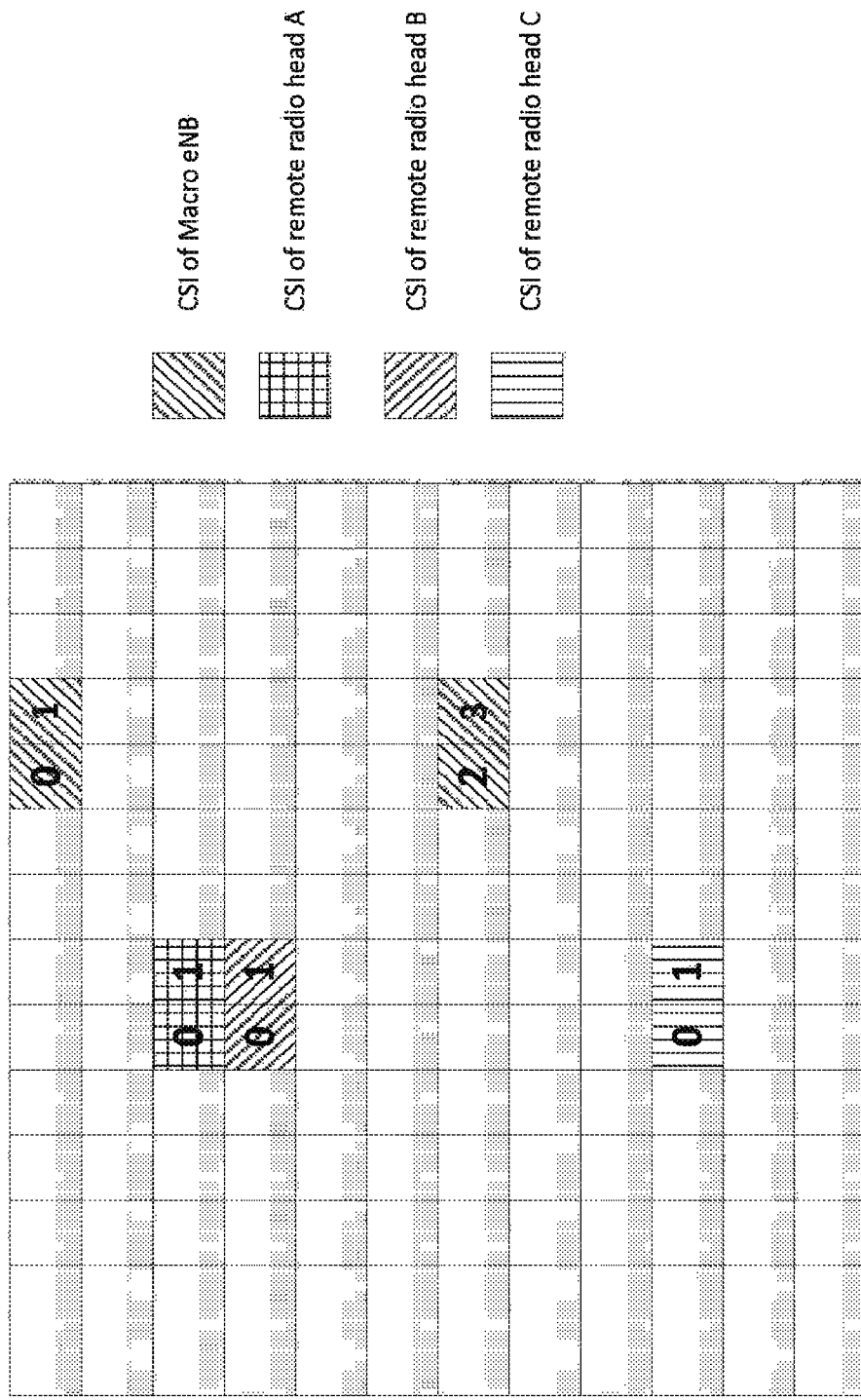
FIG. 3B illustrates an example four resource element set consistent with embodiments.

FIG. 3A illustrates exemplary CSI-RS port mappings for normal CP subframes. According to the number of TX antennas at the transmission point, one set of the shown CSI-RS ports may be used for CSI measurement. In some embodiments, perhaps only one set of the shown CSI-RS ports may be used for CSI measurement. One or more embodiments contemplate that simultaneous CSI measurement of more than one transmission point in the same subframe can be achieved. For example, in a multi-point transmission system including a Macro eNB with 4 Tx antennas and 3 remote radio heads each equipped with 2 TX antennas, CSI-RS may be transmitted as shown in FIG. 3B. In FIG. 3B, the 4-Resource-Element set shown (in the first and seventh rows of columns 10 and 11) may be used for the CSI measurement of the Macro eNB. The three 2-Resource-Element sets shown (for example, in the third row of the fifth and sixth columns of 2 CSI-RS ports and 4 CSI-RS ports; in the third row of the twelfth and thirteenth columns of 4 CSI-RS ports) may be used for CSI measurements of the three remote radio heads, such as remote radio heads A, B, and/or C. The WTRU may be configured to measure the CSI-RS transmitted from the macro eNB and the CSI-RS transmitted from at least one of the remote radio heads. Since these may be transmitted in different OFDM symbols, there may be no measurement degradation due to potential power imbalance between the CSI-RS transmitted from these two nodes.

In one or more embodiments, the CSI-RS may be transmitted and/or received by the CoMP-capable WTRU during specific subframes (and in some embodiments perhaps only during specific subframes), which may be defined as "multi-port measurement" sub-frame, and whose pattern may be provided by higher layers. In some embodiments, such sub-frames may be included as a subset of MBSFN-sub-frames to prevent legacy WTRU's from attempting to perform certain measurements and related processing in these subframes.

In one or more embodiments, different transmission points (or subsets thereof) may be associated with different values of the ratio of PDSCH EPRE to CSI-RS EPRE (or p-C parameter) which may be used at least to derive the CQI. At times, or in some embodiments whenever, the WTRU may estimate the CSI associated to a given transmission point (or subset thereof), the WTRU may determine the appropriate value of the ratio for this transmission point (or subset thereof) and may use it to calculate the CSI. The value of the ratio for each transmission point, or subset thereof may be provided by higher layers (e.g. RRC signaling). In one or more embodiments where the WTRU may estimate CSI based on at least one common reference signal (CRS), the WTRU may estimate the CSI associated to a given transmission point by using a value of the cell-specific RS EPRE (parameter referenceSignalPower) specific to this transmission point, for example.

Figure 4:
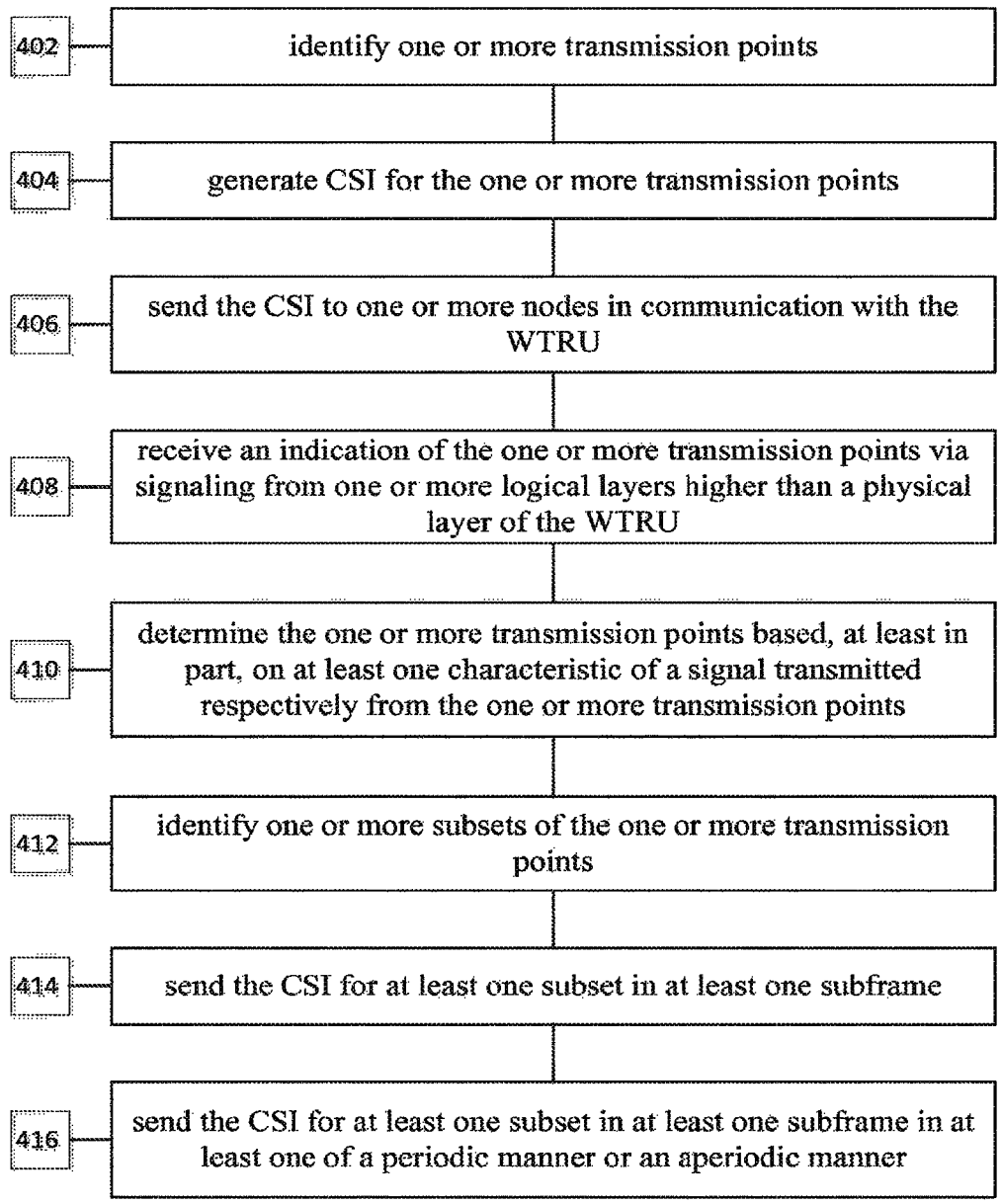
FIG. 4 illustrates an example wireless device configuration consistent with embodiments.

In light of the descriptions herein, and referring to FIG. 4, exemplary embodiments contemplate a wireless transmit/receive device (WTRU) that may be configured, at least in part, at 402, to identify one or more transmission points. The one or more transmission points may be configured for channel state information (CSI) reporting. The WTRU may be further configured, at 404, to generate CSI for the one or more transmission points. Also, the WTRU may be configured, at 406, to send the CSI to one or more nodes in communication with the WTRU. Embodiments contemplate that the one or more transmission points may include at least one antenna port in communication with the WTRU. Embodiments also contemplate that the one or more transmission points may be CSI reference signal (CSI-RS) resources. Embodiments contemplate that, at 408, the WTRU may be further configured to receive an indication of the one or more transmission points via signaling from one or more logical layers higher than a physical layer of the WTRU.

Embodiments contemplate that the WTRU, at 410, may be further configured to determine the one or more transmission points based, at least in part, on at least one characteristic of a signal that may be transmitted respectively from the one or more transmission points. Embodiments contemplate that the at least one characteristic may be at least one of signal strength, signal quality, or channel quality, for example. Embodiments also contemplate that the WTRU may, at 412, be further configured to identify one or more subsets of the one or more transmission points. Embodiments contemplate that the one or more transmission points may be further configured for CSI reporting in one or more subframes. Embodiments contemplate that the WTRU may, at 414, be further configured to send the CSI for at least one subset in at least one subframe. Embodiments contemplate that the at least one subframe may be determined based, at least in part, on at least one of a system frame number or a subframe number. Embodiments also contemplate that the WTRU may, at 416, be further configured to send the CSI for at least one subset in at least one subframe in at least one of a periodic manner or an aperiodic manner.

Figure 5:
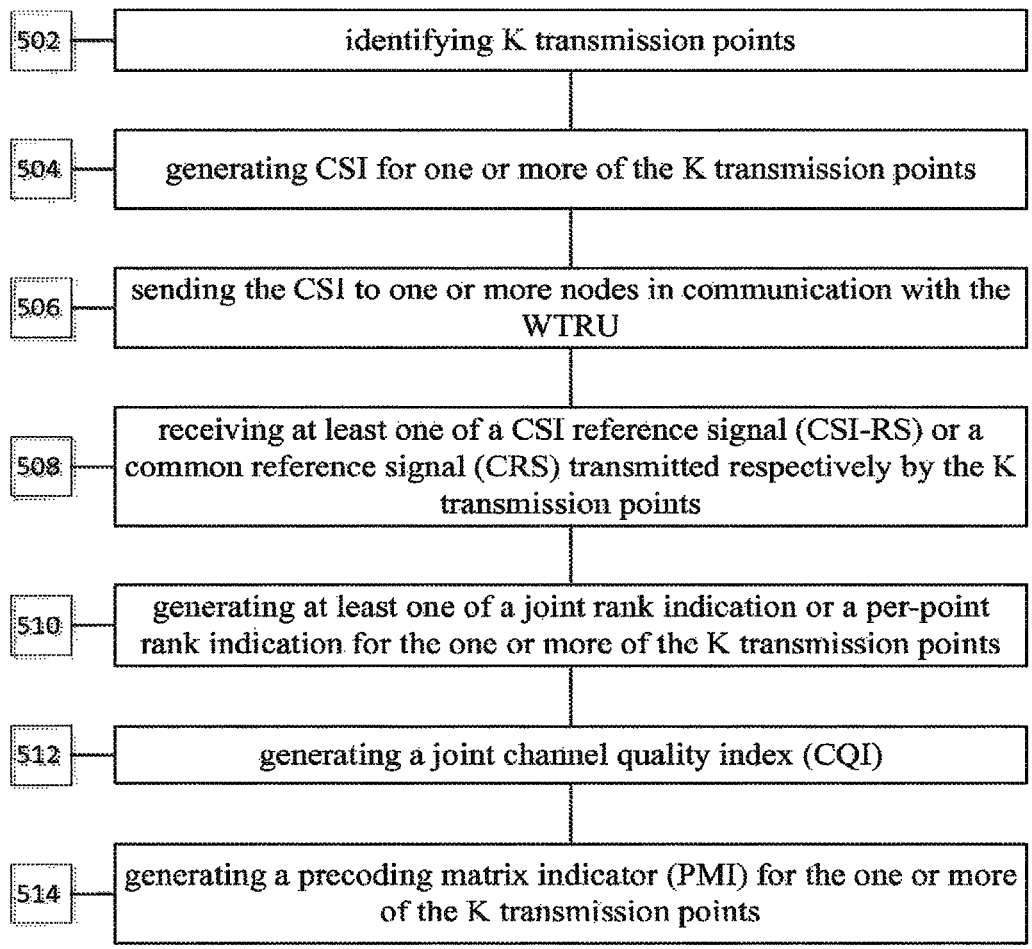
FIG. 5 illustrates an example method consistent with embodiments.

Embodiments contemplate one or more methods that may be performed by a wireless transmit and receive unit (WTRU). Referring to FIG. 5, one or more embodiments may include, at 502, identifying K transmission points, where the K transmission points may be configured for channel state information (CSI) reporting, and where K may be an integer. Embodiments may further include, at 504, generating CSI for one or more of the K transmission points. In addition, embodiments may include, at 506, sending the CSI to one or more nodes in communication with the WTRU. Also, embodiments may include, at 508, receiving at least one of a CSI reference signal (CSI-RS) or a common reference signal (CRS) that may be transmitted respectively by the K transmission points. Embodiments contemplate that the identifying the K transmission points may be based, at least in part, on the received CSI-RS or CRS. In one or more embodiments, the generating the CSI may, at 510, include generating at least one of a joint rank indication or a per-point rank indication for the one or more of the K transmission points. In one or more embodiments, the generating the CSI may, at 512, include generating a joint channel quality index (CQI), where the joint CQI may correspond to a joint transmission over the one or more of the K transmission points.

Embodiments contemplate that the joint transmission over the one or more of the K transmission points may be that of at least one codeword. Embodiments also contemplate that the joint CQI may include at least one of a coherent joint CQI or a non-coherent joint CQI, for example. Embodiments also contemplate that the generating the CSI may, at 514, include generating a precoding matrix indicator (PMI) for the one or more of the K transmission points.

Figure 6:
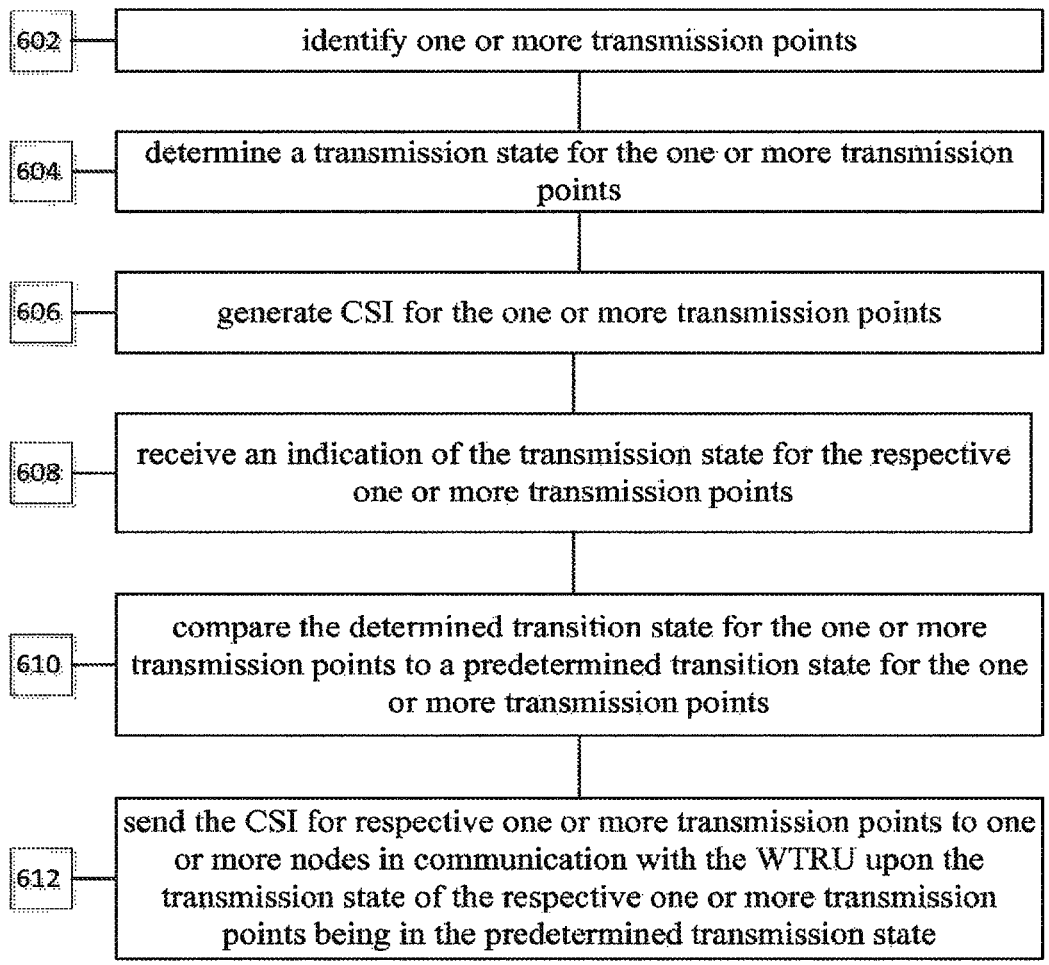
FIG. 6 illustrates an example wireless device configuration consistent with embodiments.

Referring to FIG. 6, embodiments contemplate a wireless transmit/receive device (WTRU) that may be configured, at least in part, at 602, to identify one or more transmission points, where the one or more transmission points may be configured for channel state information (CSI) reporting. At 604, the WTRU may be configured to determine a transmission state (or CSI process) for the one or more transmission points. At 606, the WTRU may be configured to generate CSI for the one or more transmission points. Also, at 608, the WTRU may be further configured to receive an indication of the transmission state (or CSI process) for the respective one or more transmission points, where the indication of the transmission state (or CSI process) may include one or more of a transmitting state, an interfering state, a blanked state, or an unknown state, for example. At 610, the WTRU may be further configured to compare the determined transition state for the one or more transmission points to a predetermined transition state for the one or more transmission points. The WTRU may also, at 612, be configured to send the CSI for respective one or more transmission points to one or more nodes in communication with the WTRU upon the transmission state (or CSI process) of the respective one or more transmission points being in the predetermined transmission state (or CSI process).

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed is:

1. A wireless transmit/receive unit (WTRU), the WTRU comprising:
a memory; and
a processor, the processor configured at least to:
receive a first configuration of channel state information (CSI) reference signal (CSI-RS) resources, the first configuration of CSI-RS resources comprising a first configuration of non-zero-power (NZP) CSI-RS resources and a first configuration of CSI interference measurement (CSI-IM) resources, the first configuration of NZP CSI-RS resources comprising a first set of resource elements, a first periodicity associated with the NZP CSI-RS resources corresponding to the first configuration of NZP CSI-RS resources, a first offset associated with the NZP CSI-RS resources corresponding to the first configuration of NZP CSI-RS resources, and a first assumed ratio of physical downlink shared channel (PDSCH) energy per resource element (EPRE) to a first NZP CSI-RS EPRE, the first configuration of CSI-IM resources comprising a second set of resource elements, a second periodicity associated with the CSI-IM resources corresponding to the first configuration of CSI-IM resources, and a second offset associated with the CSI-IM resources corresponding to the first configuration of CSI-IM resources;
receive a second configuration of CSI-RS resources, the second configuration of CSI-RS resources comprising a second configuration of NZP CSI-RS resources and a second configuration of CSI-IM resources, the second configuration of NZP CSI-RS resources comprising a third set of resource elements, a third periodicity associated with the NZP CSI-RS resources corresponding to the second configuration of NZP CSI-RS resources, a third offset associated with the NZP CSI-RS resources corresponding to the second configuration of NZP CSI-RS resources, and a second assumed ratio of PDSCH EPRE to a second NZP CSI-RS EPRE, the second configuration of CSI-IM resources comprising a fourth set of resource elements, a fourth periodicity associated with the CSI-IM resources corresponding to the second configuration of CSI-IM resources, and a fourth offset associated with the CSI-IM resources corresponding to the second configuration of CSI-IM resources;
in response to a determination that a first aperiodic CSI report associated with at least the first configuration of CSI-RS resources has been triggered, send the first aperiodic CSI report associated with at least the first configuration of CSI-RS resources; and
in response to a determination that a second aperiodic CSI report associated with at least the second configuration of CSI-RS resources has been triggered, send the second aperiodic CSI report associated with at least the second configuration of CSI-RS resources.

2. The WTRU of claim 1, wherein the processor is further configured such that the first aperiodic CSI report is determined according to one or more aperiodic report modes configured for the first configuration of CSI-RS resources.

3. The WTRU of claim 1, wherein the processor is further configured such that the first configuration of CSI-RS resources corresponds to a first CSI Process, and the second configuration of CSI-RS resources corresponds to a second CSI Process.

4. A wireless transmit/receive unit (WTRU) comprising:
a memory; and
a processor, the processor configured at least to:
receive a first configuration of channel state information (CSI) reference signal (CSI-RS) resources, the first configuration of CSI-RS resources comprising a first configuration of non-zero-power (NZP) CSI-RS resources and a first configuration of CSI interference measurement (CSI-IM) resources, the first configuration of NZP CSI-RS resources comprising a first set of resource elements, a first periodicity associated with the NZP CSI-RS resources corresponding to the first configuration of NZP CSI-RS resources, a first offset associated with the NZP CSI-RS resources corresponding to the first configuration of NZP CSI-RS resources, and a first assumed ratio of physical downlink shared channel (PDSCH) energy per resource element (EPRE) to a first NZP CSI-RS EPRE, the first configuration of CSI-IM resources comprising a second set of resource elements, a second periodicity associated with the CSI-IM resources corresponding to the first configuration of CSI-IM resources, and a second offset associated with the CSI-IM resources corresponding to the first configuration of CSI-IM resources;
receive a second configuration of CSI-RS resources, the second configuration of CSI-RS resources comprising a second configuration of NZP CSI-RS resources and a second configuration of CSI-IM resources, the second configuration of NZP CSI-RS resources comprising a third set of resource elements, a third periodicity associated with the NZP CSI-RS resources corresponding to the second configuration of NZP CSI-RS resources, a third offset associated with the NZP CSI-RS resources corresponding to the second configuration of NZP CSI-RS resources, and a second assumed ratio of PDSCH EPRE to a second NZP CSI-RS EPRE, the second configuration of CSI-IM resources comprising a fourth set of resource elements, a fourth periodicity associated with the CSI-IM resources corresponding to the second configuration of CSI-IM resources, and a fourth offset associated with the CSI-IM resources;
associate a rank indicator (RI) with the first configuration of CSI-RS resources; and
report a common RI value associated with the first configuration of CSI-RS resources and the second configuration of CSI-RS resources.

5. The WTRU of claim 4, wherein the processor is further configured to receive a third configuration of CSI-RS resources, the third configuration of CSI-RS resources comprising a third configuration of NZP CSI-RS resources and a third configuration of CSI-IM resources, the third configuration of NZP CSI-RS resources comprising a fifth set of resource elements, the third configuration of CSI-IM resources comprising a sixth set of resource elements, and wherein the reported common RI value is associated with the first configuration of CSI-RS resources, the second configuration of CSI-RS resources, and the third configuration of CSI-RS resources.

6. The WTRU of claim 4, wherein the processor is further configured such that the reported common RI value is associated with the first configuration of CSI-RS resources and the second configuration of CSI-RS resources upon a collision between a first report and a second report.

7. The WTRU of claim 4, wherein the processor is further configured such that the first configuration of CSI-RS resources corresponds to a first CSI Process, and the second configuration of CSI-RS resources corresponds to a second CSI Process.

8. A method performed by a wireless transmit/receive unit (WTRU), the method comprising:
receiving a first configuration of channel state information (CSI) reference signal (CSI-RS) resources, the first configuration of CSI-RS resources comprising a first configuration of non-zero-power (NZP) CSI-RS resources and a first configuration of CSI interference measurement (CSI-IM) resources, the first configuration of NZP CSI-RS resources comprising a first set of resource elements, a first periodicity associated with the NZP CSI-RS resources corresponding to the first configuration of NZP CSI-RS resources, a first offset associated with the NZP CSI-RS resources corresponding to the first configuration of NZP CSI-RS resources, and a first assumed ratio of physical downlink shared channel (PDSCH) energy per resource element (EPRE) to a first NZP CSI-RS EPRE, the first configuration of CSI-IM resources comprising a second set of resource elements, a second periodicity associated with the CSI-IM resources corresponding to the first configuration of CSI-IM resources, and a second offset associated with the CSI-IM resources corresponding to the first configuration of CSI-IM resources;
receiving a second configuration of CSI-RS resources, the second configuration of CSI-RS resources comprising a second configuration of NZP CSI-RS resources and a second configuration of CSI-IM resources, the second configuration of NZP CSI-RS resources comprising a third set of resource elements, a third periodicity associated with the NZP CSI-RS resources corresponding to the second configuration of NZP CSI-RS resources, a third offset associated with the NZP CSI-RS resources corresponding to the second configuration of NZP CSI-RS resources, and a second assumed ratio of PDSCH EPRE to a second NZP CSI-RS EPRE, the second configuration of CSI-IM resources comprising a fourth set of resource elements, a fourth periodicity associated with the CSI-IM resources corresponding to the second configuration of CSI-IM resources, and a fourth offset associated with the CSI-IM resources corresponding to the second configuration of CSI-IM resources;

in response to a determination that a first aperiodic CSI report associated with at least the first configuration of CSI-RS resources has been triggered, sending the first aperiodic CSI report associated with at least the first configuration of CSI-RS resources; and in response to a determination that a second aperiodic CSI report associated with at least the second configuration of CSI-RS resources has been triggered, sending the second aperiodic CSI report associated with at least the second configuration of CSI-RS resources.

9. The method of claim 8, further comprising determining the first aperiodic CSI report according to one or more aperiodic report modes configured for the first configuration of CSI-RS resources.

10. The method of claim 8, wherein the first configuration of CSI-RS resources corresponds to a first CSI Process, and the second configuration of CSI-RS resources corresponds to a second CSI Process.

11. A method performed by a wireless transmit/receive unit (WTRU), the method comprising:

receiving a first configuration of channel state information (CSI) reference signal (CSI-RS) resources, the first configuration of CSI-RS resources comprising a first configuration of non-zero-power (NZP) CSI-RS resources and a first configuration of CSI interference measurement (CSI-IM) resources, the first configuration of NZP CSI-RS resources comprising a first set of resource elements, a first periodicity associated with the NZP CSI-RS resources corresponding to the first configuration of NZP CSI-RS resources, a first offset associated with the NZP CSI-RS resources corresponding to the first configuration of NZP CSI-RS resources, and a first assumed ratio of physical downlink shared channel (PDSCH) energy per resource element (EPRE) to a first NZP CSI-RS EPRE, the first configuration of CSI-IM resources comprising a second set of resource elements, a second periodicity associated with the CSI-IM resources corresponding to the first configuration of CSI-IM resources, and a second offset associated with the CSI-IM resources corresponding to the first configuration of CSI-IM resources;

receiving a second configuration of CSI-RS resources, the second configuration of CSI-RS resources comprising a second configuration of NZP CSI-RS resources and a second configuration of CSI-IM resources, the second configuration of NZP CSI-RS resources comprising a third set of resource elements, a third periodicity associated with the NZP CSI-RS resources corresponding to the second configuration of NZP CSI-RS resources, a third offset associated with the NZP CSI-RS resources corresponding to the second configuration of NZP CSI-RS resources, and a second assumed ratio of PDSCH EPRE to a second NZP CSI-RS EPRE, the second configuration of CSI-IM resources comprising a fourth set of resource elements, a fourth periodicity associated with the CSI-IM resources corresponding to the second configuration of CSI-IM resources, and a fourth offset associated with the CSI-IM resources corresponding to the second configuration of CSI-IM resources;

associating a rank indicator (RI) with the first configuration of CSI-RS resources; and reporting a common RI value associated with the first configuration of CSI-RS resources and the second configuration of CSI-RS resources.

12. The method of claim 11, further comprising:

receiving a third configuration of CSI-RS resources, the third configuration of CSI-RS resources comprising a third configuration of NZP CSI-RS resources and a third configuration of CSI-IM resources, the third configuration of NZP CSI-RS resources comprising a fifth set of resource elements, the third configuration of CSI-IM resources comprising a sixth set of resource elements, and associating the reported common RI value with the first configuration of CSI-RS resources, the second configuration of CSI-RS resources, and the third configuration of CSI-RS resources.

13. The method of claim 11, further comprising associating the reported common RI value with the first configuration of CSI-RS resources and the second configuration of CSI-RS resources upon a collision between a first report and a second report.

14. The method of claim 11, wherein the first configuration of CSI-RS resources corresponds to a first CSI Process, and the second configuration of CSI-RS resources corresponds to a second CSI Process.

* * * * *

UNITED STATES PATENT AND TRADEMARK OFFICE
CERTIFICATE OF CORRECTION

PATENT NO. : 11,039,329 B2
APPLICATION NO. : 15/387703
DATED : June 15, 2021
INVENTOR(S) : Paul Marinier et al.

It is certified that error appears in the above-identified patent and that said Letters Patent is hereby corrected as shown below:

In the Specification

Column 24, Line 48: replace "ilk" with -- $i_{1k}$ --

Column 25, Line 1: after "$W_k$ ...0;" insert -- ...; --

Column 25, Line 43: replace "ilk" with -- $i_{1k}$ --

Column 26, Line 23: replace "ilk" with -- $i_{2k}$ --

Column 27, Line 4: replace "ha" with -- $i_{2a}$ --

Column 30, Line 54: replace "$S_i<S_{i+1}$," with -- $S_i<S_{i+1}$ --

Column 36, Line 12: replace "implicity" with -- implicitly --

Column 39, Line 59: replace "maping" with -- mapping --

Column 40, Line 13: replace "WTRUI" with -- WTRU --

Column 41, Line 49: replace "WTRI" with -- WTRU --

Column 44, Line 58: replace "subands" with -- subbands --

Column 48, Line 16: replace "ilk" with -- $i_{1k}$ --

Column 48, Line 22: replace "ilk" with -- $i_{1k}$ --

Column 48, Line 26: replace "ilk" with -- $i_{2k}$ --

Signed and Sealed this
Twenty-ninth Day of March, 2022

Drew Hirshfeld
*Performing the Functions and Duties of the
Under Secretary of Commerce for Intellectual Property and
Director of the United States Patent and Trademark Office*

CERTIFICATE OF CORRECTION (continued)
U.S. Pat. No. 11,039,329 B2

Column 49, Line 61: replace "subands" with -- subbands --

Column 59, Line 8: after "port" insert -- . --

Column 60, Line 24: replace "W-PMI1$_a$-PMI2a, W-CQI/-PMI2$_a$," with -- W-PMI1$_a$, W-CQI/W-PMI2$_a$, W-CQI/W-PMI2$_a$ --

Column 66, Line 61: replace "WRTU" with -- WTRU --